(12) United States Patent
Beard et al.

(10) Patent No.: US 8,057,669 B2
(45) Date of Patent: Nov. 15, 2011

(54) FILTER ELEMENT AND FILTER ASSEMBLY INCLUDING LOCKING MECHANISM

(75) Inventors: John H. Beard, Kearney, NE (US); Farrell F. Calcaterra, Kearney, NE (US)

(73) Assignee: Baldwin Filters, Inc., Kearney, NE (US)

( * ) Notice: Subject to any disclaimer, the term of this patent is extended or adjusted under 35 U.S.C. 154(b) by 614 days.

(21) Appl. No.: 12/139,734

(22) Filed: Jun. 16, 2008

(65) Prior Publication Data
US 2008/0245719 A1    Oct. 9, 2008

Related U.S. Application Data

(63) Continuation-in-part of application No. 11/358,478, filed on Feb. 21, 2006.

(60) Provisional application No. 60/655,178, filed on Feb. 22, 2005.

(51) Int. Cl.
*B01D 27/00* (2006.01)
*B01D 27/08* (2006.01)

(52) U.S. Cl. ........ 210/232; 210/233; 210/234; 210/235; 210/443; 210/444

(58) Field of Classification Search .................. 210/233, 210/234, 235, 440, 443, 444, 446, 497.01
See application file for complete search history.

(56) References Cited

U.S. PATENT DOCUMENTS

| | | | |
|---|---|---|---|
| 1,761,924 A | 6/1930 | Kamrath | |
| 3,361,260 A | 1/1968 | Buckman | |
| 3,370,708 A | 2/1968 | Hultgren et al. | |
| 3,384,241 A | 5/1968 | Nostrand | |
| 3,420,377 A | 1/1969 | Vandersip | |
| 3,988,244 A | 10/1976 | Brooks | |
| 4,372,847 A | 2/1983 | Lewis | |
| 4,719,012 A * | 1/1988 | Groezinger et al. | 210/232 |
| 4,812,235 A | 3/1989 | Seleman et al. | |
| 4,915,831 A | 4/1990 | Taylor | |
| 5,078,877 A | 1/1992 | Cudaback et al. | |
| 5,102,541 A | 4/1992 | Breitbach | |

(Continued)

FOREIGN PATENT DOCUMENTS

DE    199 60 600 A1    6/2001

(Continued)

OTHER PUBLICATIONS

Dahl Baldwin, Marine Diesel Fuel/Water Separators, Installation pamphlet, 2005, 9 pages, pp. 1-9.

*Primary Examiner* — Tony G Soohoo
*Assistant Examiner* — Peter Keyworth
(74) *Attorney, Agent, or Firm* — Reinhart Boerner Van Deuren P.C.

(57) ABSTRACT

A fluid filtering apparatus and method may include keyed components to ensure that a correct filter element is being installed into a filter base. Keyed arrangements may occur between a filter element and a filter housing, a filter and a filter base, and a filter base and a filter housing. A locking arrangement may be provided to prevent undesired loosening of a filter relative to a filter base. The filter base may include a torsion lock insert that engages lock detents of a filter to prevent the undesired loosening. An adaptor may be provided to provide the lock detents that interact with a torsion lock insert.

13 Claims, 61 Drawing Sheets

U.S. PATENT DOCUMENTS

| | | | |
|---|---|---|---|
| 5,114,572 A * | 5/1992 | Hunter et al. | 210/120 |
| 5,203,994 A | 4/1993 | Janik | |
| 5,259,953 A | 11/1993 | Baracchi et al. | |
| 5,302,284 A | 4/1994 | Zeiner et al. | |
| 5,342,511 A | 8/1994 | Brown et al. | |
| 5,350,506 A | 9/1994 | Dombek et al. | |
| 5,362,390 A | 11/1994 | Widenhoefer et al. | |
| 5,364,528 A | 11/1994 | Schwarz et al. | |
| 5,390,701 A | 2/1995 | Lessley et al. | |
| 5,486,288 A | 1/1996 | Stanford et al. | |
| 5,560,824 A * | 10/1996 | Sann et al. | 210/234 |
| 5,674,393 A | 10/1997 | Terhune et al. | |
| 5,698,093 A | 12/1997 | Pyle et al. | |
| 5,744,030 A * | 4/1998 | Reid et al. | 210/235 |
| 5,788,859 A | 8/1998 | Biere | |
| 5,817,234 A | 10/1998 | Dye et al. | |
| 5,837,137 A | 11/1998 | Janik | |
| 5,868,932 A | 2/1999 | Guichaoua et al. | |
| 5,906,737 A | 5/1999 | Hoeppner | |
| 5,938,921 A | 8/1999 | Janik et al. | |
| 5,985,142 A | 11/1999 | Belden | |
| 6,048,455 A | 4/2000 | Janik | |
| 6,068,763 A | 5/2000 | Goddard | |
| 6,171,491 B1 | 1/2001 | Popoff et al. | |
| 6,187,188 B1 | 2/2001 | Janik et al. | |
| 6,193,884 B1 | 2/2001 | Magnusson et al. | |
| 6,387,259 B1 | 5/2002 | Roll | |
| 6,485,635 B1 | 11/2002 | Gandini et al. | |
| 6,488,845 B1 | 12/2002 | Neufeld et al. | |
| 6,495,042 B1 | 12/2002 | Knight | |
| 6,500,335 B2 | 12/2002 | Janik et al. | |
| 6,506,302 B2 | 1/2003 | Janik | |
| 6,517,717 B1 | 2/2003 | Håkansson | |
| D472,299 S | 3/2003 | Fritze | |
| D472,604 S | 4/2003 | Fritze | |
| 6,565,746 B1 | 5/2003 | Stamey, Jr. et al. | |
| 6,615,990 B1 | 9/2003 | Jokschas et al. | |
| 6,652,740 B2 | 11/2003 | Schoess | |
| 6,662,954 B2 | 12/2003 | Gottwald-Grill et al. | |
| 6,673,250 B2 | 1/2004 | Kuennen et al. | |
| 6,723,239 B2 | 4/2004 | Maxwell | |
| 6,740,234 B1 | 5/2004 | Williams et al. | |
| 6,863,811 B2 | 3/2005 | Janik | |
| 6,881,334 B2 | 4/2005 | Janik | |
| 6,896,803 B2 | 5/2005 | Cline et al. | |
| 6,977,006 B2 | 12/2005 | Reid | |
| 7,042,346 B2 | 5/2006 | Paulsen | |
| 7,048,488 B1 | 5/2006 | Kuznetsov et al. | |
| 7,070,692 B2 | 7/2006 | Knight | |
| 7,081,201 B2 | 7/2006 | Bassett et al. | |
| 7,744,758 B2 * | 6/2010 | Dworatzek et al. | 210/235 |
| 2002/0014452 A1 * | 2/2002 | Janik | 210/437 |
| 2002/0166805 A1 | 11/2002 | Minns et al. | |
| 2002/0185454 A1 | 12/2002 | Beard et al. | |
| 2003/0019819 A1 * | 1/2003 | Fritze | 210/767 |
| 2003/0226800 A1 | 12/2003 | Brown et al. | 210/497.01 |
| 2004/0144713 A1 * | 7/2004 | Bassett et al. | 210/444 |
| 2005/0056582 A1 | 3/2005 | Patel et al. | |
| 2005/0103692 A1 | 5/2005 | Stanhope et al. | |
| 2005/0161378 A1 | 7/2005 | Cline | |
| 2005/0161386 A1 | 7/2005 | Gustafson et al. | |
| 2005/0194317 A1 | 9/2005 | Ikeyama et al. | |
| 2006/0016745 A1 | 1/2006 | Nguyen et al. | |
| 2006/0016769 A1 | 1/2006 | Hacker et al. | |
| 2006/0054547 A1 * | 3/2006 | Richmond et al. | 210/234 |
| 2006/0060512 A1 | 3/2006 | Astle et al. | |
| 2006/0096934 A1 | 5/2006 | Weinberger et al. | |
| 2006/0118475 A1 | 6/2006 | Girondi | |
| 2006/0124516 A1 | 6/2006 | Merritt et al. | |
| 2006/0151371 A1 | 7/2006 | Weinberger et al. | |
| 2006/0180539 A1 | 8/2006 | Wolf et al. | |
| 2006/0186031 A1 | 8/2006 | Fick et al. | |
| 2006/0191836 A1 | 8/2006 | Dworatzek et al. | |
| 2006/0219621 A1 | 10/2006 | Dworatzek | |
| 2006/0219626 A1 | 10/2006 | Dworatzek et al. | |
| 2007/0215561 A1 | 9/2007 | Yates et al. | |
| 2008/0264850 A1 * | 10/2008 | Amesoder et al. | 210/234 |

FOREIGN PATENT DOCUMENTS

| | | |
|---|---|---|
| EP | 0 880 987 A1 | 12/1998 |
| JP | 9173717 | 7/1997 |
| WO | WO 2007/053228 A2 | 5/2007 |

* cited by examiner

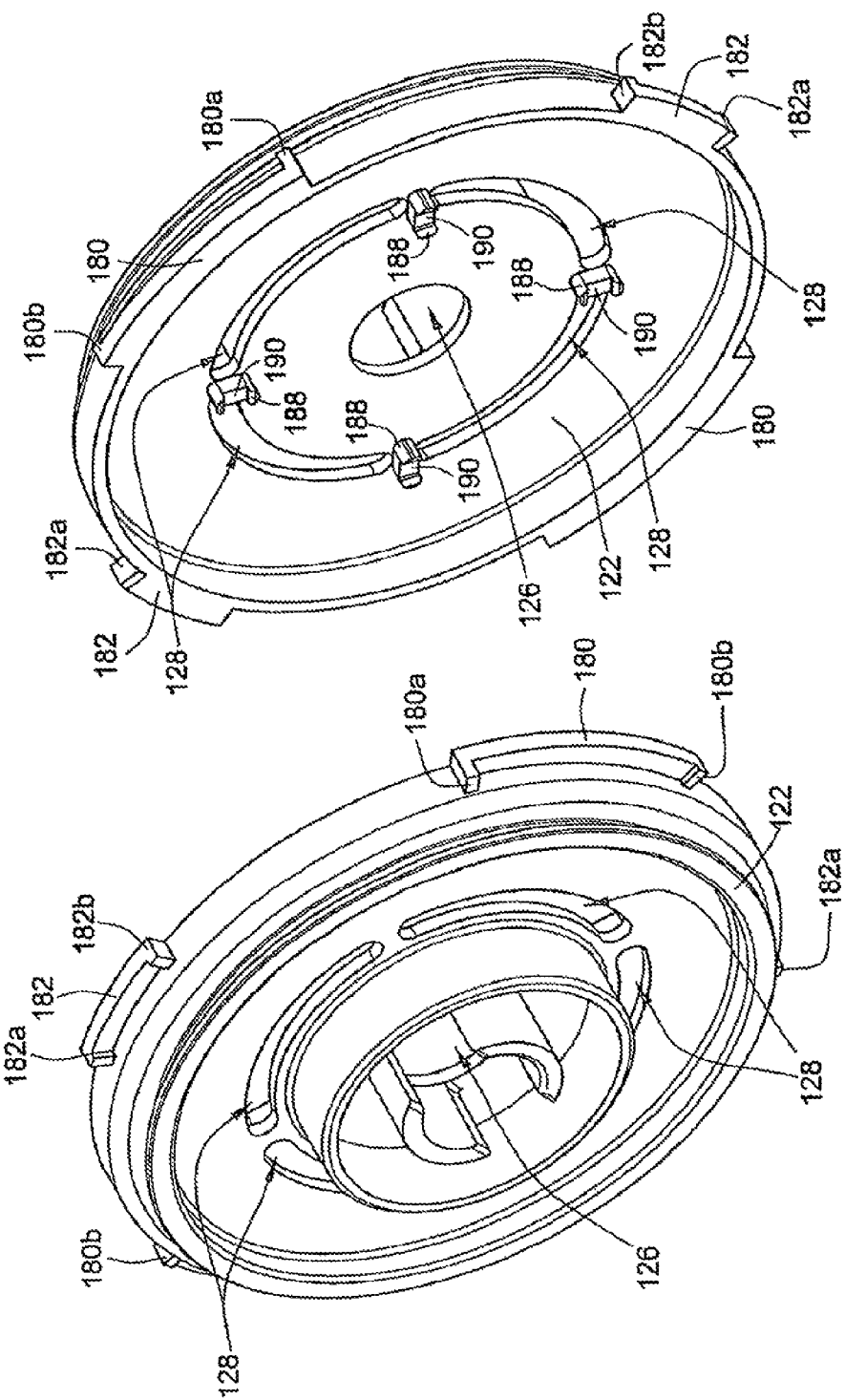

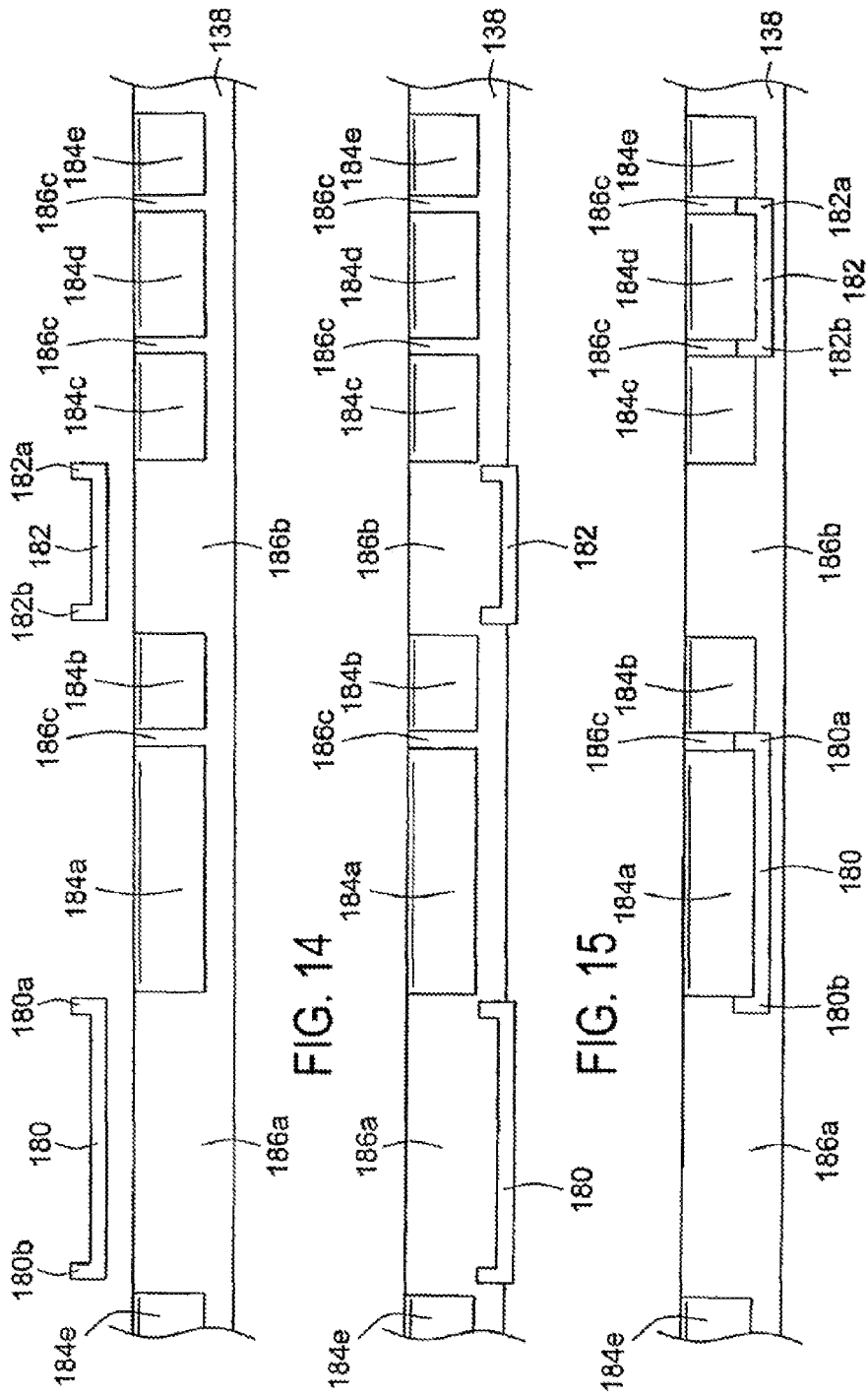

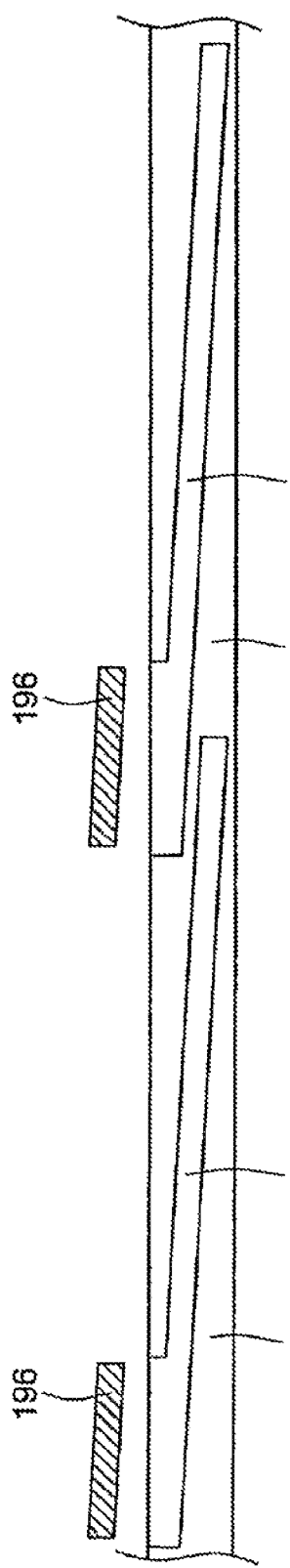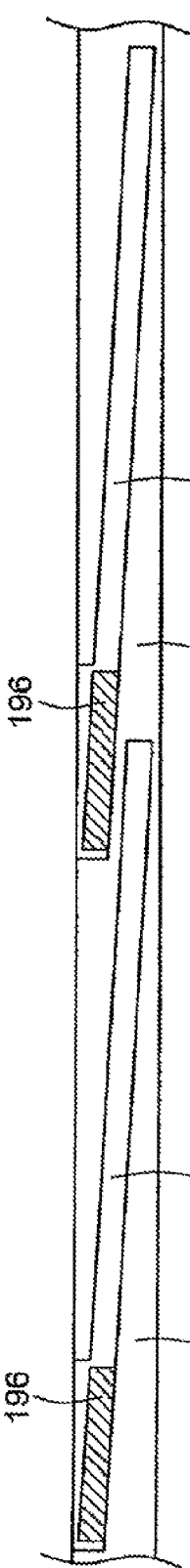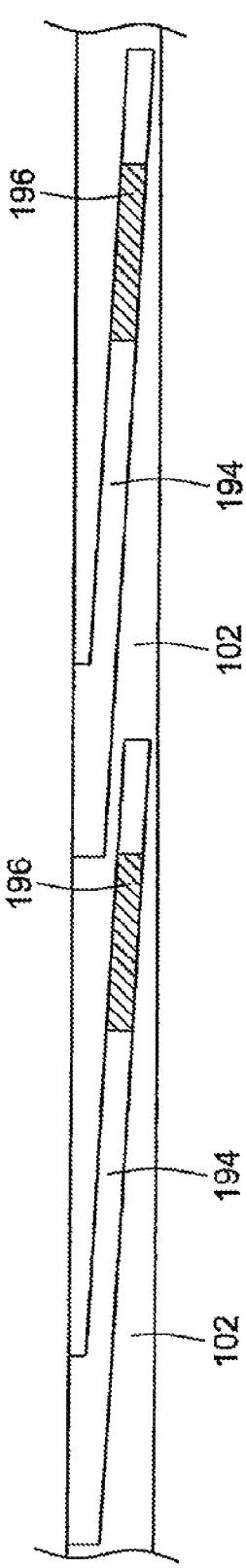

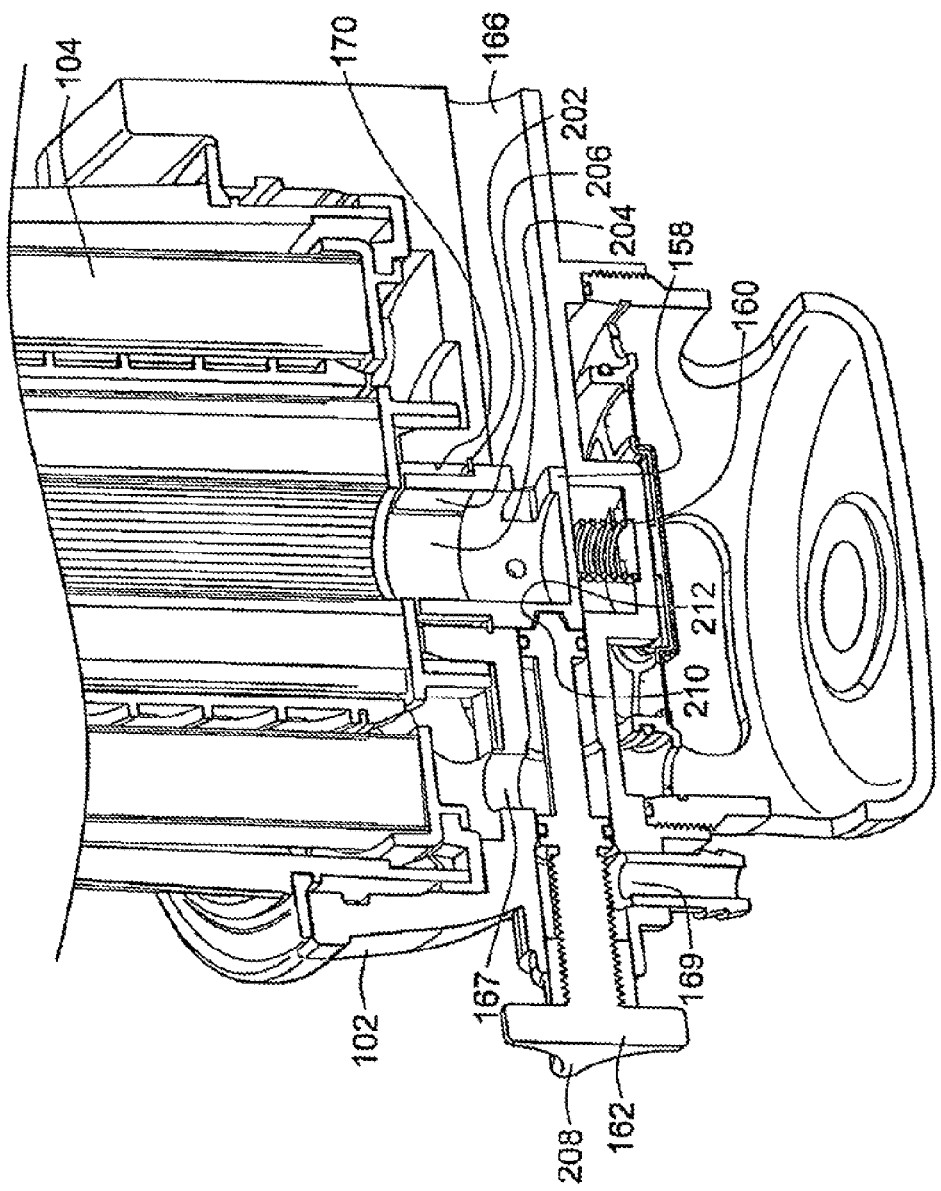

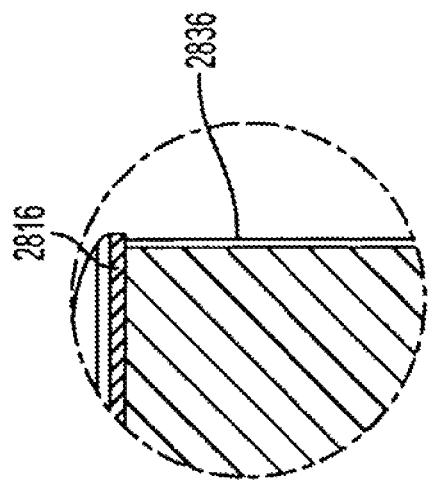
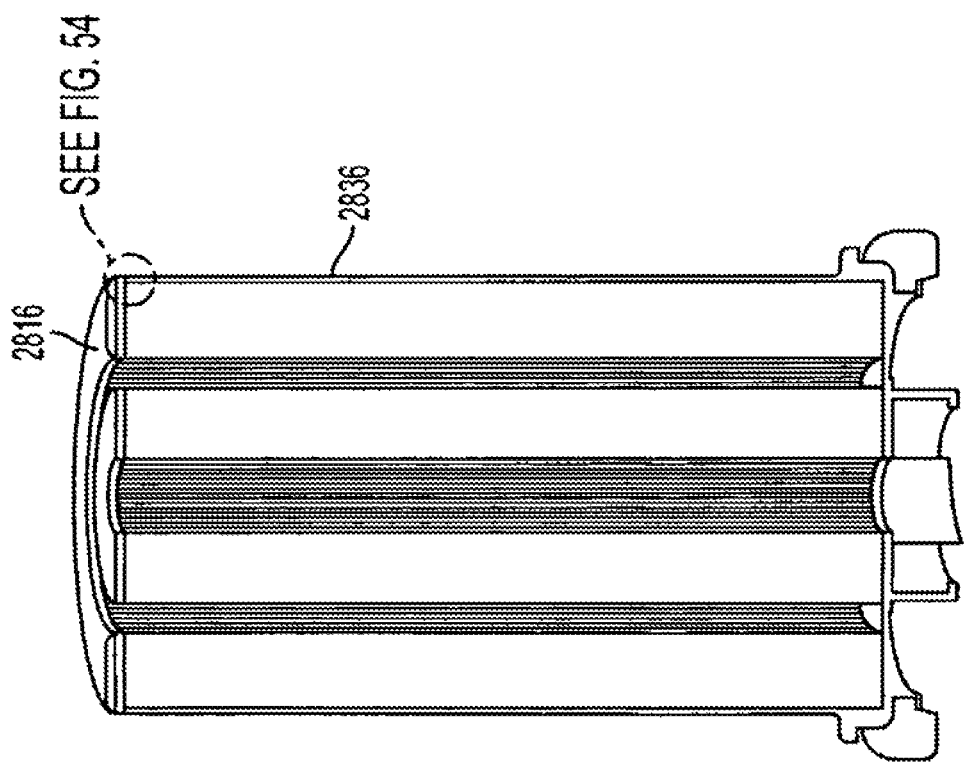
FIG. 54
FIG. 53

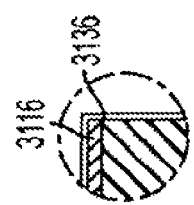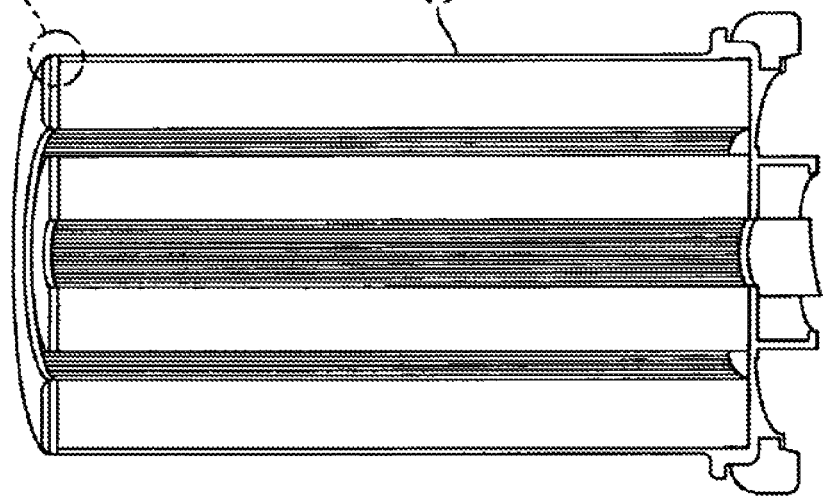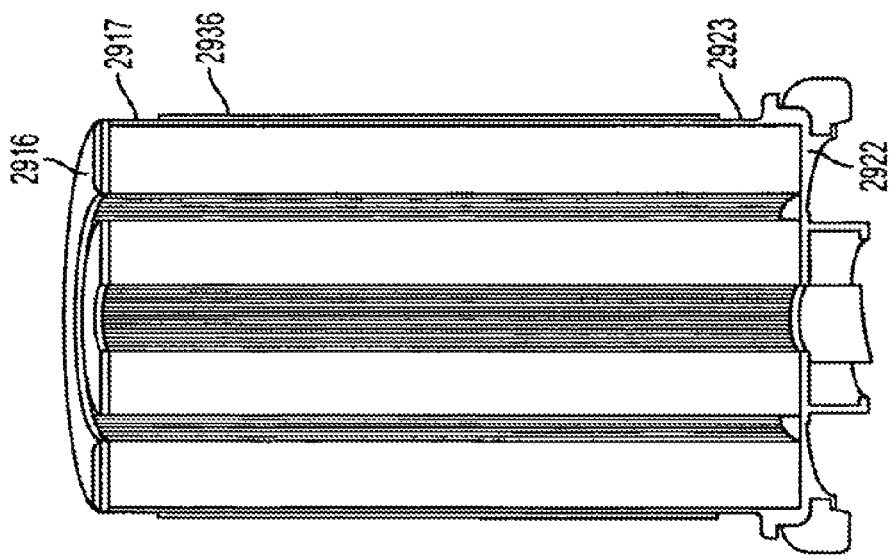

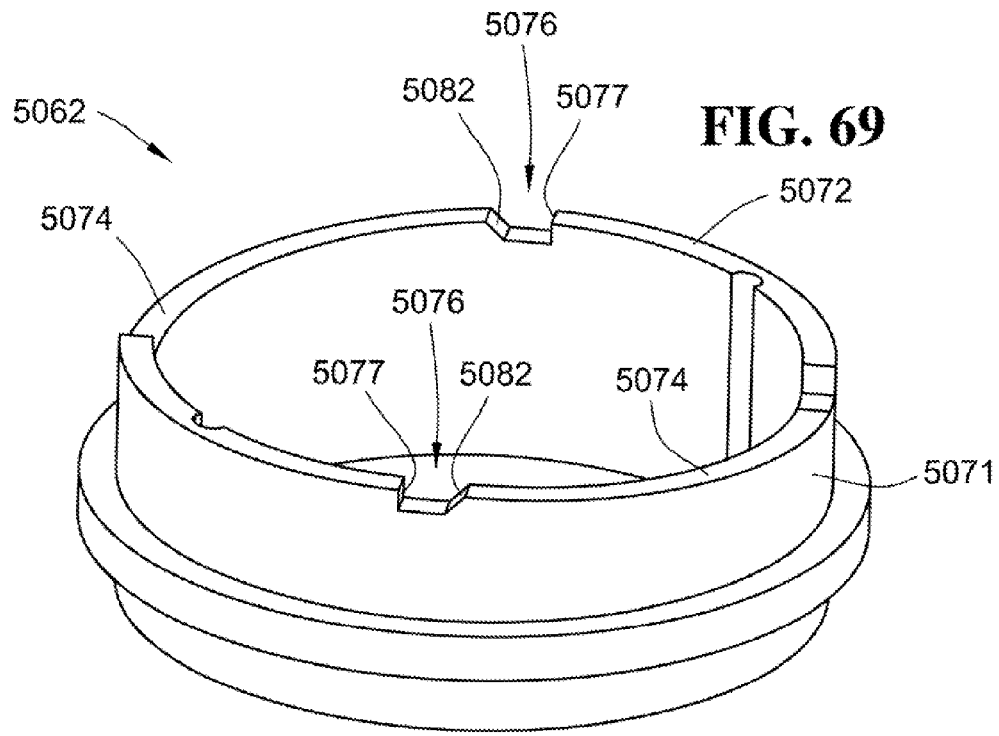
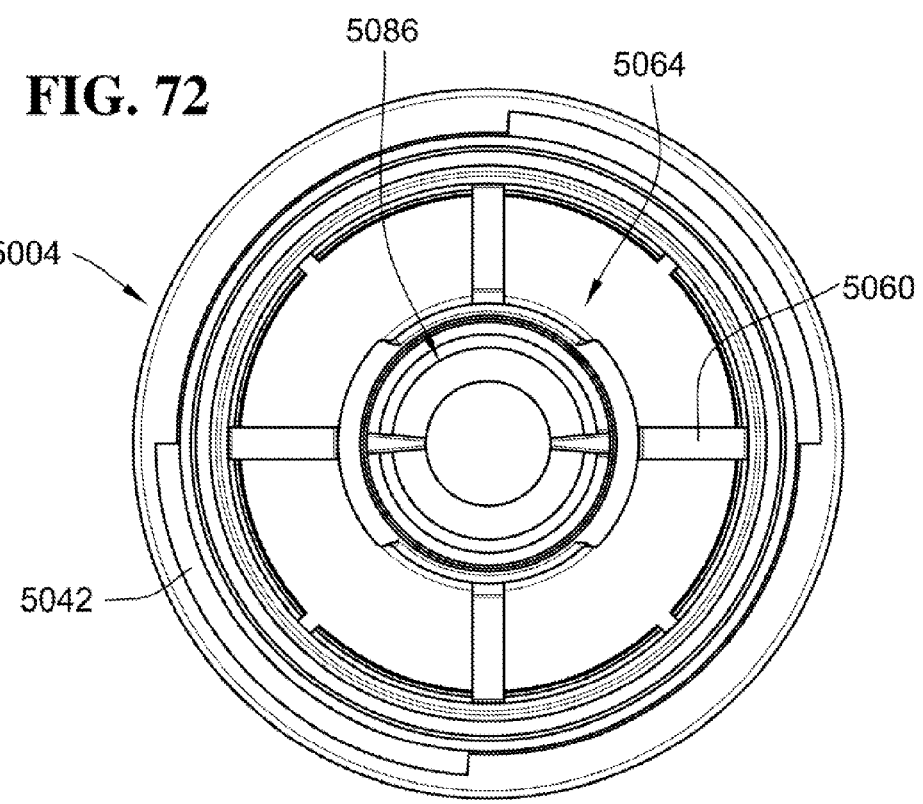

FILTER ELEMENT AND FILTER ASSEMBLY INCLUDING LOCKING MECHANISM

CROSS-REFERENCE TO RELATED PATENT APPLICATIONS

This patent application is a continuation-in-part of co-pending U.S. patent application Ser. No. 11/358,478, filed Feb. 21, 2006, which claims the benefit of U.S. Provisional Patent Application No. 60/655,178, filed Feb. 22, 2005, the teachings and disclosure of both applications are hereby incorporated in their entireties by reference thereto.

FIELD OF THE INVENTION

This invention generally relates to filtering fluids, and more particularly to filter apparatuses of the type used for the fuel supply of an engine or for the lubrication system of an engine.

BACKGROUND OF THE INVENTION

It is necessary to remove particulate matter and water from fuel being supplied to an engine in order for the engine to operate properly and to have a long service life. Accordingly, the fuel supply system for an engine will typically include a fuel filter apparatus for removing particulate matter from the fuel before it is supplied to the engine. Such filter apparatuses also sometimes include provisions for removing water from the fuel, pre-heating the fuel, and provisions for injecting anti-gel or lubricity additives. Such filter apparatuses may also include other devices such as thermostats, pressure sensors, or water sensors. The filter may also be required to perform additional functions to neutralize acids or oxidants in the fuel. In addition, a filter apparatus may be used for the lubrication system of an engine.

Such filters typically include a filter element for trapping the particulate matter in a media. The element is configured so that it can be removed and replaced periodically as it becomes plugged with particulate matter. In order to allow for removal and replacement of the element, it is often mounted inside of a filter housing, which is in turn attached to a filter base having an inlet and an outlet port adapted for attachment of fluid lines directing fluid in to and away from the filter apparatus.

It is desirable that the filter apparatus and element be constructed to facilitate servicing of the filter. It is also desirable that the element and apparatus be configured in such a manner that only the proper element can be inserted into the base and housing, to preclude errors during servicing. It is further desirable, particularly in filters used in dirty or dusty environments of the type encountered in earth moving and farm equipment, that the filter apparatus include features for precluding entry of dirt or dust into the system while the filter element is being replaced. Also, it is desirable to prevent the filter from being undesirably loosened or removed from the filter base.

It is also desirable that a filter apparatus include built-in features for facilitating replacement of the filter element, preferably without the need for tools, and that the filter apparatus provide a pleasing aesthetic appearance.

Previous filter apparatuses have been less than satisfactory in providing such needs, desired features and functionality. It is desirable, therefore, to provide an improved apparatus and method for filtering a fluid, and in particular for filtering fuel or lubricants supplied to an engine, in a manner that better fulfills one or more of the needs described above.

BRIEF SUMMARY OF THE INVENTION

Numerous independently patentable aspects are present in different embodiments of the invention. Different embodiments may incorporate one or more of the aspects.

In one embodiment of the invention, a filter includes a cover, filter media, a key and a lock detent. The cover has a rim region and a hub region. The hub region has an inlet port and an outlet port. The filter media filters fluid flow from the inlet port to the outlet port. The key is provided along the rim region. The lock detent is provided between the rim and the hub region.

The filter may include a housing that is prevented from rotating relative to the cover by the key. The lock detent can interact with a filter base torsion lock mechanism to lock the filter to the filter base once the filter is properly rotationally mounted to the filter base.

In another embodiment, a filter assembly including a filter cartridge and filter base is provided. The filter cartridge includes a housing, a cover, filter media, a mounting thread and a torsion lock detent. The housing has an outer annular side wall. The cover is at one end of the housing and has an inlet port and an outlet port. The filter media is disposed within the annular sidewall. The mounting thread is provided by one of the housing and the cover. The torsion lock detent is provided by one of the cover and the housing radially between the mounting thread and the inlet and outlet ports. The filter base includes an annular sidewall and a lock assembly. The annular sidewall includes an open end sized to receive an end of the housing therethrough. The annular sidewall includes an inclined shelf corresponding to the mounting thread formed in a radially inner surface of the annular sidewall. The shelf facing axially away from the open end of the sidewall. The sidewall has an inner diameter being less than an outer diameter of the mounting thread. The lock assembly includes a ramped surface terminating in a lock slot. The ramped surface abuts the torsion lock detent when the mounting thread is inserted into the thread slot.

Other embodiments of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIGS. 4-9 are perspective views illustrating components and the construction of the filter element of the filter apparatus of FIGS. 1-3.

FIGS. 14-16 are roll-out views illustrating a series of steps involved in engaging complimentary keying and locking features in a filter element and housing of the exemplary embodiment of the filter apparatus shown in FIG. 1.

FIGS. 24-26 are roll-out views illustrating a series of steps involved in engaging complimentary keying and locking features in a filter base and housing of the exemplary embodiment of the filter apparatus shown in FIGS. 1-3.

FIGS. 27-28 are perspective partial sections of the exemplary embodiment of the filter apparatus of FIGS. 1-3, with FIG. 27 showing a drain/vent valve of the filter apparatus in a closed position, and with FIG. 28 showing the drain/vent valve of the filter apparatus in an open position.

FIG. 53 is a cross-sectional view of another embodiment of the filter element with the wrapping potted into the end caps.

FIG. 54 is an enlarged cross-sectional view of the area shown in the circle in FIG. 53.

FIG. 55 is a cross-sectional view of another embodiment of the filter element with the wrapping spaced from the end cap.

FIG. 56 is a cross-sectional view of another embodiment of the filter element.

FIG. 57 is an enlarged cross-sectional view of the area shown in the circle in FIG. 56.

FIG. 58 is an enlarged cross-sectional view of another embodiment of the area shown in FIG. 56.

FIG. 69 is a perspective view of a torsion lock insert of the filter base of FIG. 69.

FIG. 72 is a top view of a cover of filter according to the invention.

DETAILED DESCRIPTION OF THE INVENTION

Figure 1:
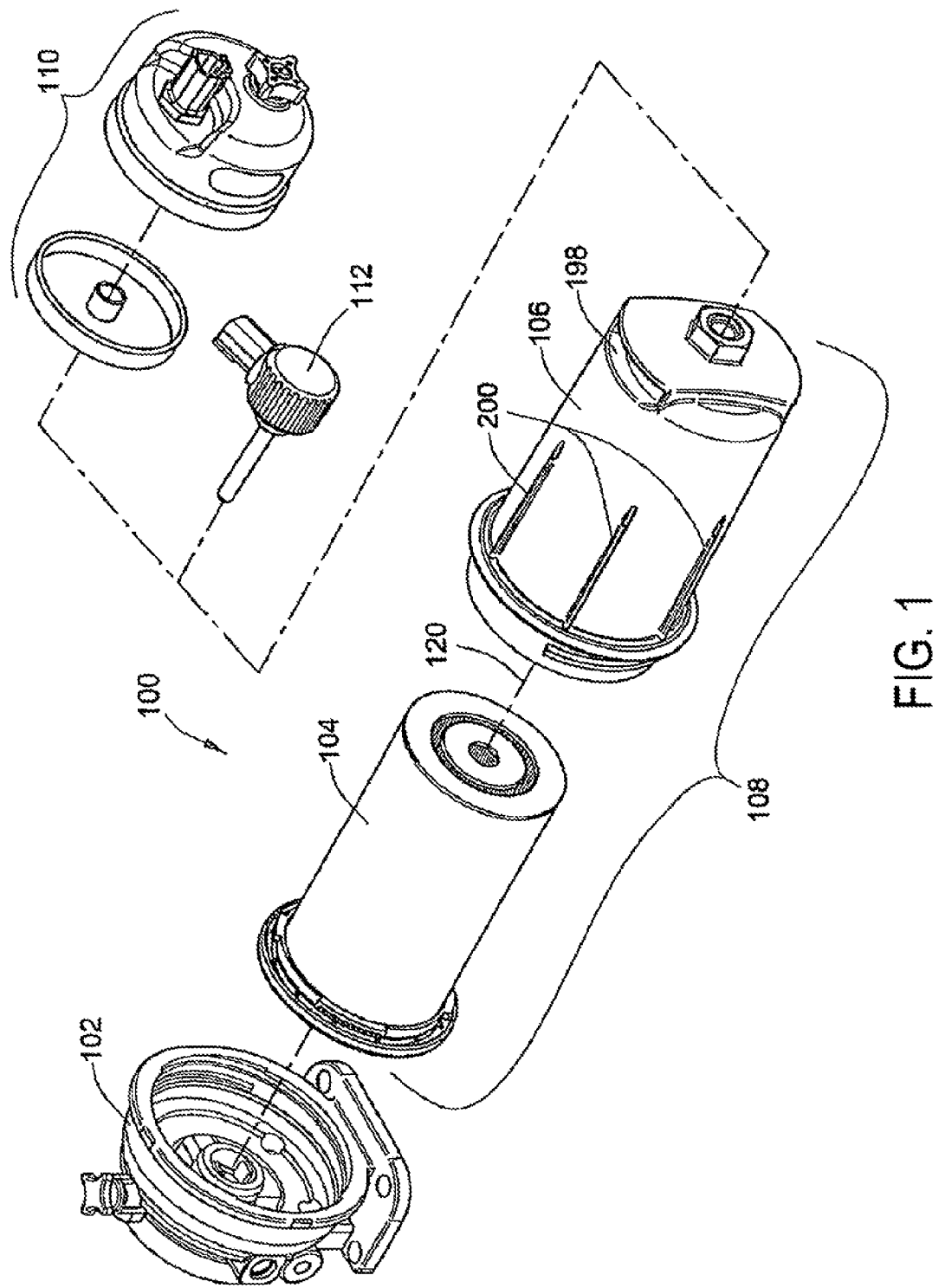
FIG. 1 is an exploded perspective view of an exemplary embodiment of a filter apparatus, according to the invention.
Figure 2:
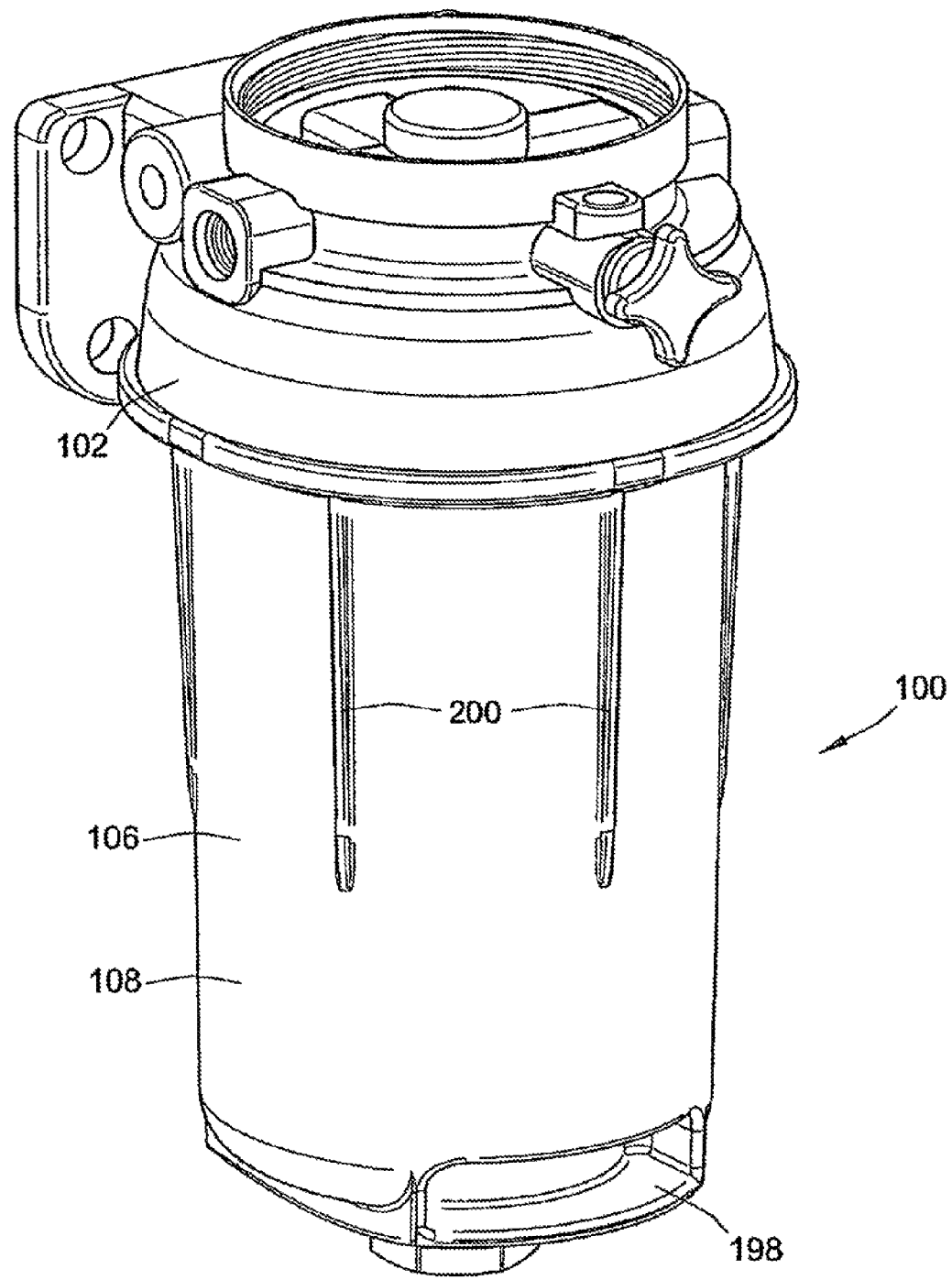
FIG. 2 is a perspective view of the filter apparatus of FIG. 1 assembled and oriented in a "dome down" position.
Figure 3:
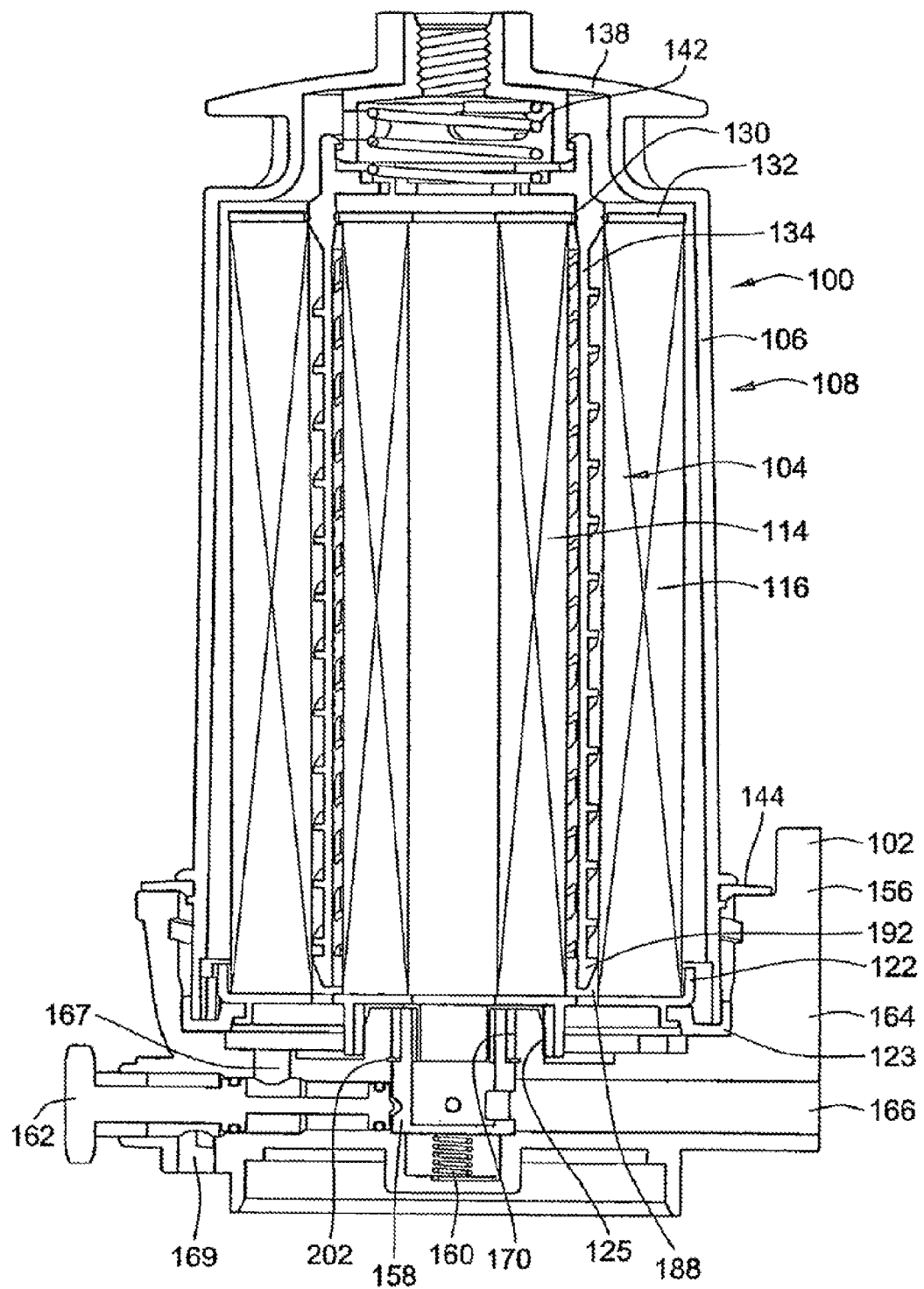
FIG. 3 is an orthographic longitudinal cross-section of the filter apparatus of FIG. 1, assembled and oriented in a "dome up" position.

FIGS. 1-3 show an exemplary embodiment of a filter apparatus 100, according to the invention, including a filter base 5002, a filter element 104, and a filter housing 106. As shown generally in FIG. 1, and described in more detail below, the element 104 and housing 106 are configured to be joined together, to form a filter cartridge 108, which is then sealingly joined to the base 102. A filter apparatus, according to the invention, may also include additional components, such as the fluid pre-heater 112, or the water separator 110 shown in FIG. 1.

As shown in FIGS. 4-8, the filter element 104 includes inner and outer substantially tubular-shaped media packs 114, 116 disposed about a longitudinal axis 118 of the filter element that will be aligned with a longitudinal axis 120 of the exemplary embodiment to the filter apparatus 120, as indicated in FIG. 1. The filter element 104 also includes a first end cap 122, an outer seal 123, an inner seal 125, second end caps 130, 132, and an outer wrapper 136, which will be explained in more detail below.

In one embodiment, the media packs may be formed from pleated filter material, but in other embodiments of the invention, other forms of media may also be utilized in practicing the invention. It will also be noted that, although the inner and outer media packs 114, 116 in the exemplary filter apparatus 100 are substantially annular shaped, and concentrically positioned about the common axis, but in other embodiments of the invention, this need not be the case. In other embodiments of the invention, the media packs may have a tubular shape that are not annular in cross-section, and not necessarily sharing the same axis, such as, the embodiment shown in FIG. 29.

Figure 4:
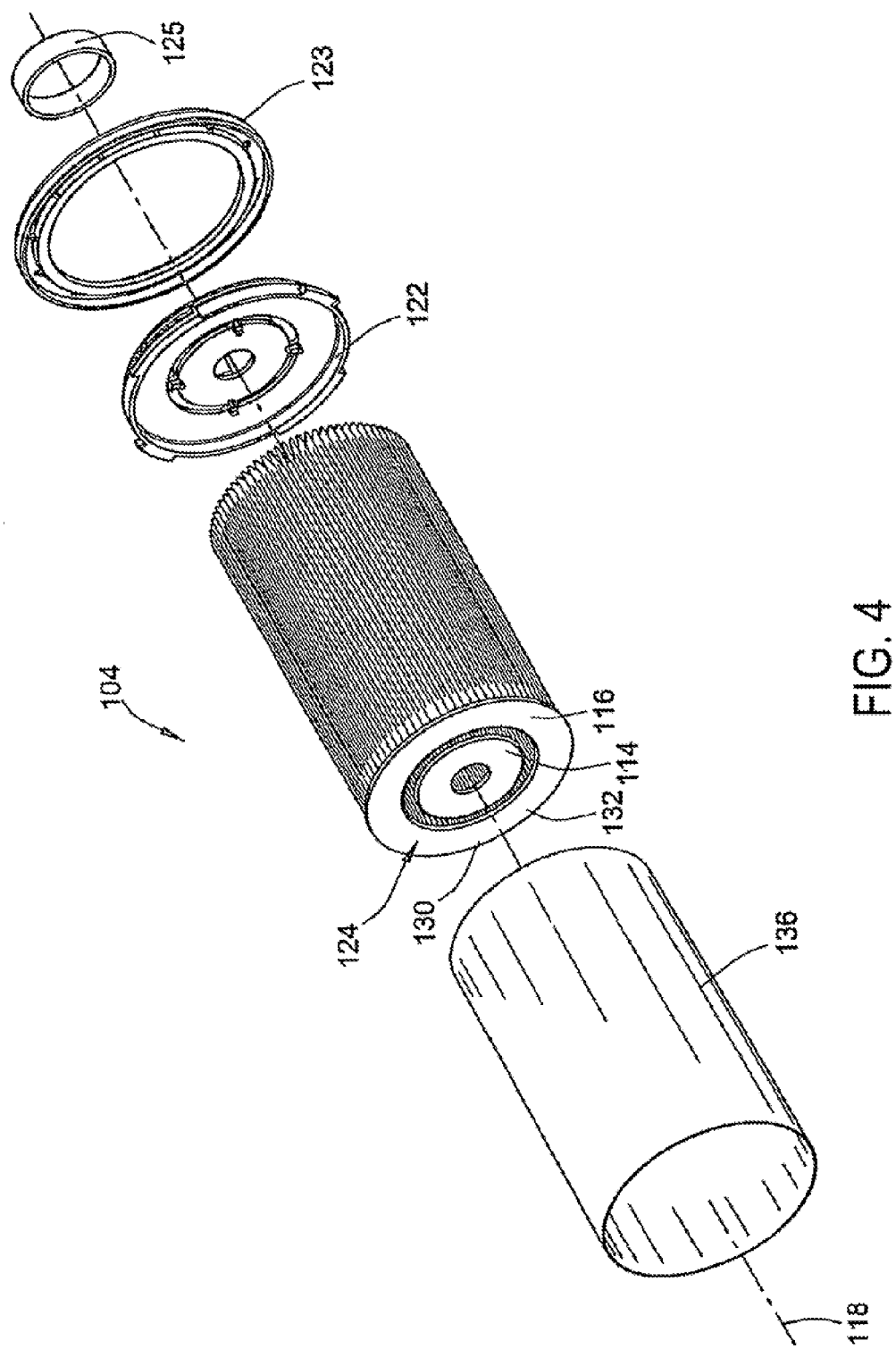

In the exemplary embodiment of the filter element 104, as shown in FIGS. 4-8, one end of each of the inner and outer media packs 114, 116 is potted into the first end cap 122 in a manner defining a fluid flow space 124 between the inner and outer media packs 124, 116 for receiving a flow of fluid directed in a parallel, bi-directional flow pattern through the inner and outer media packs 114, 116, as illustrated in FIG. 4. With this flow pattern, fluid enters the open space in the center of the inner media pack 114 of the filter element 104 through an opening 126 in the center of the first end cap 120, and exits the filter element 104 through the a series of slots 128 in the first end cap 120 that are aligned with the space 124 between the inner and outer media packs 114, 116.

Figure 10:
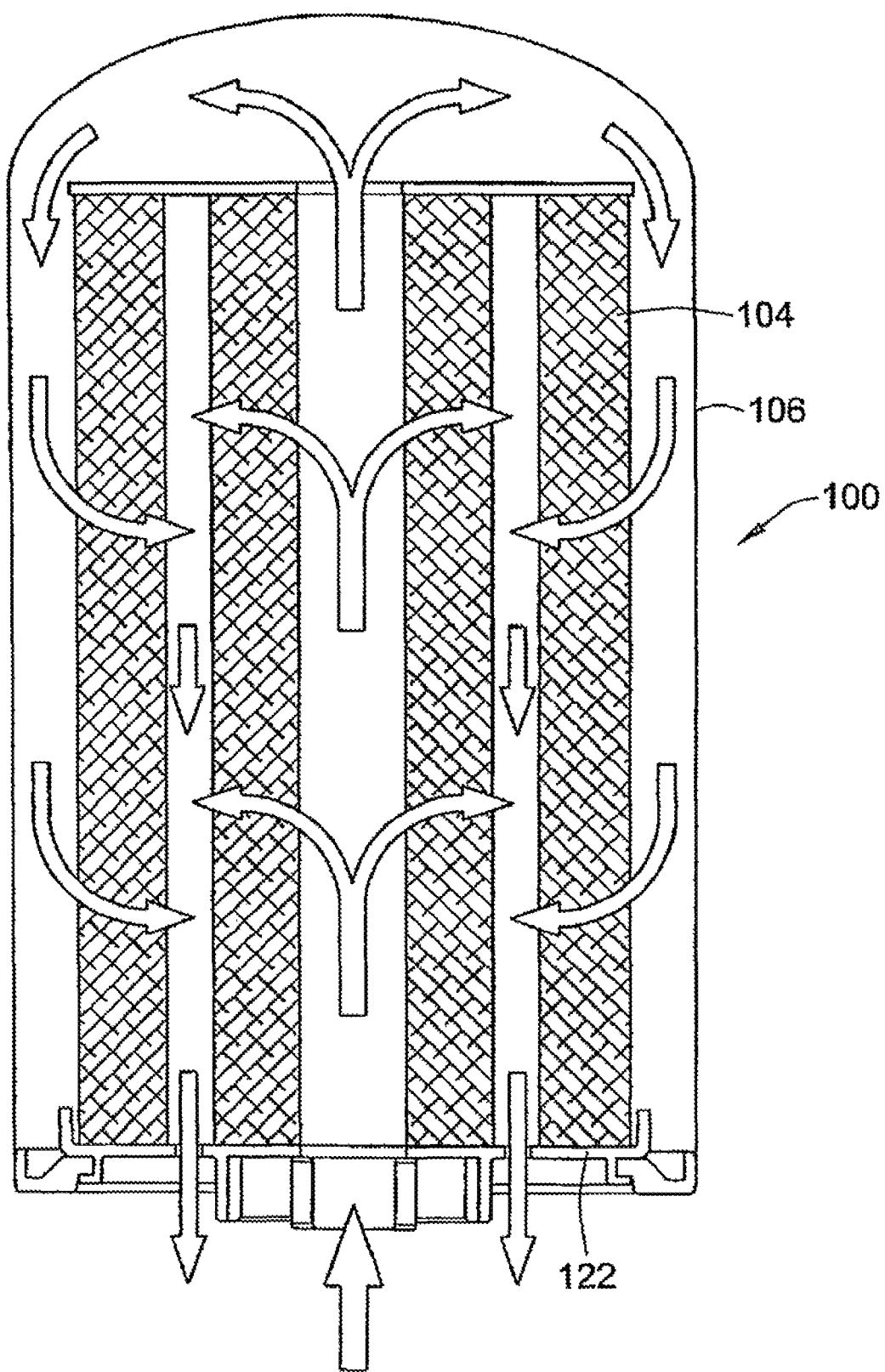
FIGS. 10-11 are schematic illustrations of two potential flow patterns through a filter apparatus according to the invention, with FIG. 10 illustrating the flow pattern in the exemplary embodiment of FIG. 1, and FIG. 11 showing an alternate flow pattern for use in alternate embodiments of the invention.
Figure 11:
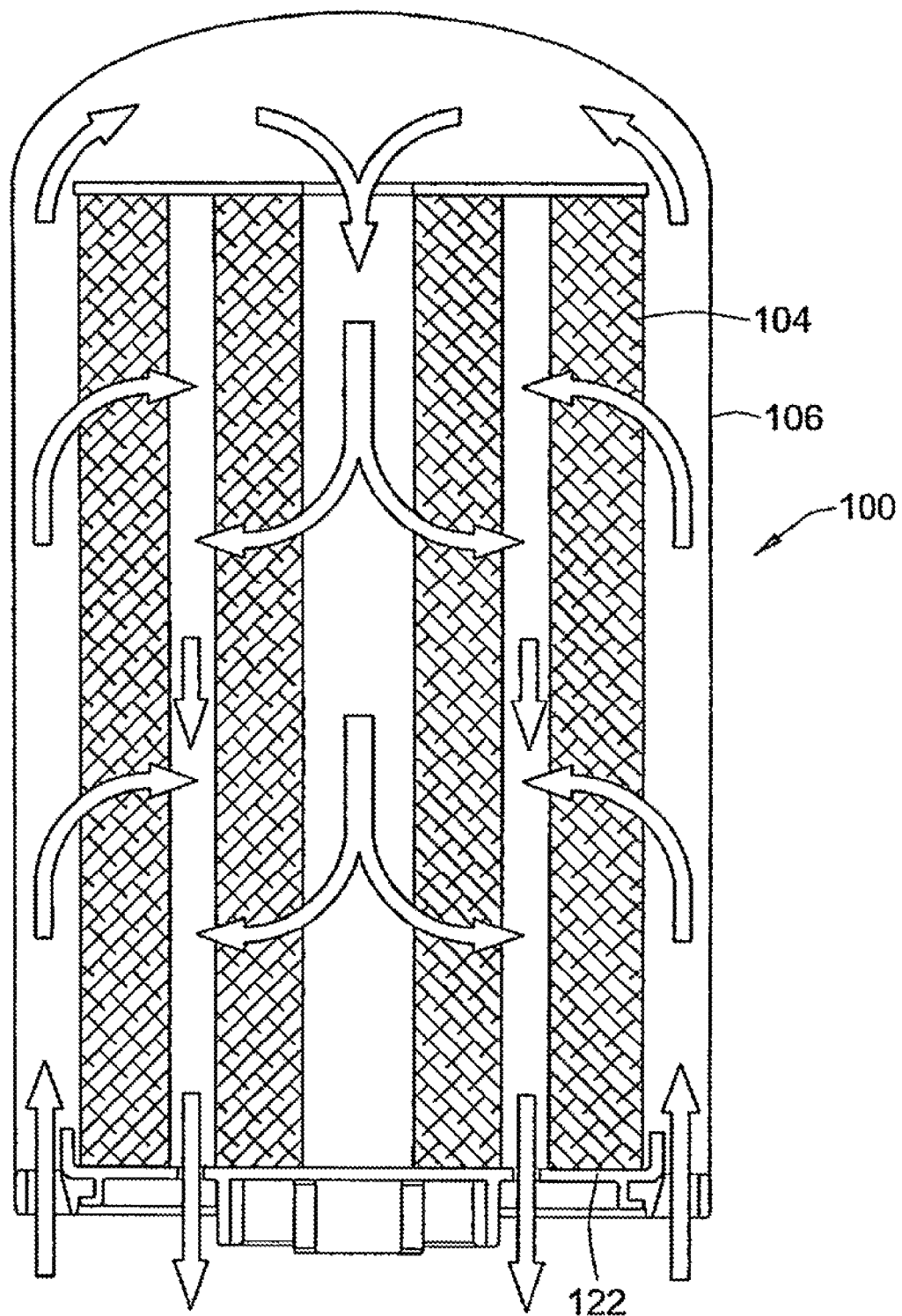

The opposite ends of the inner and outer media packs 114, 116 are blocked by the second end caps 130, 132, which, as shown in FIG. 3, include annular sealing ridges on their outer and inner peripheries, respectively for sealing against an annular-shaped sealing portion of a flow tube 134 of the housing 106. The annular-shaped sealing portion of the flow tube 134 blocks fluid from axially entering the second end (upper end as shown in FIG. 1) of the space 124 between the inner and outer filter medias 114, 116. In other embodiments of the invention, however, such a parallel, bi-directional flow pattern can also be provided by configuring the element and base such that fluid enters the element around its outer periphery and exits through the space between the inner and outer elements, as shown in FIG. 10.

A filter element incorporating a parallel, bi-directional flow pattern, in accordance with the invention, has been shown to provide a substantial increase in filter capacity, within a given volume, as compared to prior fluid filters using conventional flow patterns. Although such a parallel, bi-directional flow pattern will generally be preferred in practicing the invention, it will be understood that the invention may also be practiced with other types of fluid flow patterns through the element.

As shown in FIG. 4, the filter element 104 of the exemplary embodiment also includes a fluid-permeable outer wrapping 136 attached over the outer periphery of the outer media pack 116, to maintain spacing between the pleats of the outer media pack 116. In other embodiments of the invention, other methods of maintaining spacing may be utilized, such as beads of adhesive around the periphery, or sputtered on beads of adhesive on the outer periphery. Where a wrapper is utilized, it may be attached in a number of configurations, some of which are detailed in Attachment 3.

Figure 12:
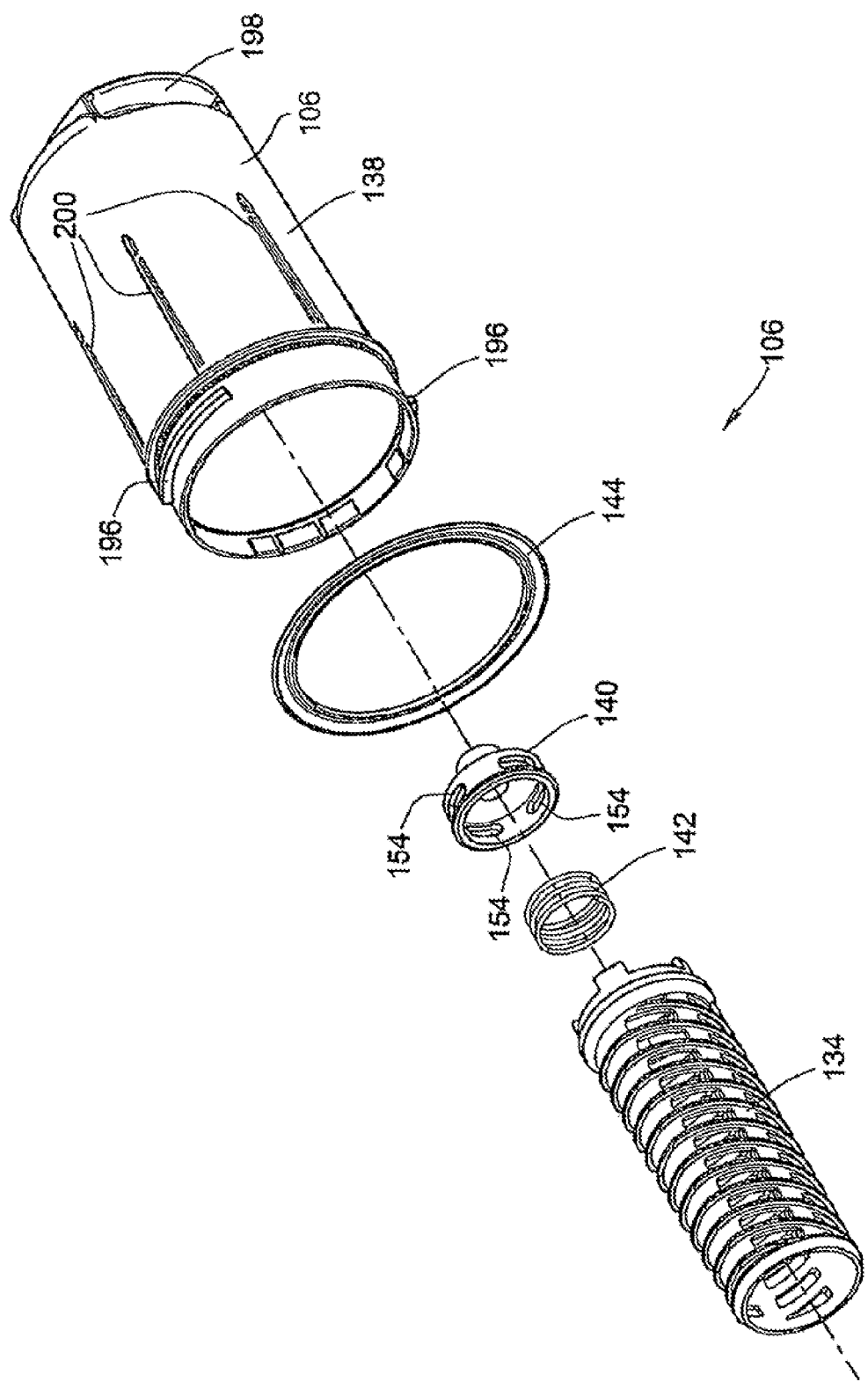
FIGS. 12 and 13 are an exploded perspective view, and an orthographic cross-section, respectively, of a filter housing of the exemplary embodiment of the filter apparatus shown in FIGS. 1-9.
Figure 13:
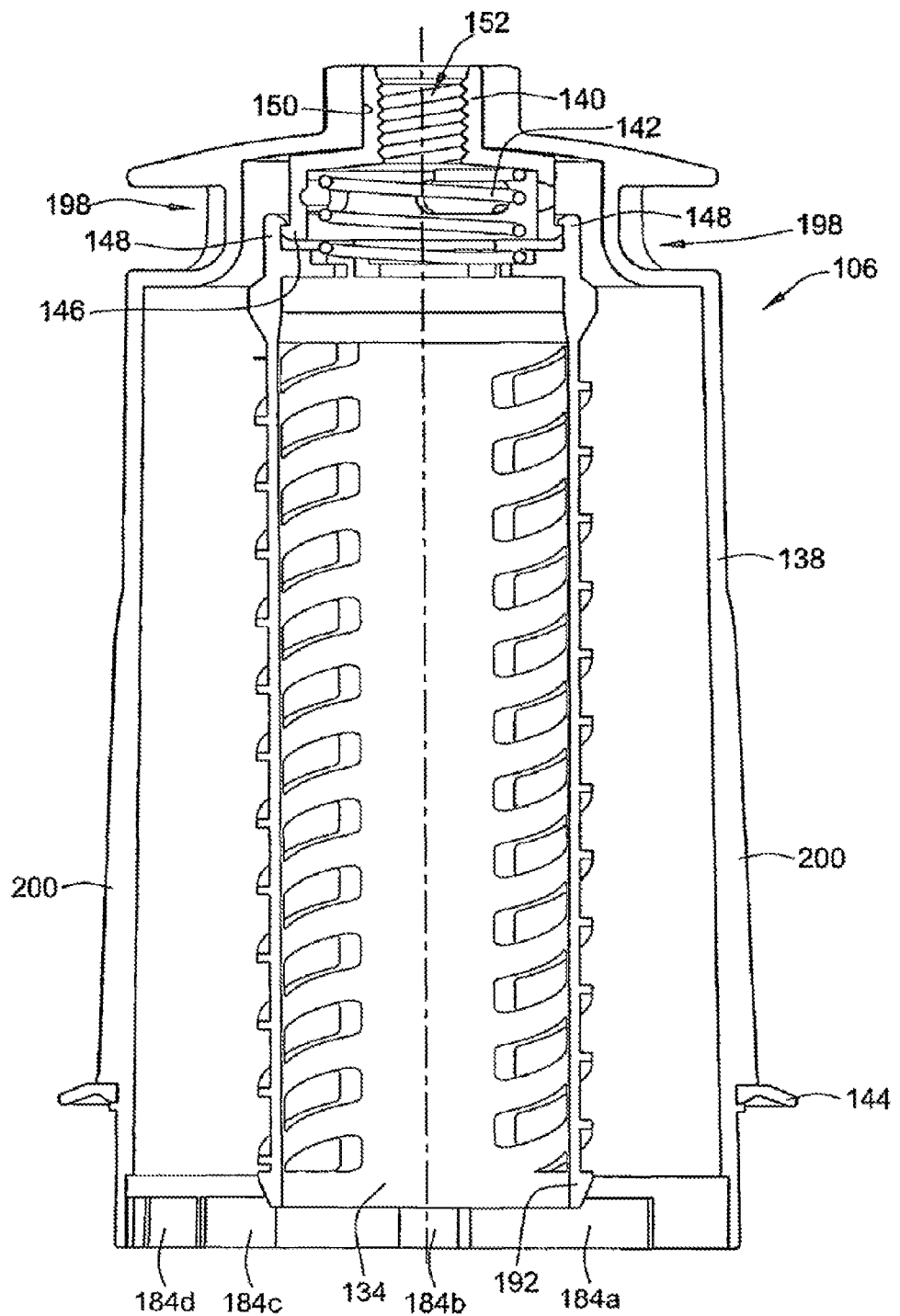
Figure 18:
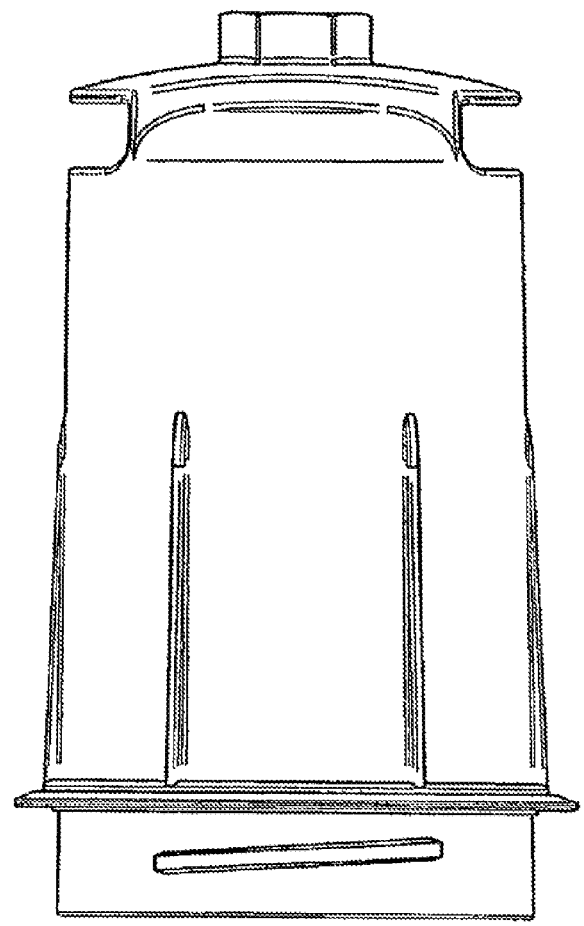
FIGS. 17-22, are external perspective and orthographic views of the housing of the exemplary embodiment of FIGS. 1-3, showing the outside appearance of the housing.
Figure 17:
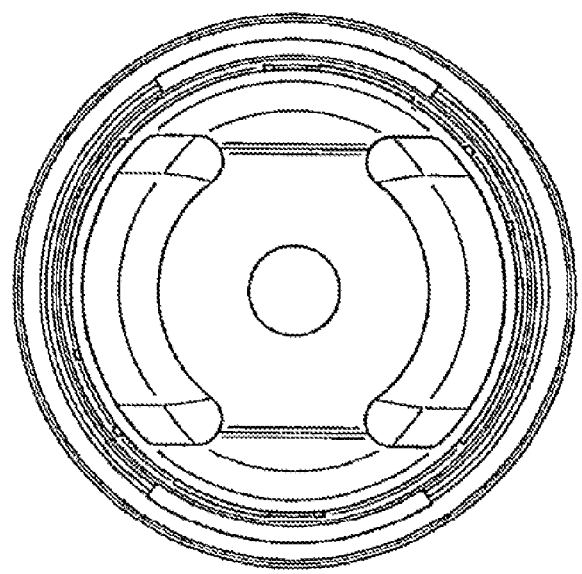
Figure 20:
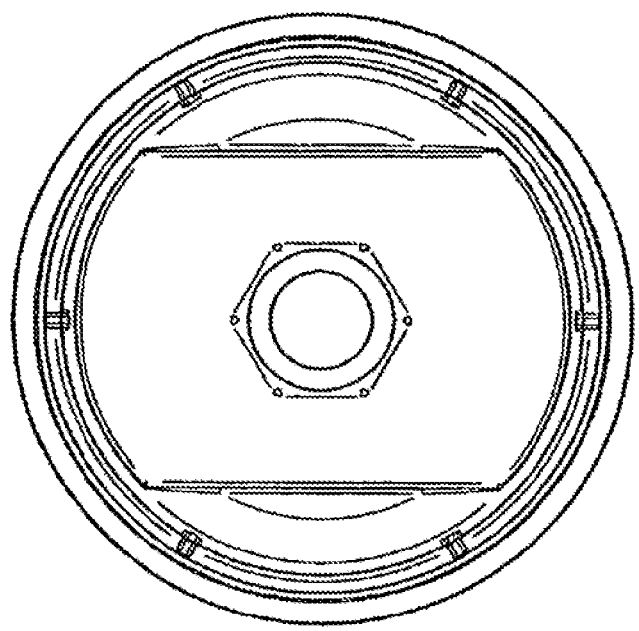
Figure 19:
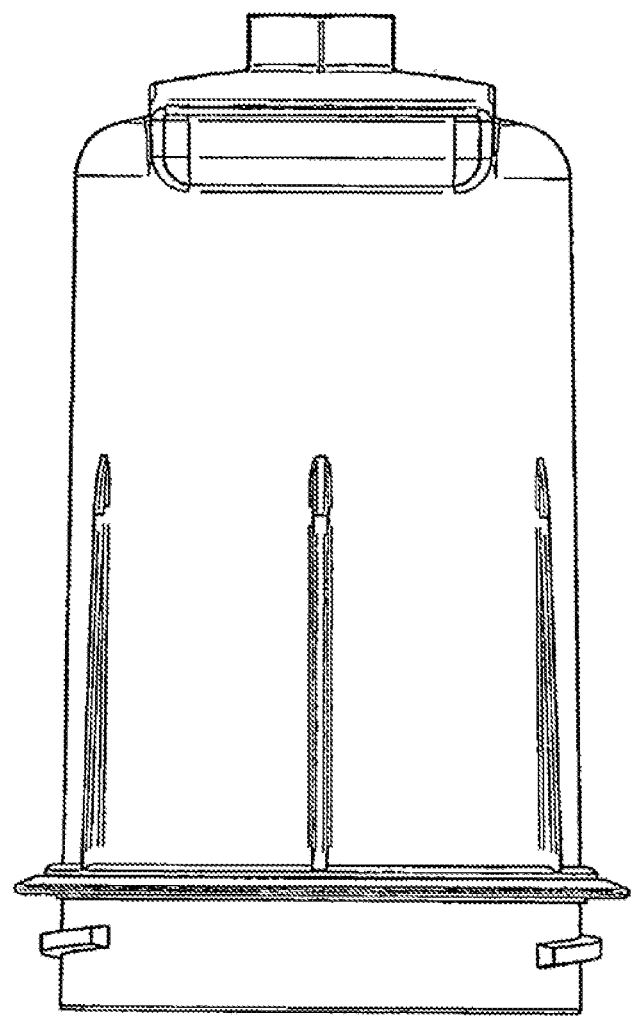
Figure 21:
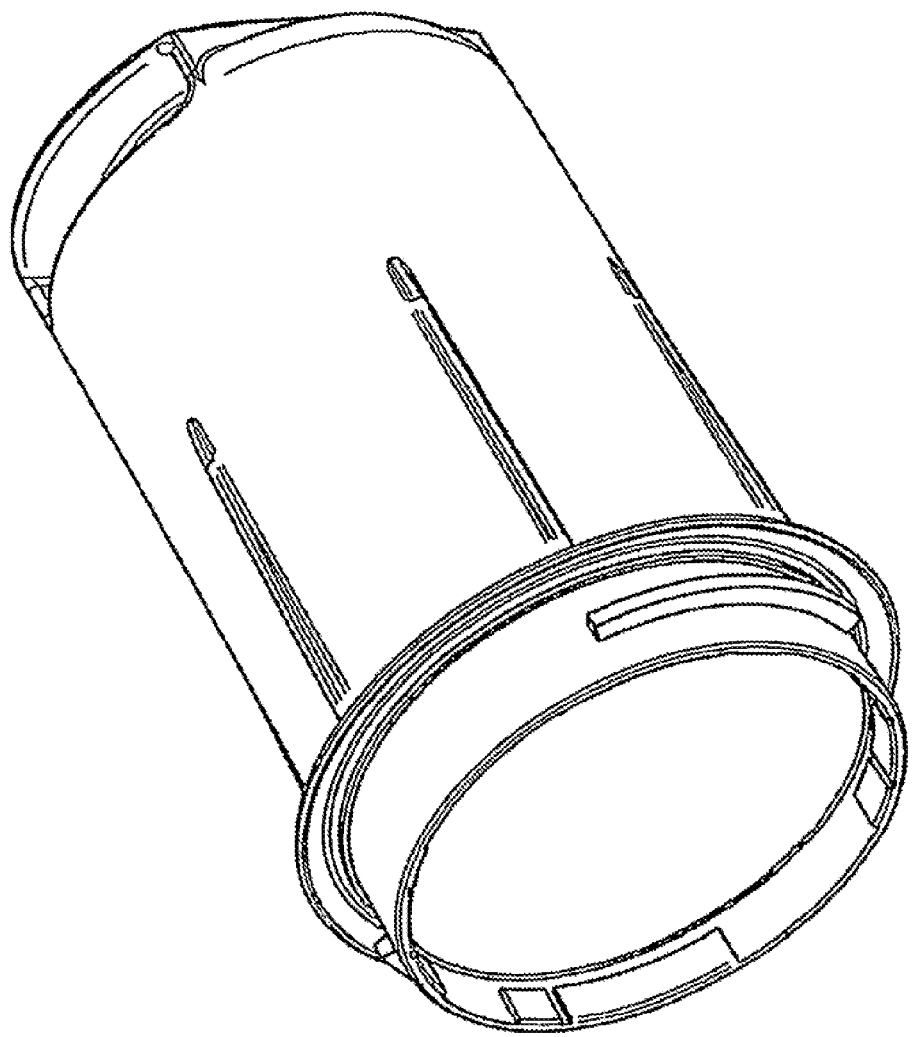
Figure 22:
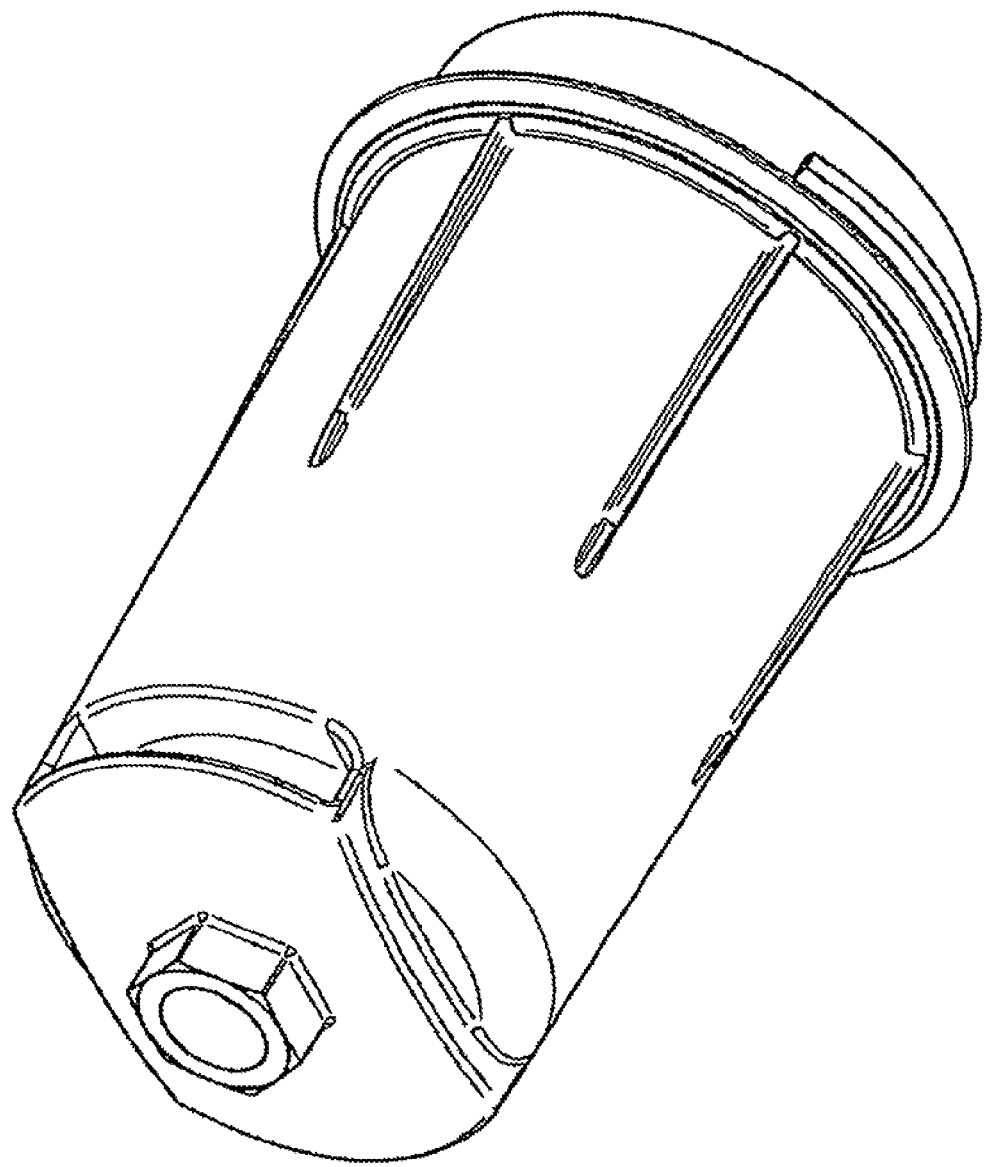

As shown in FIGS. 12 and 13, the housing 106 of the exemplary embodiment of the filter apparatus 100 shown in FIGS. 1-3, includes a dome 138, a flow tube retainer/clip 140, a spring 142, and a ramp seal 144, and the flow tube 134.

As will be understood from FIGS. 3 and 13, the flow tube 134 is configured to fit into the space 124 between the inner and outer media packs 114, 116. In the exemplary embodiment of the filter apparatus 100, the flow tube 134 is attached to the closed end of the dome 138 of the housing 106 with a retainer/clip arrangement, formed by an annular rim 146 on the flow tube retainer 140 in conjunction with several snap action tabs 148 extending from the end of the flow tube 134 that lock over the annular rim 146 of the flow tube retainer 140.

In the exemplary embodiment of the housing 106, the flow tube retainer 140 is a separate structure from the dome 138, which is attached in an opening 150 in the closed end of the dome 138 of the filter housing 104, by an adhesive, welding, brazing, a press fit, or a thread, or other attachment methods appropriate to the materials utilized for forming the dome 138 and retainer 140. In other embodiments of the invention, however, the retainer 140 and/or the rim 146 may be formed integrally with the remainder of the dome 138. The retainer 140 of the exemplary embodiment also includes a threaded port 152 therein, for attachment of a threaded plug, or accessories such as a heater, a water separator device, etc. As best seen in FIG. 12, the retainer 140 also includes a plurality of flow slots 154 for facilitating fluid flow into, or out of, the inner media pack 114 at the closed end of the dome 138.

The spring 142 is a helical-wound compression spring, in the exemplary embodiment. Mating ends of the flow tube 134 and the retainer 140 are configured to provide spring seats for capturing the spring 142, in such a manner that the spring 142 urges the flow tube 134 to move in a direction away from the retainer 140. The snap action tabs 148 of the flow tube 134 are of such a length that the spring 142 holds the remainder of the flow tube 134 at a fixed distance away from the retainer 140, but allowing the spring 142 to be compressed, so that the flow tube 134 can move a short distance toward the retainer 140, when sufficient force is applied to the opposite end of the flow tube 134 to overcome the force of generated by the spring 142.

Figure 23:
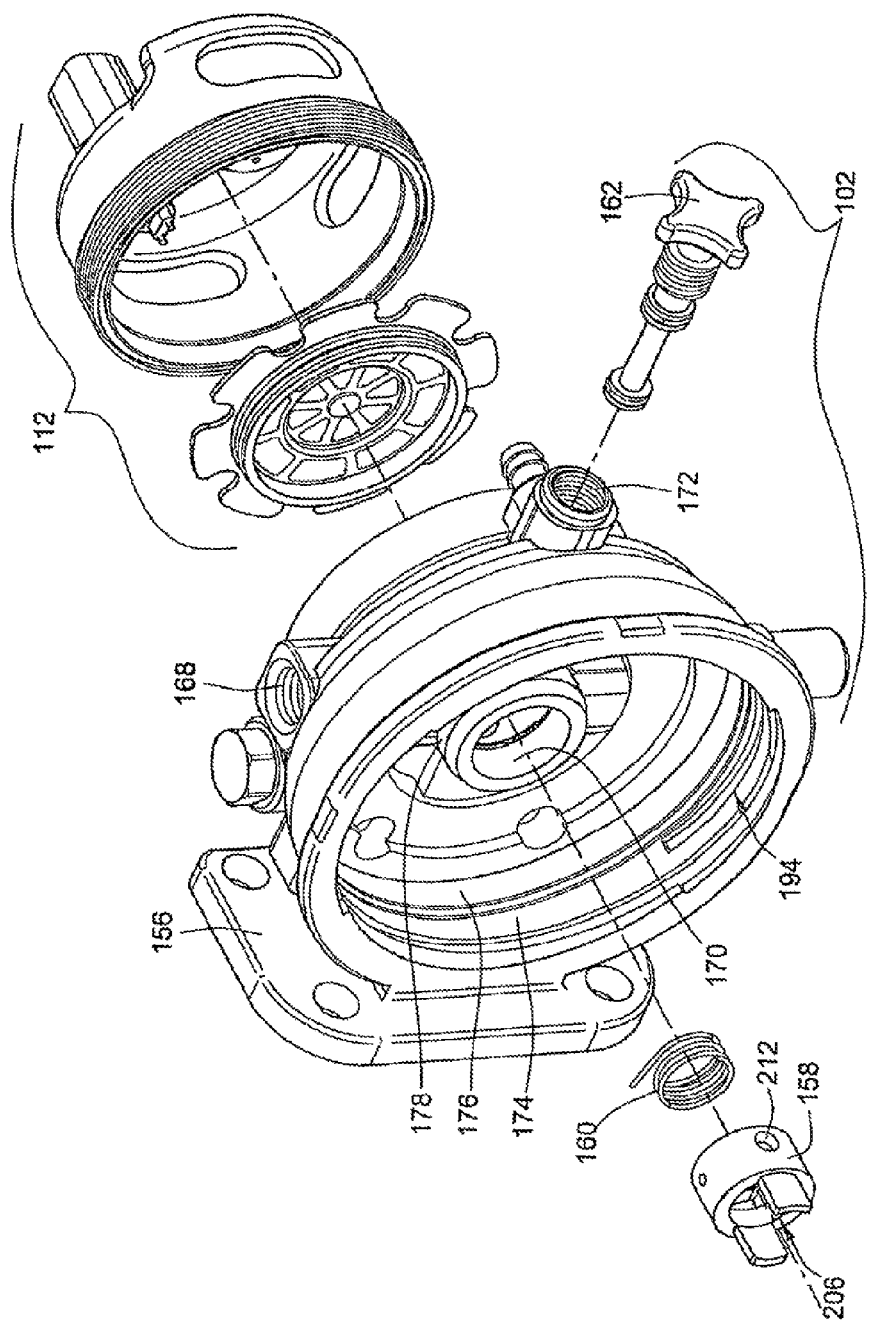
FIG. 23 is a perspective view of a filter base of the exemplary embodiment of FIGS. 1-3.

As shown in FIGS. 3 and 23, the base 102, of the exemplary embodiment of the filter apparatus 100, may include a block 156, a flow control valve 158, a torsion spring 160, and a drain valve 162. The block 156 defines a mounting flange 164 for mounting the filter apparatus 100 on a structure, such as the engine block of an engine. The block 156 also defines an inlet port 166, an outlet passage 167 connected to an outlet port 168, a drain/vent port 169, and receptacles 170, 172 for the rotating flow control valve 158 and the drain valve 162 respectively. The block 156 of the base 102 further defines an integral collar 174 for receiving and retaining the housing 104, and first and second sealing surfaces 176, 178, all of which are described in more detail below.

Figure 5:
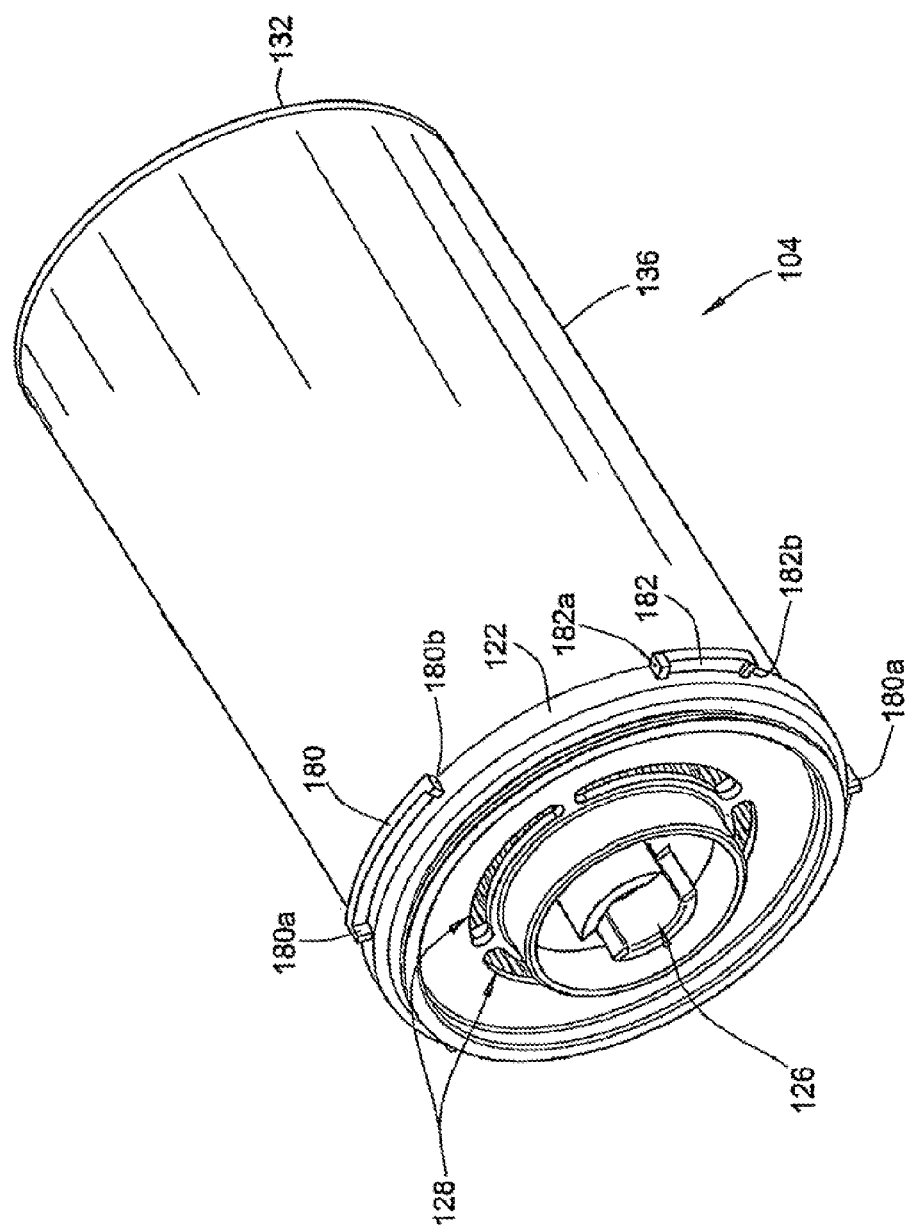

As best seen in FIGS. 5-7, the first end cap 122 of the element 104 includes a series of long and short keys 180, 182, extending partially around the outer periphery of the first end cap 122, and having axially extending locking tabs 180*a*, 180*b*, 182*a*, 182*b* attached to opposite ends of the long and short keys 180, 182. As shown in FIGS. 12 and 13, the inner surface of the dome 138, adjacent the open end of the dome 138, is configured to provide complimentary keys 184*a*-184*e* that are spaced and configured to define a complimentary mating structure for receiving the long and short keys 180, 182 of the first end cap 122 of the filter element 104, and the locking tabs 180*a*, 180*b*, 182*a*, 182*b* of the long and short keys 180, 182 of the first end cap 122.

As best seen in FIGS. 3 and 7, the inside surface of the first end cap 122 of the filter element also includes a plurality of castellated mounting buttons 188, each having a slot 190 in the distal end thereof for receiving the distal end 192 of the flow tube 134, when the element 104 is inserted into the dome 138.

The manner in which the element 104 is installed into the housing 106 to form the filter cartridge 108 is illustrated in FIGS. 14-16, which are roll-out views of the mating keys 180, 182, 184*a*-*d* of the first end cap 122 of the filter element 104 and the open end of the dome 138 of the housing 106. As shown in FIG. 14, the inner surface of the open end of the dome 138 includes a series of keys 184*a*-184*e*, of various sizes and spacings specifically configured to provide a sequence of long and intermediate openings 186*a*, 186*b*, with which the long and short keys 180, 182 respectively of the first end cap 122 of the filter element 104 must be aligned, in order for the element 104 to be inserted into the housing 106. The keys 184*a*-184*e* are further configured and spaced to provide a series of short slots 186*c* for receiving the locking tabs 180*a*-*b*, 182*a*-*b*, on the long and short keys of the first end cap 122.

As will be understood by examining FIGS. 14 through 16 in sequence, as the element 104 first enters the open end of the housing 106, the distal end 192 of the flow tube 134 is inserted into the space 124 between the inner and outer media packs 114, 116 of the filter element 104. As the element 104 is moved axially into the housing 106, the filter is rotated to align the long and short keys 180, 182 of the first end cap 122 of the filter element 104 with the long and intermediate spaces 186*a*, 186*b* of the dome 138, as shown in FIG. 12, in order to allow the element 104 to be inserted into the dome 138.

As the element 104 is inserted axially further into the dome 138, the distal end 192 of the flow tube 134 engages the slots 190 in the mounting buttons 188 of the first end cap 122, and the spring 142 in the housing 108 is compressed, allowing the element 104 to enter the dome 138, as shown in FIG. 15, with the keys 180, 182 in the end cap 122 aligned with long and intermediated length slots 166*a*, 186*b* of the dome 138. As shown in FIG. 16, the element 104 is then rotated to properly align the locking tabs 180*a*-*b*, 182*a*-*b* of the long and short keys with corresponding slots 186*a*, 186*c* in the dome, and axial pressure on the element 104 is released, to allow the spring 144 to push the long and short keys 180, 182 and locking tabs 180*a*-*b*, 182*a*-*b* of the first end cap 122 into seating engagement with the keys 184*a*-*e* and slots 186*a*-*c* of the dome 138, to thereby fixedly attach the element 104 to the housing 106.

In embodiments of the invention where it is desired to have the element 104 permanently attached to the housing 106, the element 104 may be secured to the housing 106 by an adhesive or other attachment methods appropriate for the materials selected for the element 104 and the housing 106. In some such embodiments, the complexity of the keying arrangements described above may be dispensed, in favor of other methods of attaching the element 104 to the housing 106, or leaving the housing 106 separate from the element 104.

It is contemplated, however, that generally it will be desirable in practicing the invention to have the element 104 and housing 106 joined with an arrangement, such as the locking keyed structure described above in relation to the exemplary embodiment of the filter apparatus 100, so that the element 104 may be replaced and the housing 106 reused, by first removing the spent element, by performing the steps described in relation to FIGS. 14-16 in reverse order, and then installing a replacement element 104 in the manner described above in relation to FIGS. 14-16.

Once the filter element is installed into the housing 106 to form the filter cartridge 108, the cartridge 108 is installed into the integral collar 174 of the base 102. Specifically, as shown in FIGS. 12, and 23, the inner surface of the integral collar 174 of the base 102 includes a series of ramp-like structures 194, which are engaged by complimentary ramps 196 formed on the outside of the dome 138, adjacent the open end of the dome 138. As shown in FIGS. 24-26, the ramp-like structures 194 and ramps 196 are configured to include keying and stops so that the housing 108 can only be fitted axially into the integrated collar 174 when the keying features on the ramps 196 of the housing 108, and the ramp-like structures 194 of the base 102 are correctly aligned with one another. After the housing 108 has been properly aligned and inserted axially into the base 102, the housing 108 is rotated with respect to the base 102 to bring the stops on the ramps 196 and ramp-like structures 194 into contact with one another, to thereby ensure a predetermined relative alignment of the housing 108 to the base 102.

Figure 8:
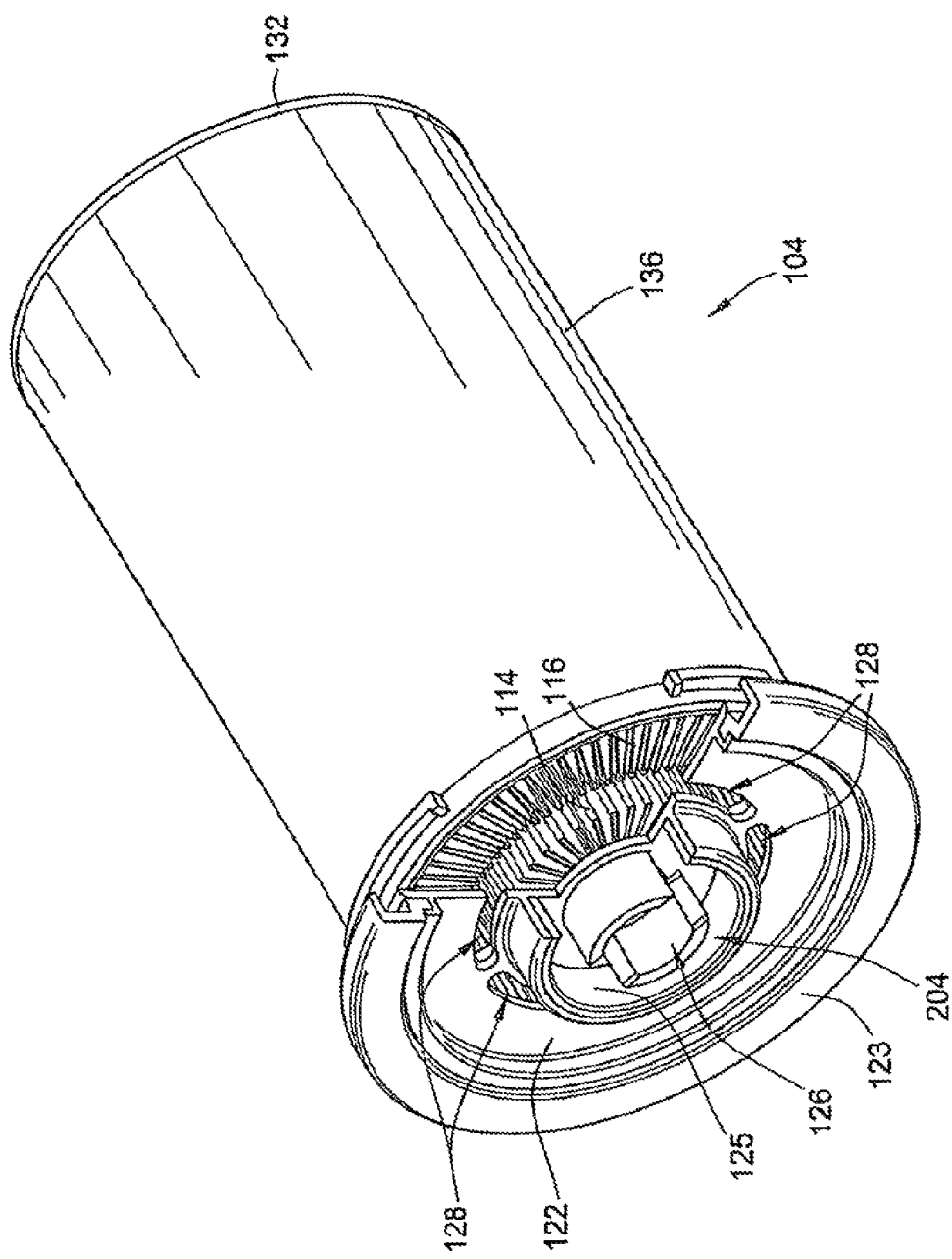
Figure 9:
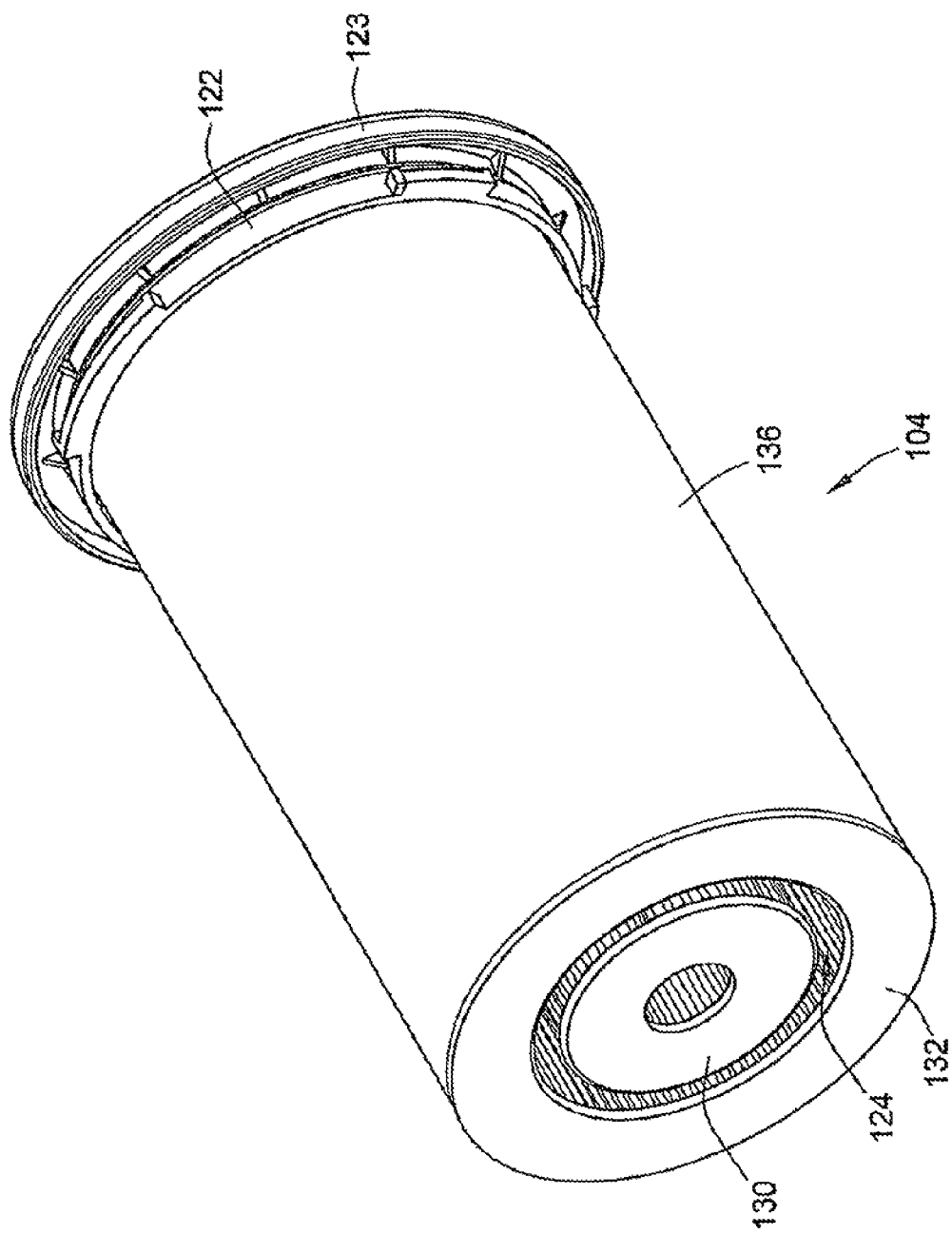

As shown in FIG. 8, the filter element 104 of the exemplary embodiment includes an outer seal 123 and an inner seal 125 attached to the first end cap 122. As shown in FIG. 3, the outer seal 123 wraps around the outer end of the dome 138 of the housing 108, when the element 104 is properly installed in the housing 108. As will be understood from FIGS. 3 and 23, the outer and inner seals 123, 125, respectively, form seals between the element 104 and the first and second sealing surfaces 176, 178 of the base 102, when the cartridge 108 is properly locked into the base 102.

Those having skill in the art will recognize, that in the exemplary embodiment of the filter apparatus 100, by virtue of the coordinated keying of the base 102, element 104, and housing 106, the ramps 196 and ramp like structures 194, in conjunction with the axially extending keyed structures 204, 206 form a first set of complimentary keyed, structures for attaching the filter element 104 to the base 102 in a particular rotational alignment of the filter element 104 with the base 102. Those skilled in the art will further recognize that in the exemplary embodiment of the filter apparatus 100, the complimentary keying of the element 104, and housing 106 form a second set of complimentary keyed, structures for attaching the filter element 104 to the housing 106 in a particular rotational alignment of the filter element 104 with the housing 102.

In the exemplary embodiment of the filter apparatus 100, as shown in FIGS. 3 and 12, the housing 106 includes an integral ramp seal 144, for covering and closing the juncture of the base 102 and the housing 106, when the cartridge 108 is locked into the base 102, to preclude dirt, water or other foreign matter from entering the space occupied by the ramps 196 and ramp-like structures 194. The housing 106 of the exemplary embodiment also includes handles 198 and ribs 200 positioned to facilitate tool-less removal of the cartridge 108 from the base 102. As shown in FIGS. 18-22, the handles 198 and ribs 200, and other features of the housing 106 of the exemplary embodiment have been selected to provided a pleasing aesthetic appearance. Those skilled in the art will recognize that in other embodiments of the invention, such features may or may not be included, and may have appearances different from the ones depicted herein.

The exemplary embodiment of the filter apparatus 100, of the invention, may also include an automatic valve for blocking or restricting fluid from flowing into the element 104, or from the inlet port 166 when the cartridge 108 is not properly secured in the base 102. Specifically, the valve may include the valve 158, and torsion spring 160, secured in the receptacle 170 of the base 102, by a snap ring 202, as shown in FIGS. 3, 23, 27, and 28. As shown in FIGS. 5, 23, 27 and 28, the first end cap 122 of the filter element 104, and the valve 158 include complementary axially extending keyed structures 204, 206 which are sized and oriented so that they must properly mate with one another for the filter element 104 to be inserted in to the filter base 102 in the manner indicated by the step shown in FIG. 24. As the filter element 104 is rotated into place, in the manner shown in FIGS. 25 and 26, the complimentary axially extending keyed structures 204 of the filter element 104 rotate the valve from the closed position, shown in FIG. 27, to the open position shown in FIG. 28, so that fluid can flow from the inlet passage 166 into the filter element 104.

Figure 28:
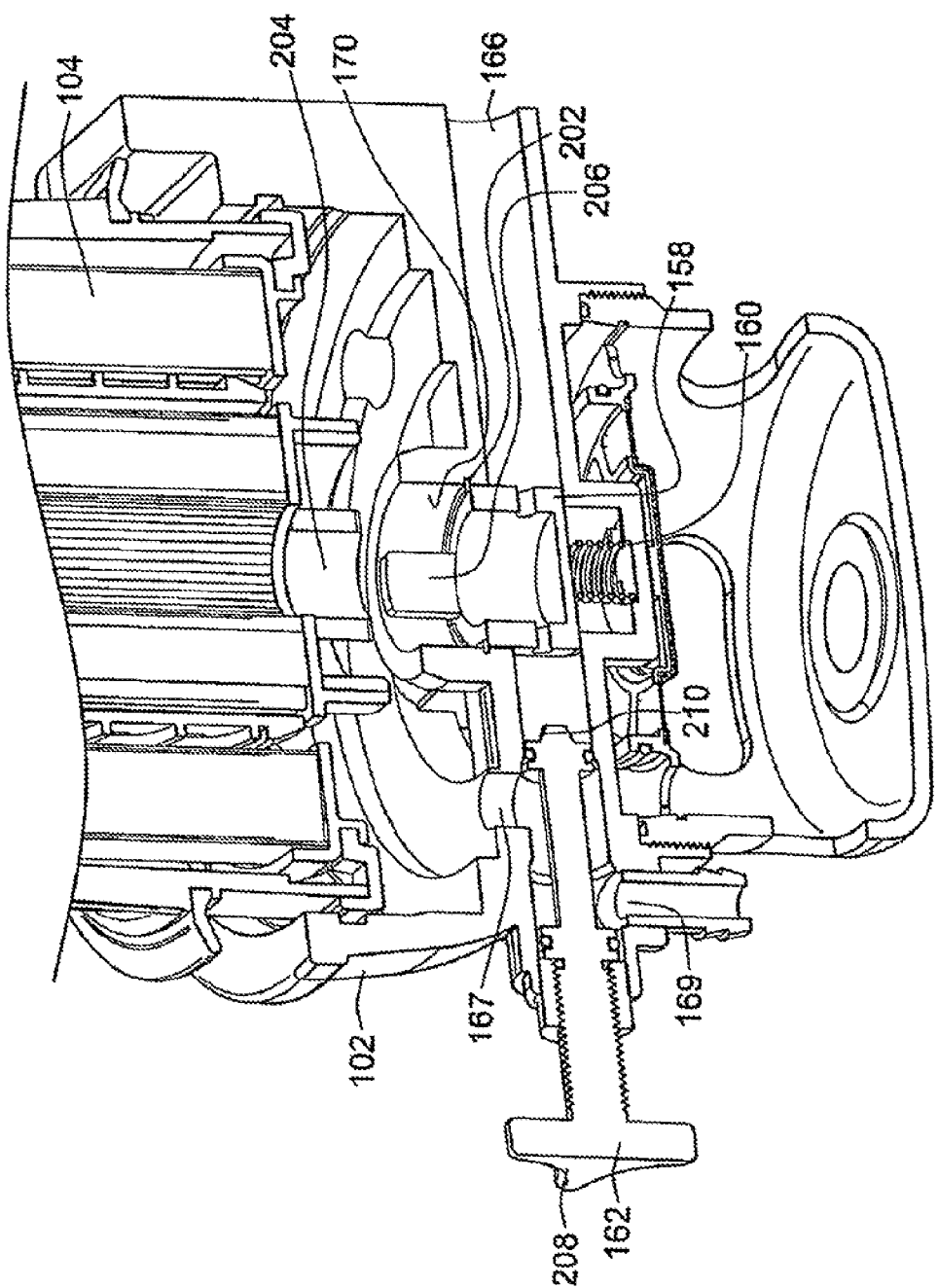

As shown in FIGS. 27 and 28, the drain/vent valve 162 on the exemplary embodiment of the filter apparatus 100, according to the invention, may serve two functions. The drain/vent valve 162 is a two position, manually operable, shuttling spool valve, having an exposed handle 206 at one end for moving the drain/vent valve from a first position, as shown in FIG. 27, to a second position as shown in FIG. 28. The second end of the drain/vent valve includes a conical shaped locking pin 210, for engaging a complimentary recess 212 in the valve 158.

In the first position, the drain/vent valve 162 blocks air or fluid from flowing between the outlet passage 167 and the drain/vent port 169, and the conical shaped locking pin 210 is positioned within the complimentary locking recess 212 in the valve 158. Those having skill in the art will recognize that, by virtue of the structure described above, when the locking pin 210 of the drain/vent valve 162 is engaging the complimentary locking recess in the valve 158, not only is the valve 158 locked in the open position, but also, the entire cartridge 108 is locked against rotation, by the locking pin 210 and recess 212, to preclude loosening of the cartridge, under the forces of vibration, for example.

In the second position, as shown in FIG. 28, the drain/vent valve 162 allows air or fluid to flow between the outlet passage 167 and the drain/vent port 169, so that the element 104 can be drained, and the conical shaped locking pin 210 is disengaged from the complimentary locking recess 212 in the valve 158. Those having skill in the art will recognize that, by virtue of the structure described above, when the locking pin 210 of the drain/vent valve 162 is disengaged from the complimentary locking recess 212 in the valve 158, the filter cartridge 108 and valve 158 are free to rotate, so the filter cartridge 108 can be disengaged from the base 102. As the filter cartridge 108 is rotated, the axially extending keyed projections 204, 206 of the first end cap 122 will rotate the valve 158 toward its closed position, until the axially extending keyed projections 204, 206 disengage due to axial movement of the cartridge 108 with respect to the base 102, caused by the ramps 196 and ramp-like structures 194. At the point of disengagement of the axially extending keyed projections 204, 206 of the first end cap 122 and valve 158, the torsion spring 160 will urge the valve to rotate further to the closed position of the valve 158, as shown in FIG. 28.

In embodiments of the invention utilizing a dome up orientation, as shown in FIGS. 3, 27 and 28, the drain/vent valve 162 functions as a drain. In dome down orientation, as shown in FIG. 2, the drain/vent valve functions as an air vent, to allow fluid to drain from the element 104 through the opening 152 in the closed end of the dome 138 of the housing 108.

Figure 29:
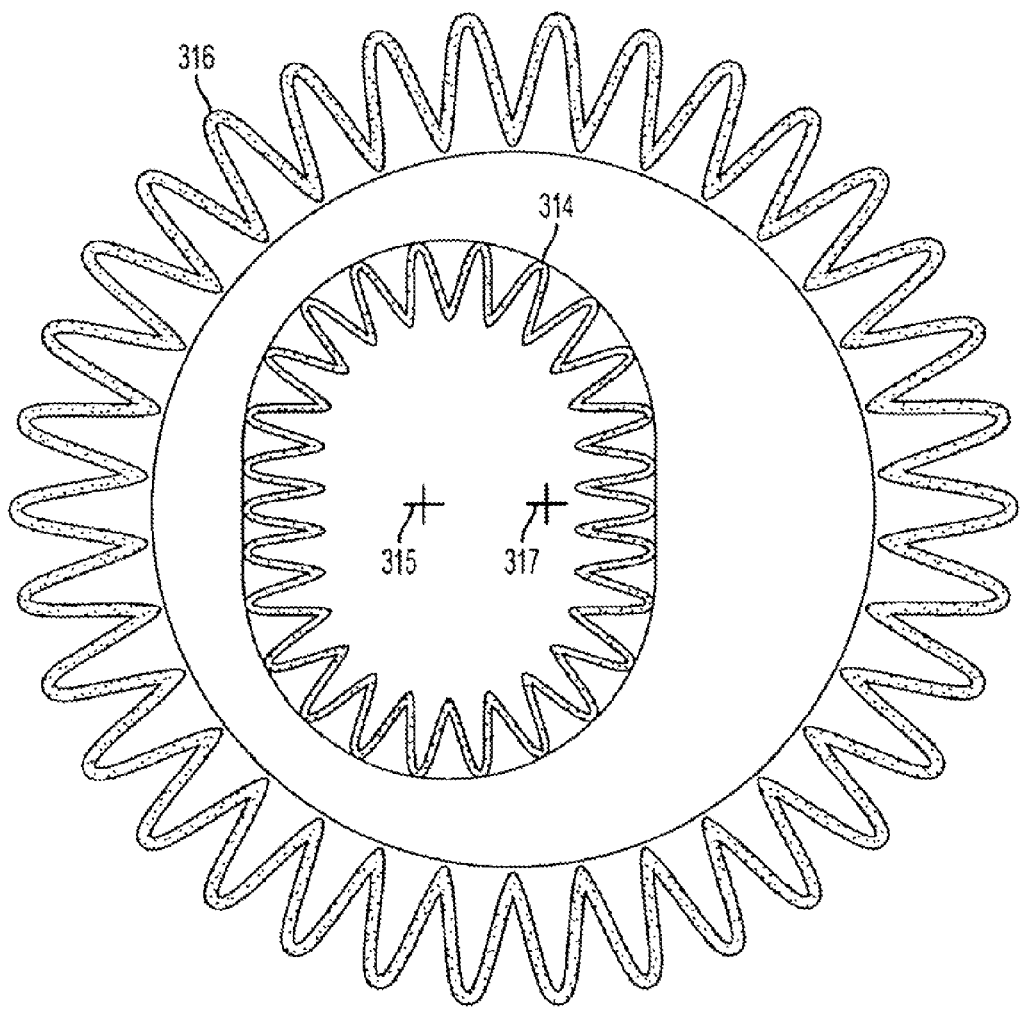
FIG. 29 is a cross-sectional view of another embodiment of the filter apparatus wherein the media packs are not concentric.

In other embodiments of the filter apparatus, the filter packs may not be concentric and the filter packs may not be annular. Referring to FIG. 29, the outer media pack 316 may have an axis 317. The inner media pack 314 may have an axis 315. In this embodiment, the axis 315 is not aligned with axis 317. In addition, the inner media pack 314 is oval in cross-section. In other embodiments, the inner media pack and the outer media pack may have other shapes in cross-section, such as polygons, i.e. triangular, rectangular, square, pentagon, hexagon or other shapes. These configurations may be used with any of the embodiments disclosed herein, as appropriate.

Figure 30:
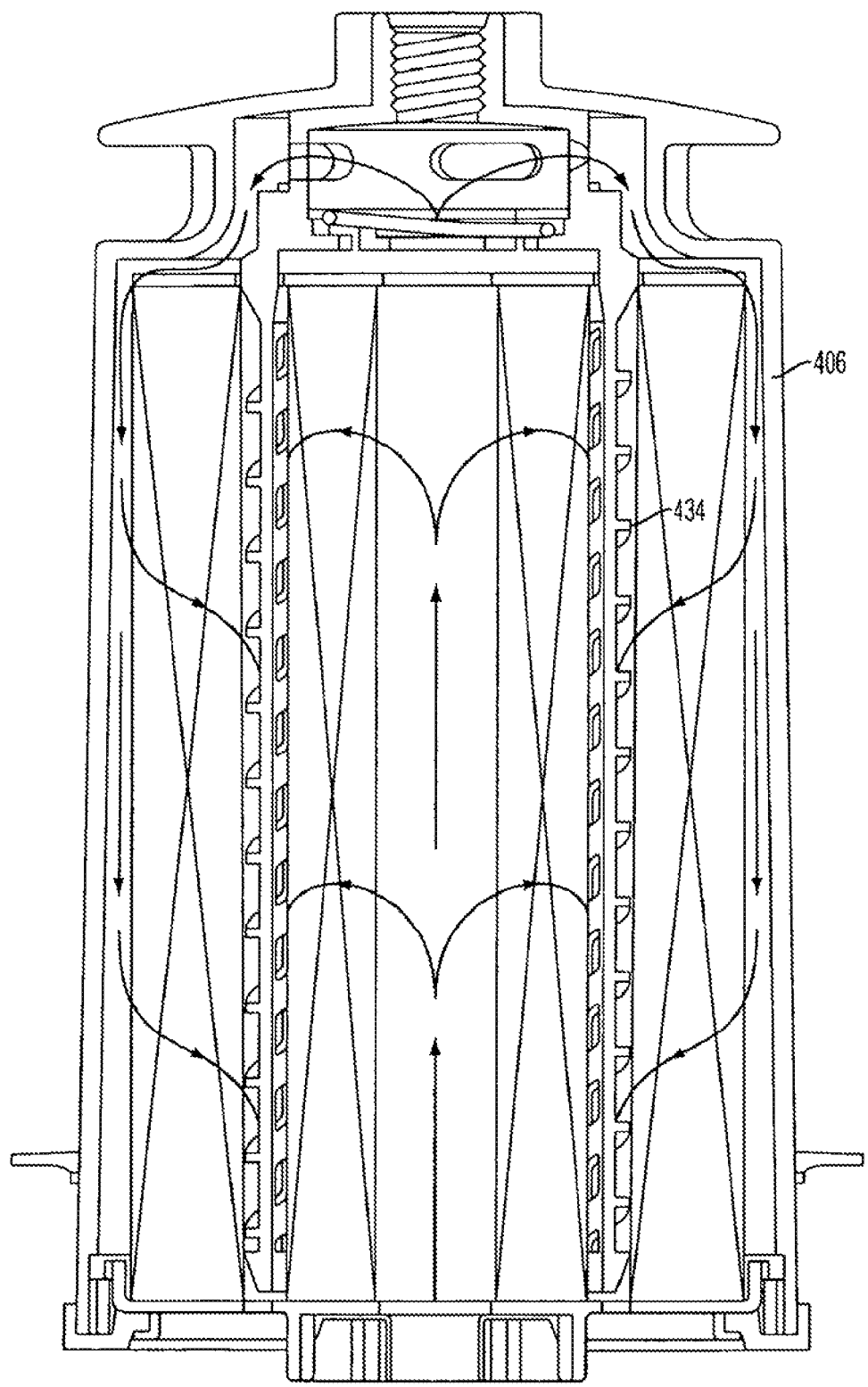
FIG. 30 is a cross-sectional view of another embodiment of the filter apparatus where the flow tube is permanently attached to the housing.

The center tube may be permanently attached to the housing. Referring to FIG. 30, in this embodiment, the flow tube 434 may be permanently attached to the filter housing 406. The flow tube may be attached by a snap fit, welding, threaded connection or press fit. The configuration may be used with any of the embodiments disclosed herein, as appropriate.

Figure 31:
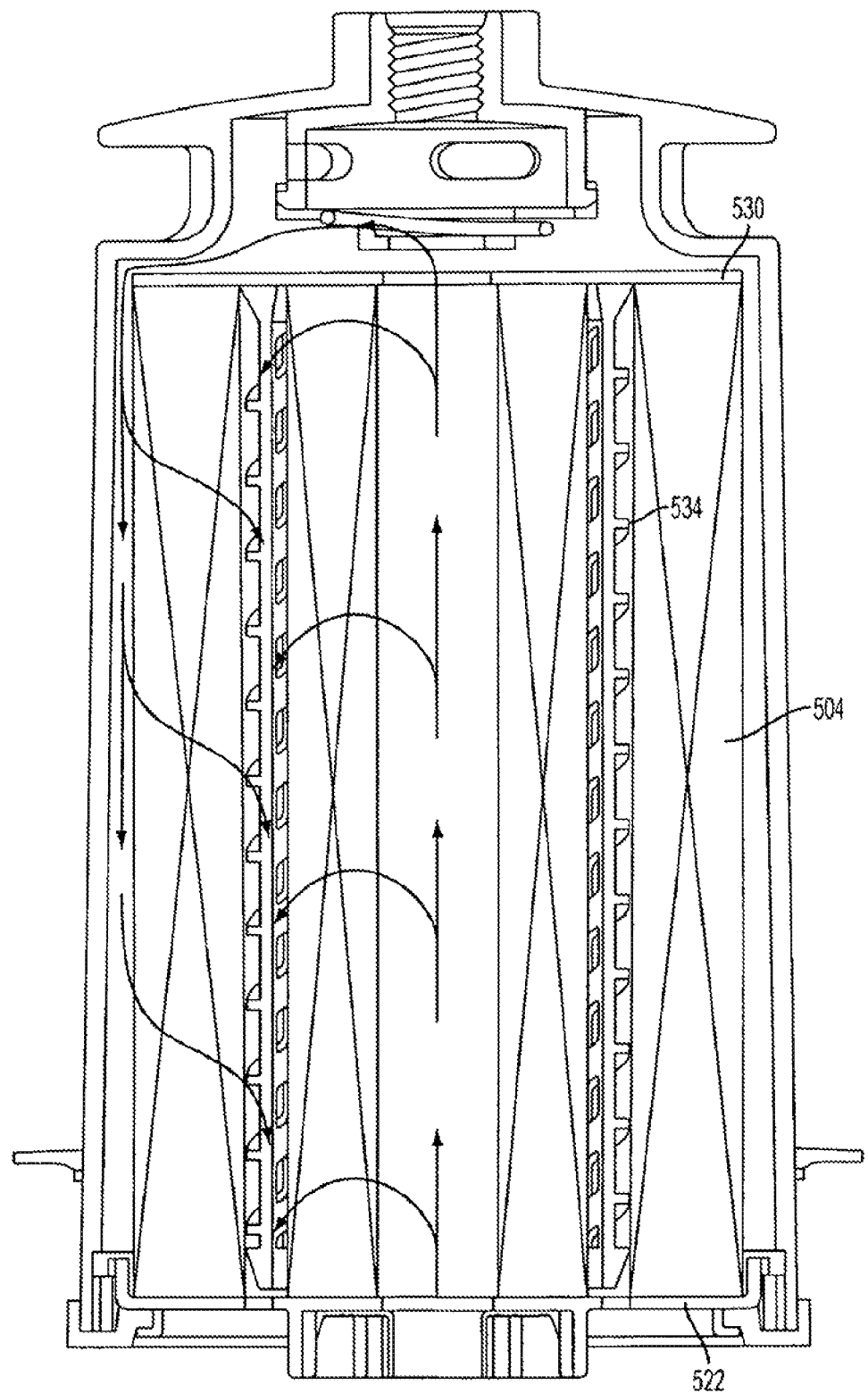
FIG. 31 is a cross-sectional view of another embodiment with the flow tube as part of the filter element.

In other embodiments the flow tube may be part of the filter element. Referring to FIG. 31, in this embodiment, the flow tube 534 is part of the filter element 504. For example, the flow tube 534 may be connected to the end cap 530. In other embodiments, the flow tube may be connected to the other end cap 522. This configuration may be used with any of the embodiments disclosed herein, as appropriate.

Figure 32:
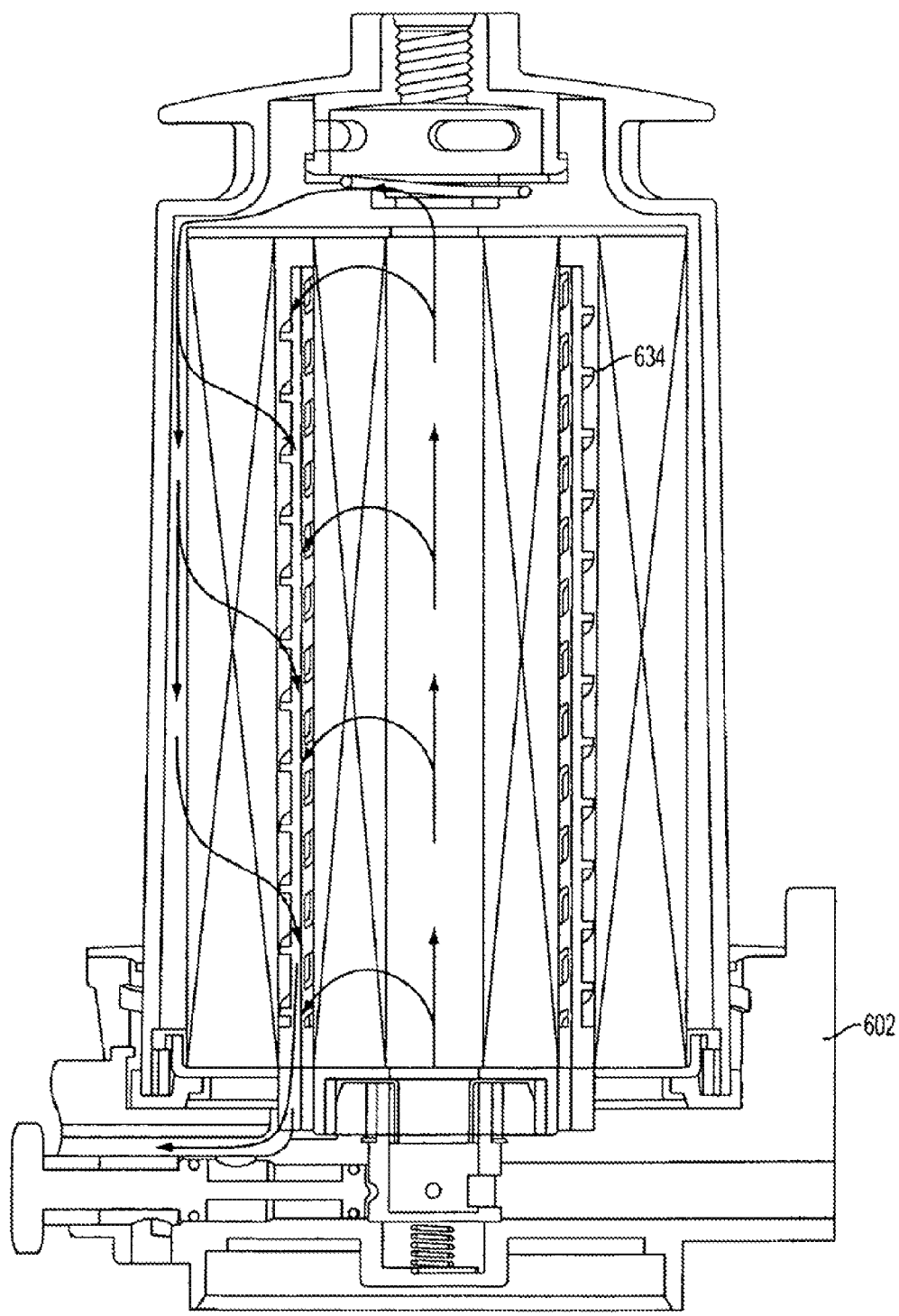
FIG. 32 is a cross-sectional view of another embodiment with the flow tube as part of the base.

In other embodiments, the flow tube may be part of the base. Referring to FIG. 32, in this embodiment, the flow tube 634 is part of the base 602. The flow tube may be connected by a snap fit, welding, threaded connection or press fit. This configuration may be used with any of the embodiments disclosed herein, as appropriate.

Figure 33:
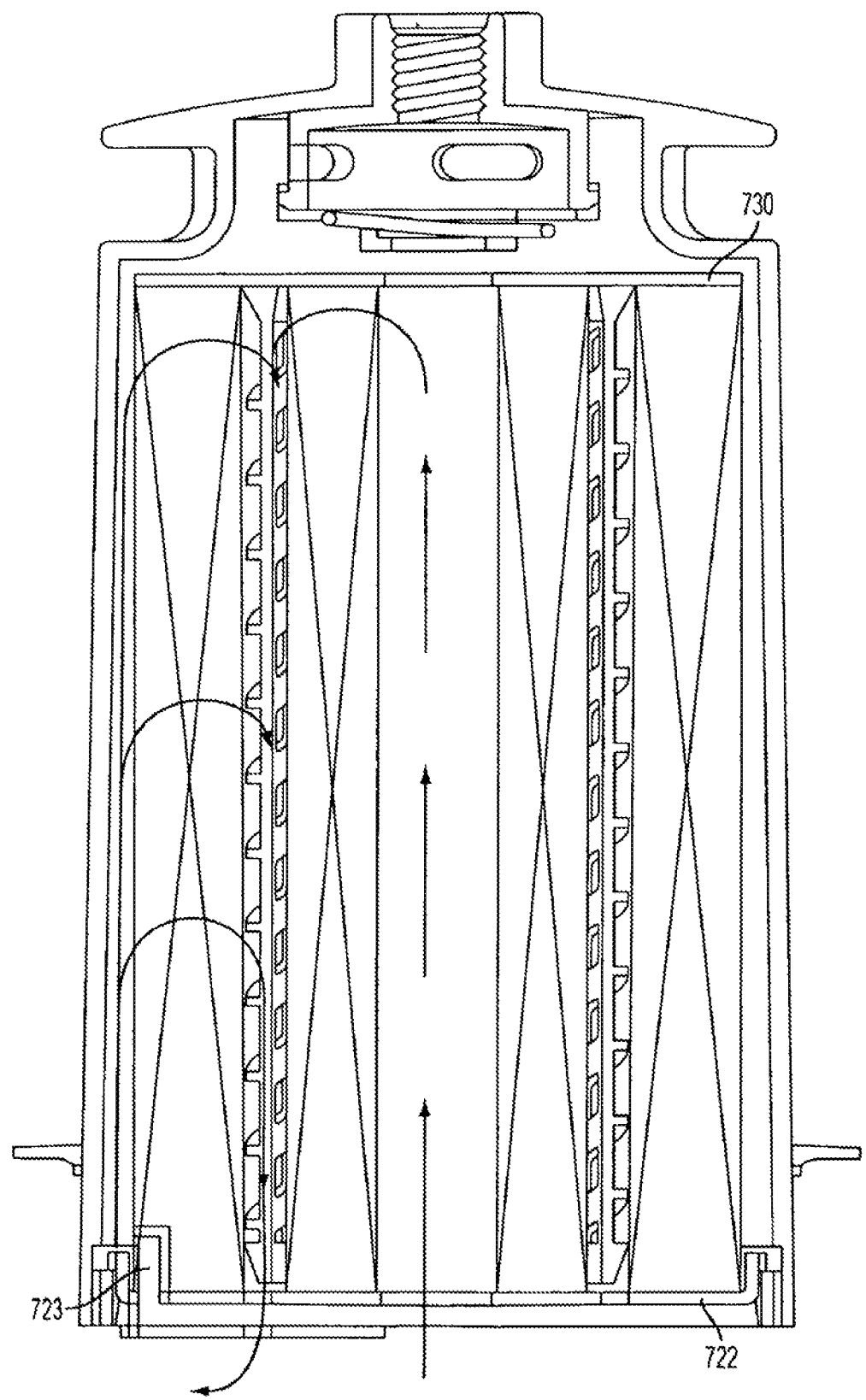
FIG. 33 is a cross-sectional view of another embodiment with a one-piece end cap at the upper end and an end cap at the lower end which has an integral flow path to the outside of the filter.

FIG. 33 shows another embodiment. The filter apparatus may have a one-piece end cap 730 at the upper end and an end cap 722 at the lower end which has an integral flow path 723 to the outside of the filter. The end cap 722 may be one part or the end cap 722 may be two or more parts connected together. This configuration may be used with any of the embodiments disclosed herein, as appropriate.

Figure 34:
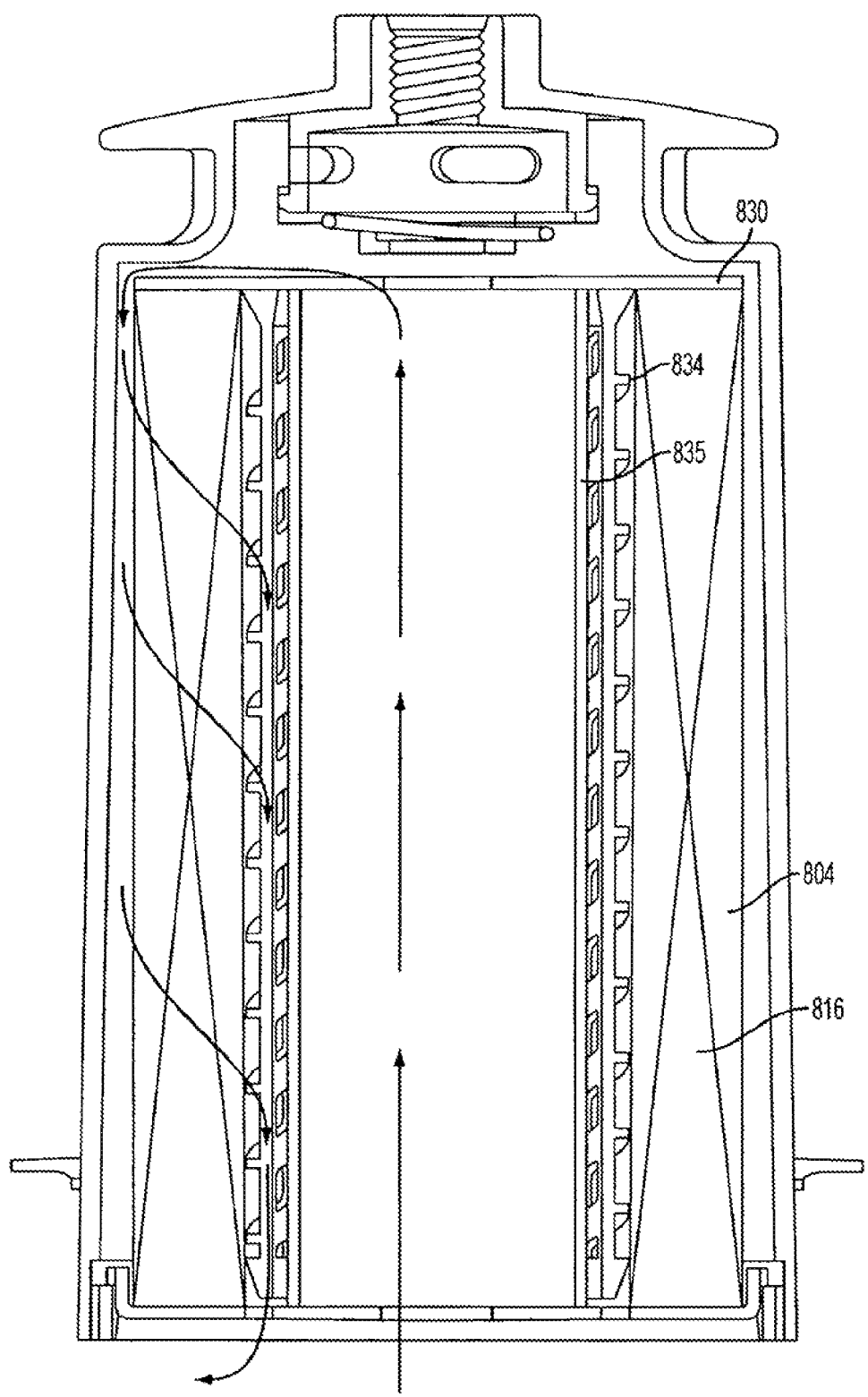
FIG. 34 is a cross-sectional view of another embodiment with an outer media pack and the flow tube is connected to the end cap.
Figure 35:
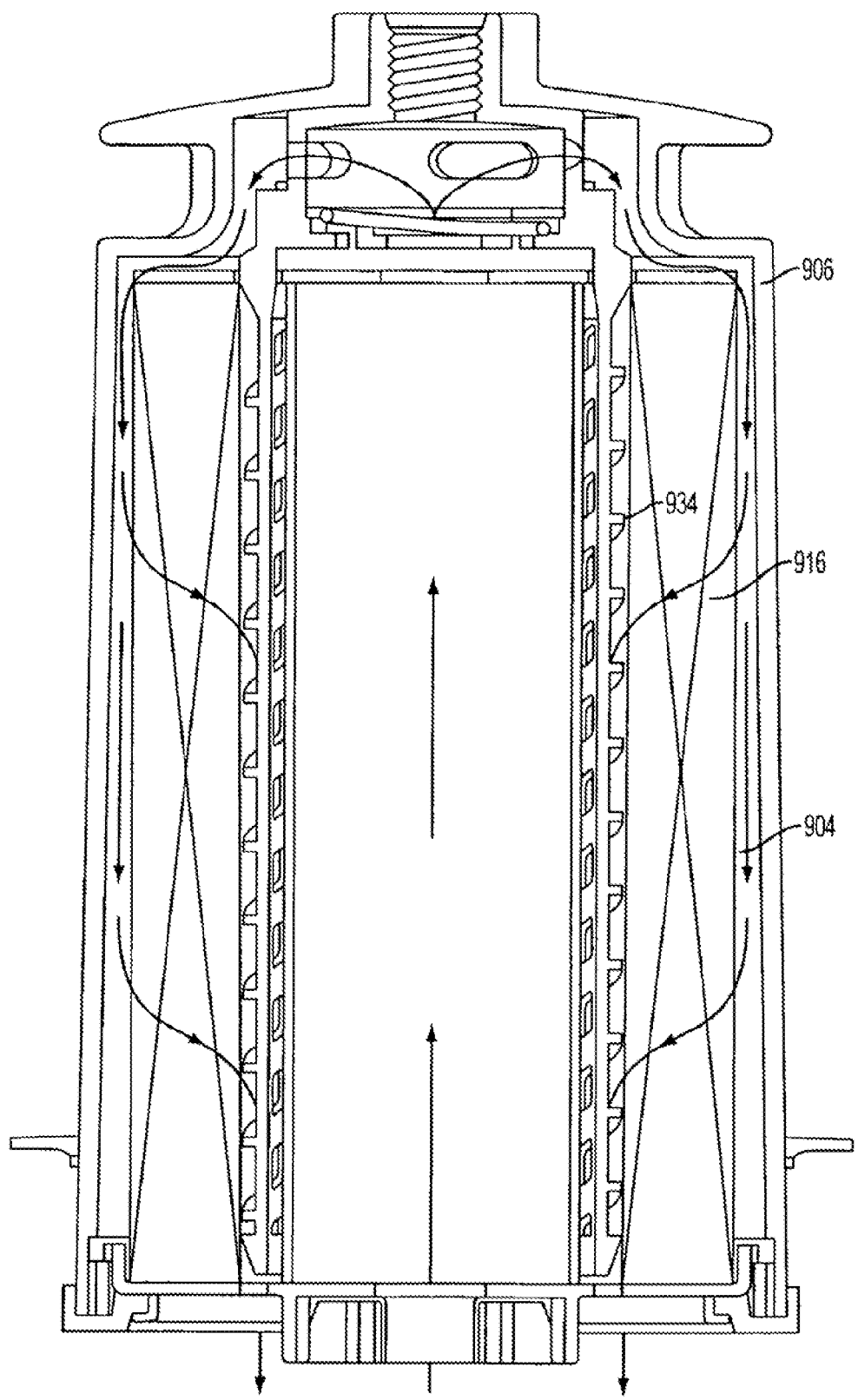
FIG. 35 is a cross-sectional view of another embodiment where the flow tube is connected to the housing.
Figure 36:
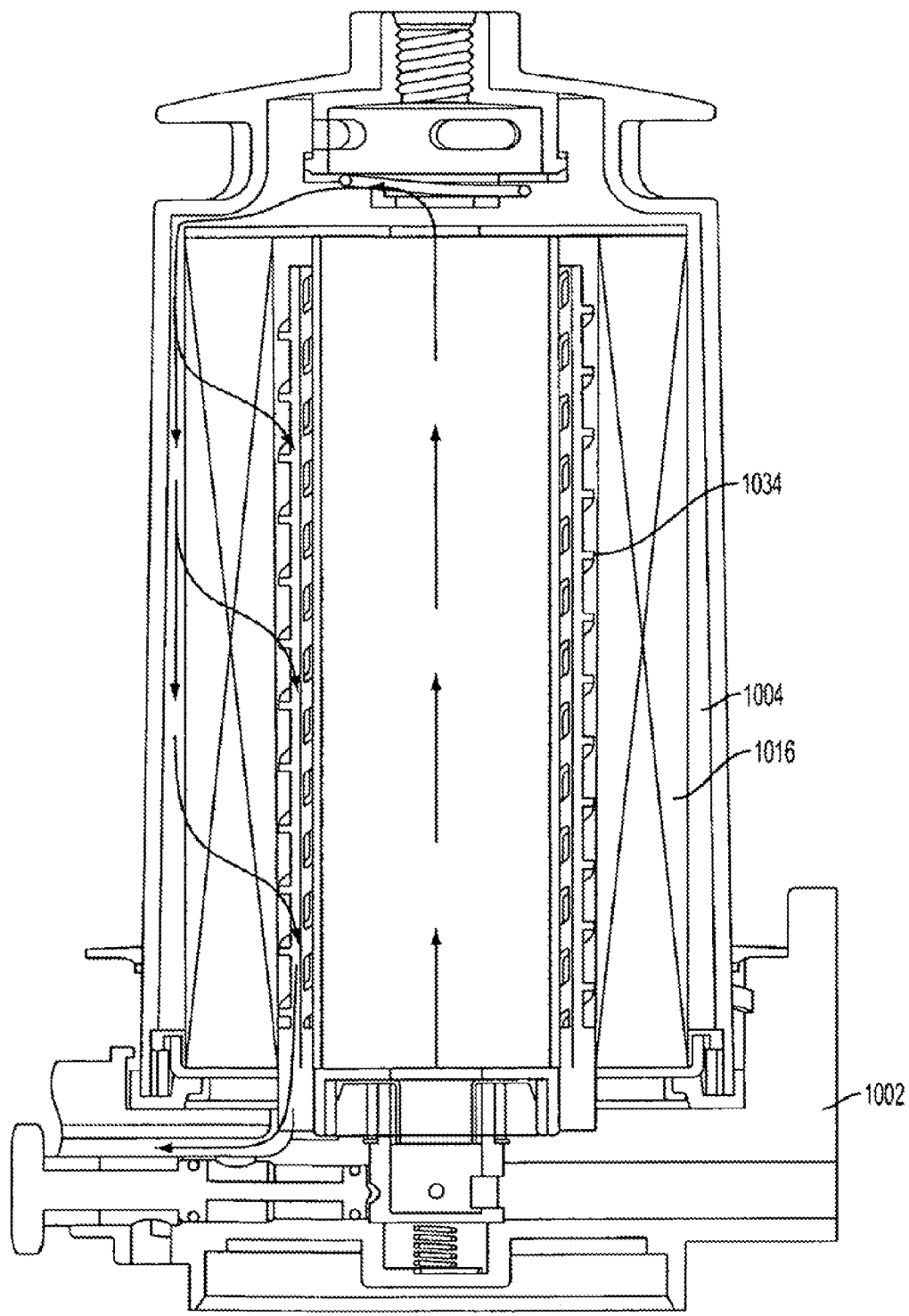
FIG. 36 is a cross-sectional view of another embodiment with an outer media pack and the flow tube is connected to the base.

In other embodiments the filter apparatus may have a single outer element and no inner element. Referring to FIG. 34, the filter element 804 may include only an outer media pack 816. In addition, the flow tube 834 may include a solid wall 835. Thus, the fluid moves to the top of the filter and enters the media pack 816 from the outside to the inside as shown by the flow arrows. Furthermore, the flow tube 834 may be connected to the filter. For example, the flow tube 834 may be connected to the end cap 830. In another embodiment, as shown in FIG. 35, the flow tube 934 may be connected to the housing 906. In this embodiment, the filter element 904 may include only an outer media pack 916. In yet another embodiment, as shown in FIG. 36, the flow tube 1034 may be connected to the base 1002. In this embodiment, the filter element 1004 may include only an outer media pack 1016. These configurations may be used with any of the embodiments disclosed herein, as appropriate.

Figure 37:
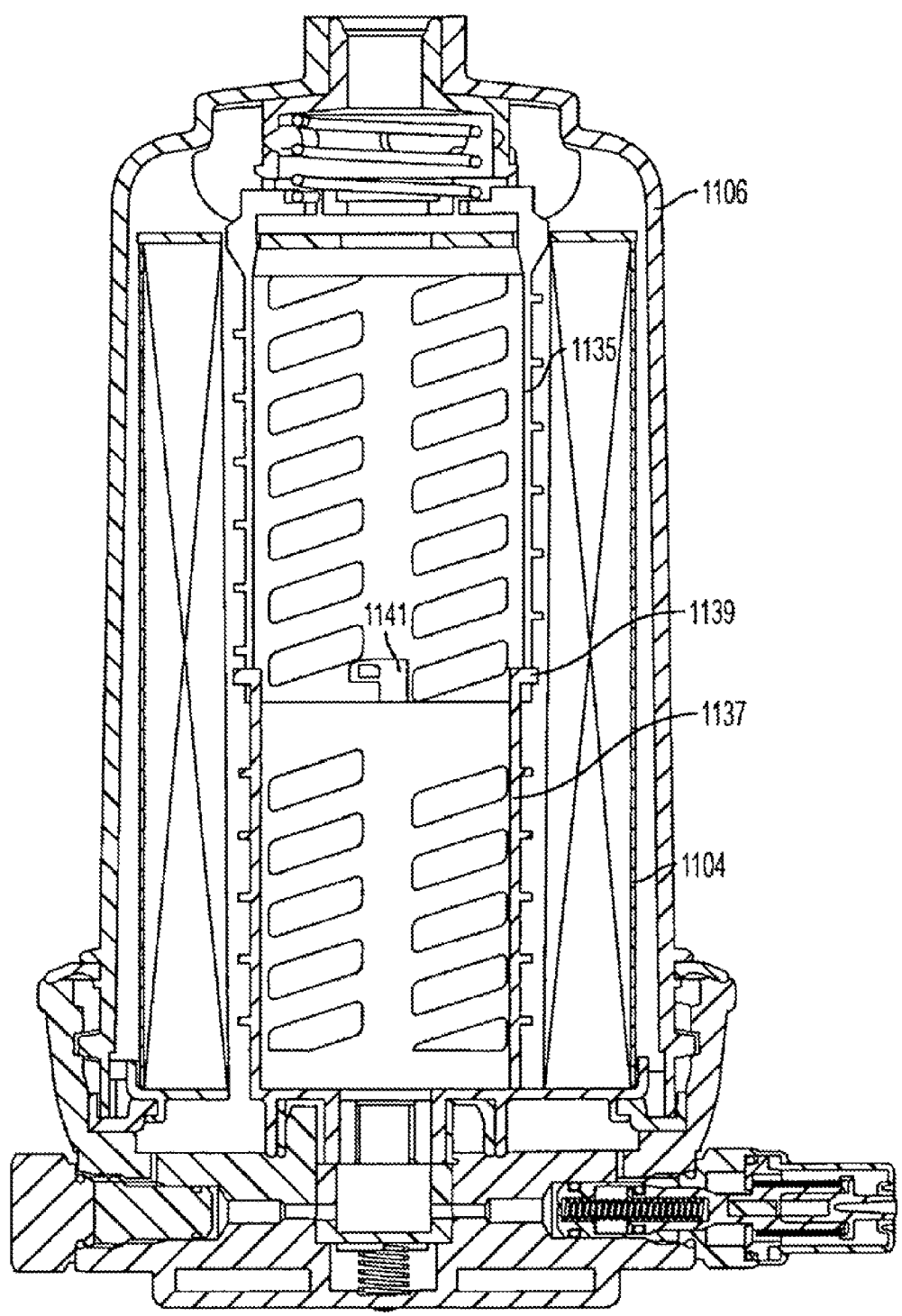
FIG. 37 is a cross-sectional view of another embodiment with a flow tube wherein one portion of the flow tube is attached to the housing and the other portion of the flow tube is attached to the filter element.

FIG. 37 is a cross-sectional view of another embodiment with a two part flow tube. The first portion 1135 of the flow tube is attached to the housing 1106. The second portion 1137 of the flow tube is attached to the filter element 1104. In one embodiment, the first portion 1135 may be connected to the second portion 1137. For example, as shown in FIG. 37, the first portion 1135 may be connected to the second portion 1137 by a tab 1139 and notch 1141 configuration. In other embodiments, other connection techniques may be used. This configuration may be used with any of the embodiments disclosed herein, as appropriate.

Figure 38:
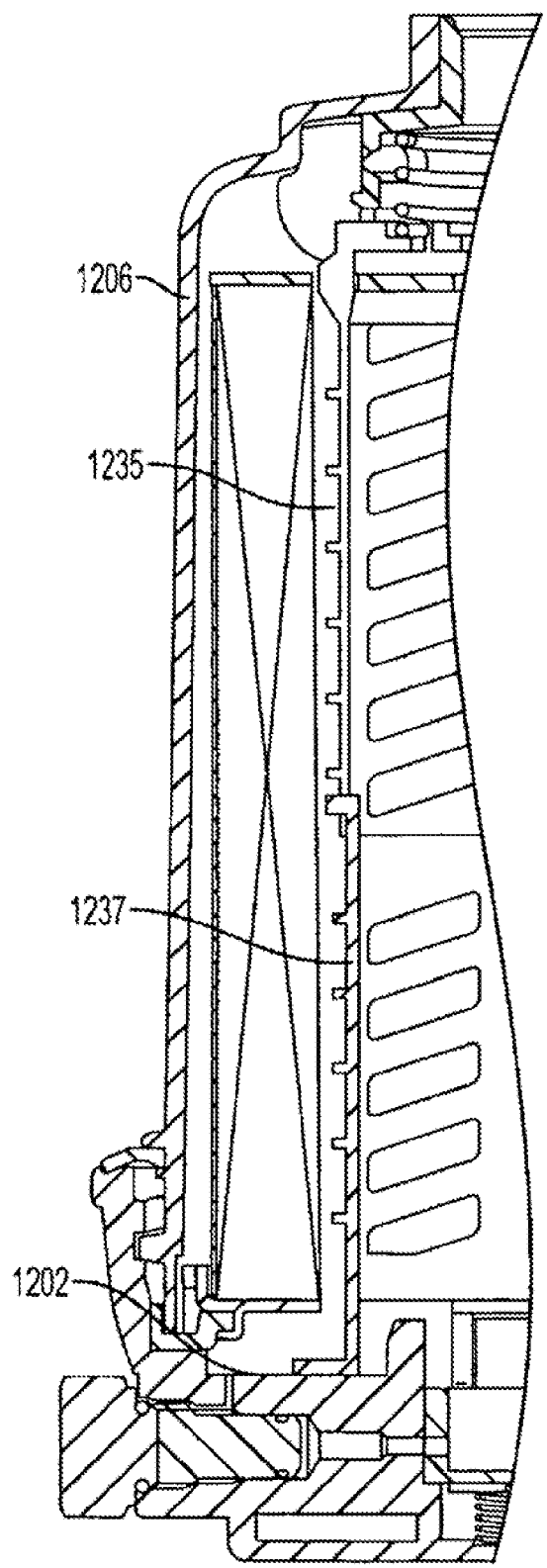
FIG. 38 is a cross-sectional view of another embodiment with a flow tube wherein one portion of the flow tube is attached to the housing and the other portion of the flow tube is attached to the base.

Referring to FIG. 38, another embodiment with a two part flow center tube is shown. In this embodiment, the first portion 1235 of the flow tube is attached to the housing 1206 and the second portion 1237 of the flow tube is attached to the base 1202. This configuration may be used with any of the embodiments disclosed herein, as appropriate.

Figure 39:
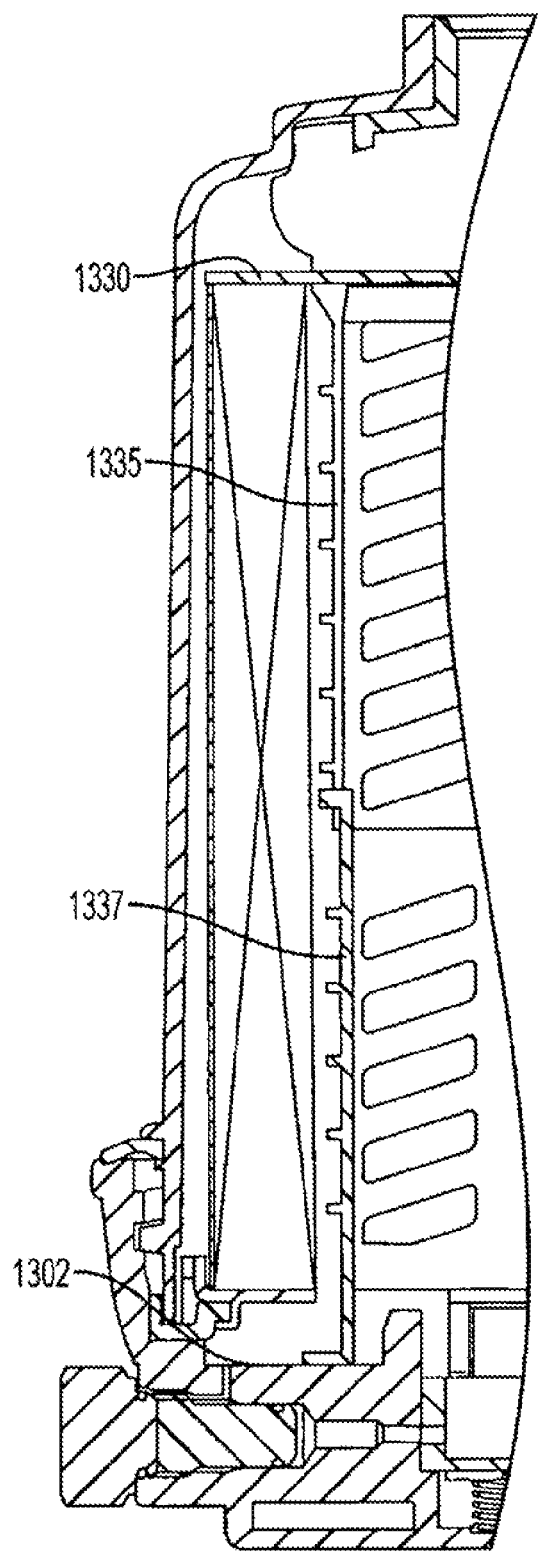
FIG. 39 is a cross-sectional view of another embodiment with a flow tube wherein a portion of the flow tube is attached to the top end cap of the filter element and the other portion is attached to the base.

Another embodiment with a two part flow tube is shown in FIG. 39. In this embodiment, the first portion 1335 of the flow tube is attached to the top end cap 1330 of the filter element and the second portion 1337 is attached to the base 1302. This configuration may be used with any of the embodiments disclosed herein, as appropriate.

Figure 40:
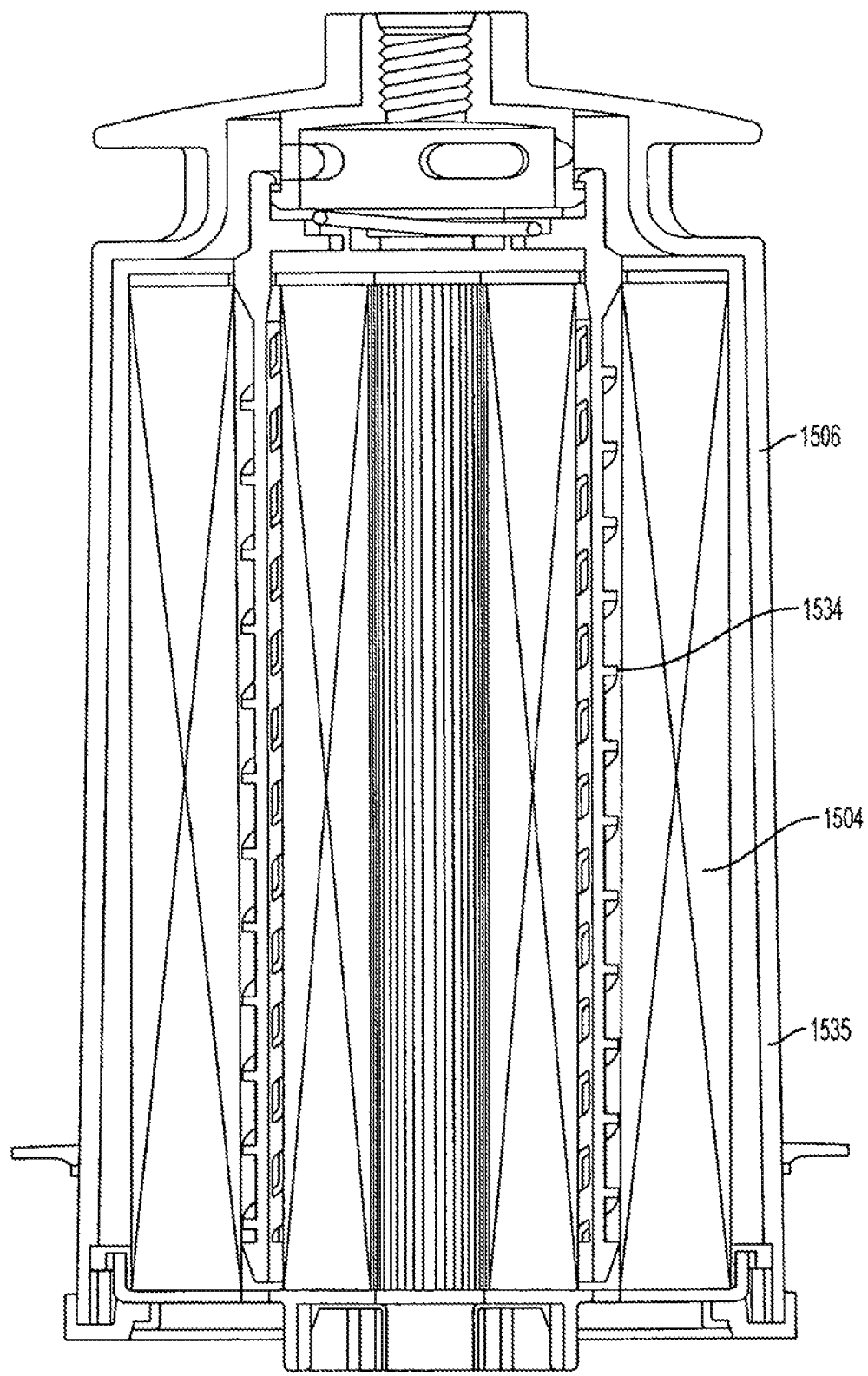
FIG. 40 is a cross-sectional view of another embodiment with the housing, flow tube and filter permanently attached.

Referring to FIG. 40, another embodiment of the filter apparatus is shown. In this embodiment, the housing 1506, the flow tube 1534 and the filter element 1504 are permanently attached together as an assembly 1535. Thus, when a user wishes to change the filter, the user merely replaces the entire assembly 1535 with a new filter assembly 1535 which includes the housing, flow tube and filter element. This configuration may be used with any of the embodiments disclosed herein, as appropriate.

Figure 41:
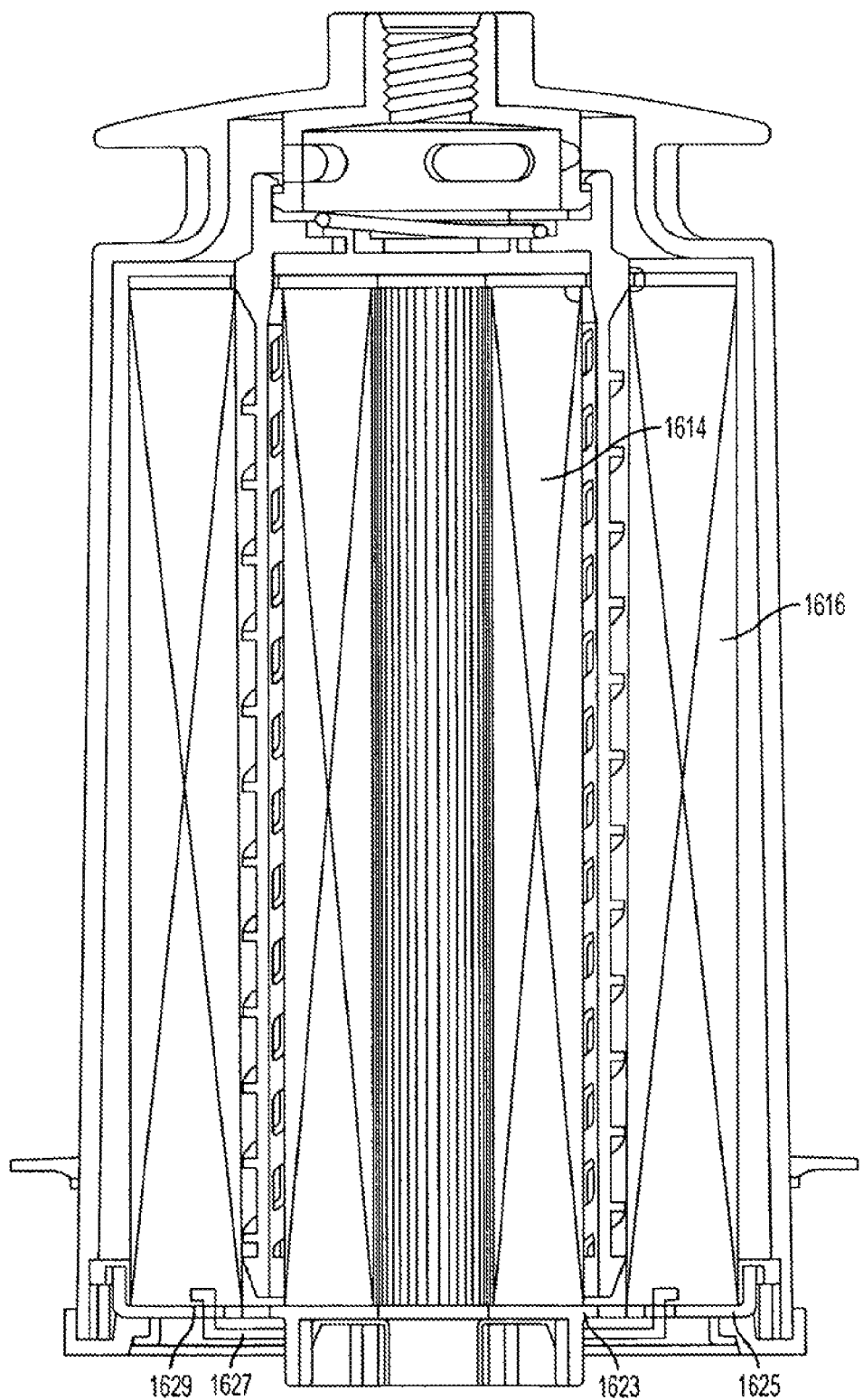
FIG. 41 is a cross-sectional view of another embodiment wherein the inner and outer media packs are separate and the two bottom end caps are attached together.

In another embodiment, the inner media pack and the outer media pack could be replaced separately. Referring to FIG. 41, in this embodiment, the inner media pack 1614 and the outer media pack 1616 may be replaced separately. The inner media pack may have an end cap 1623 and the outer media pack may have an end cap 1625. The end caps may be connected together. For example, the end caps may lock together with a tab 1627 and a notch 1629 as shown in FIG. 41. In other embodiments, the two end caps may snap together or may have mating ribs. Thus, the user may replace either one of the media pack without replacing the other media pack. In addition, the user can combine different media packs in order to customize the filter apparatus. For example, the user may use an inner media pack made of extremely efficient water removing material with an outer media pack made of pleated cellulose of efficiency appropriate for normal operation. Another user may use an inner media pack made of media with fuel conditioning chemical additives and outer media pack made of less than normal efficiency pleated cellulose appropriate for higher flow operation. At the next filter change, the users may decide to utilize different media packs. These configurations may be used with any of the embodiments disclosed herein, as appropriate.

Figure 42:
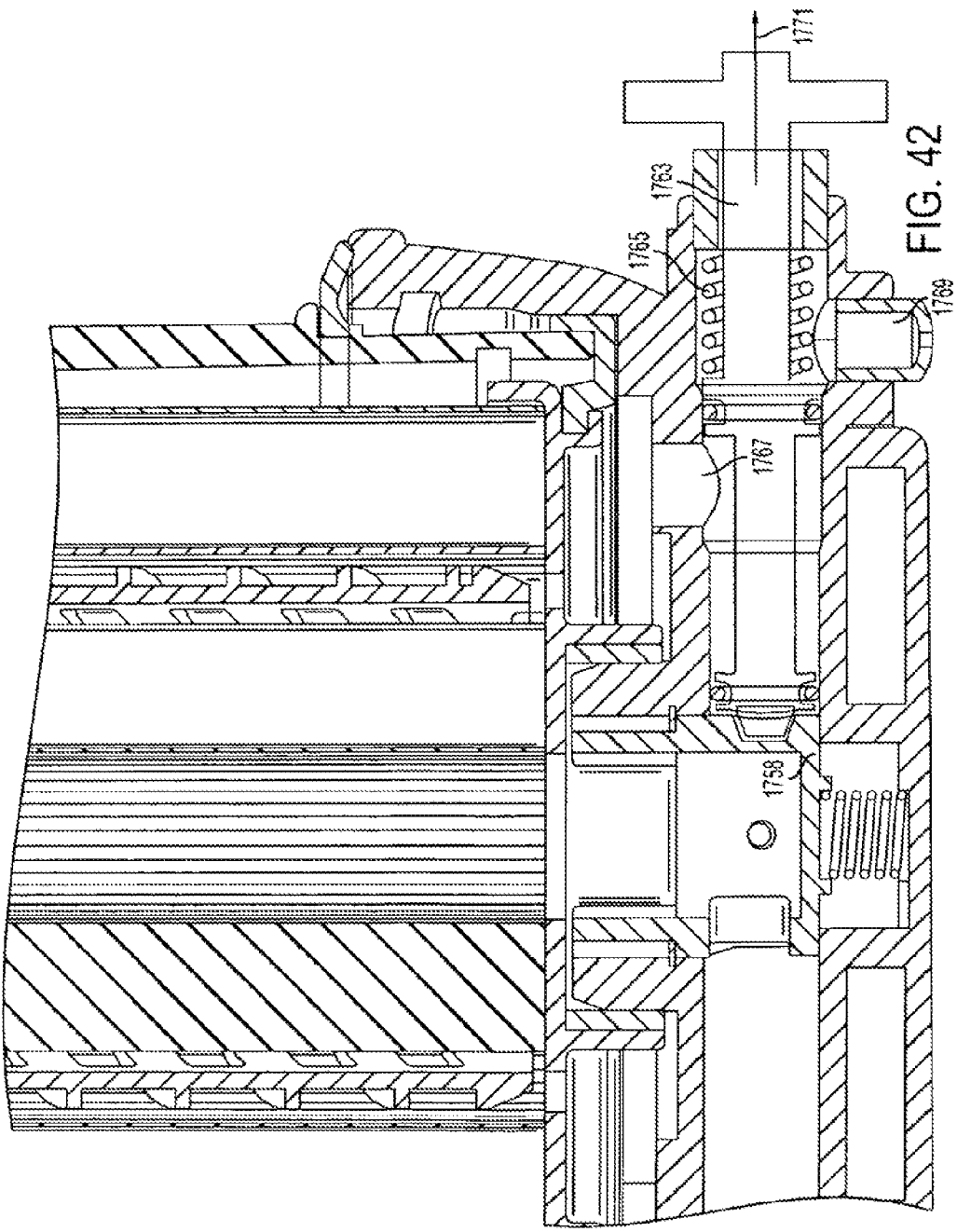
FIG. 42 is a cross-sectional view of another embodiment which uses a pin to engage the valve.

Referring to FIG. 42, another embodiment of the filter apparatus is shown. In this embodiment, a pin 1763 may be used to engage the valve 1758. The pin may be biased in the closed position by a spring 1765. When a user wishes to drain or vent the system, the user would pull the pin 1763 in direction 1771 so that the outlet passage 1767 may be connected with the drain/vent port 1769. When the user has completed draining or venting the system, the user may release the pin 1763 and the spring 1765 will return the pin to the first position. The pin may be used with any of the embodiments disclosed herein as appropriate.

Figure 43:
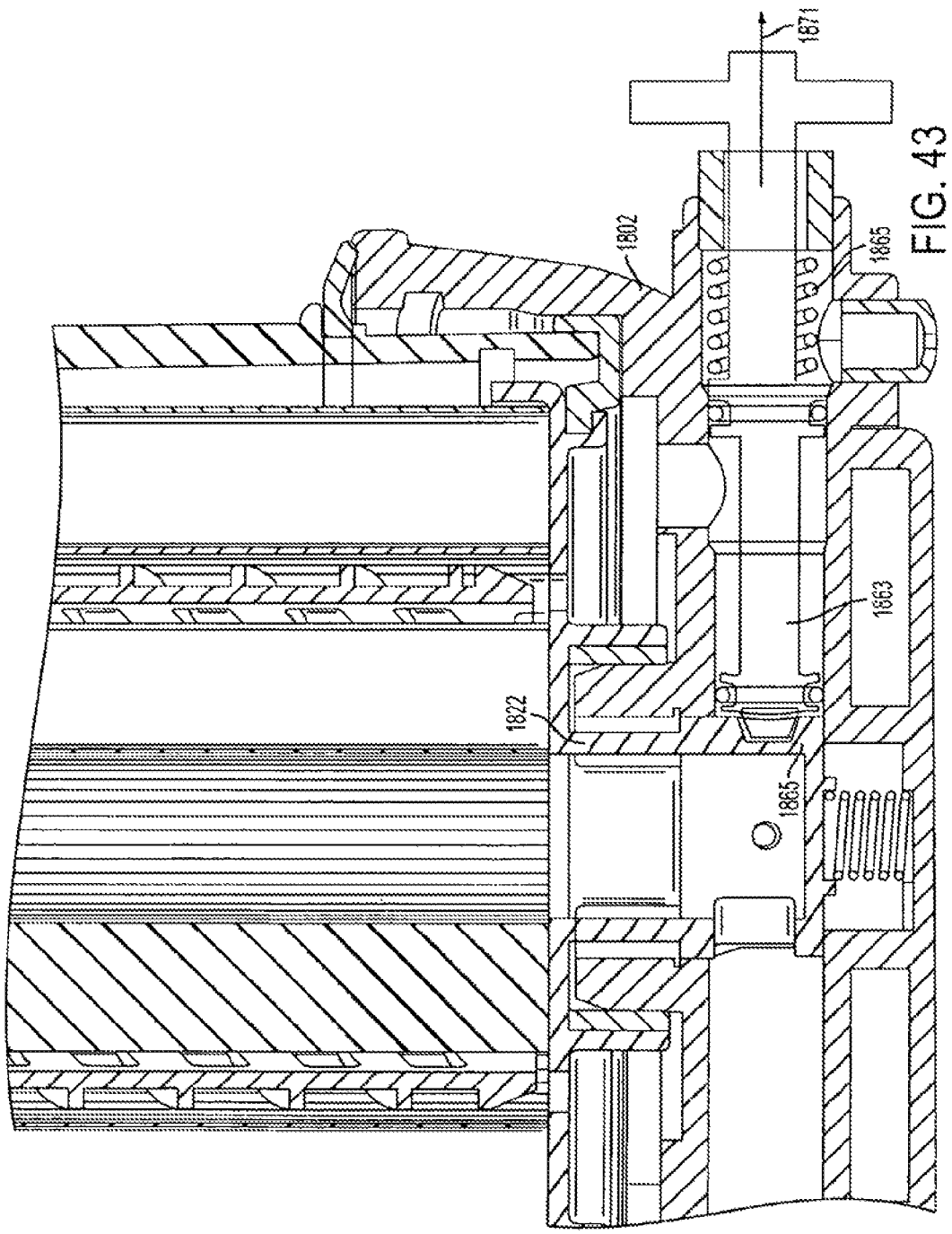
FIG. 43 is a cross-sectional view of another embodiment with a pin which engages the end cap.

For example, FIG. 43 shows another embodiment in which the pin engages the end cap. In this embodiment, the pin engages the end cap 1822 which extends into the base 1802. The pin 1863 engages a detent 1865 in the end cap 1822. Thus, the user is able to lock the filter element into position to prevent rotation. When the user wishes to change the filter element, the user would pull the pin 1863 in direction 1871 so that the end cap may rotate. This configuration may be used with any of the embodiments disclosed herein, as appropriate.

Figure 44:
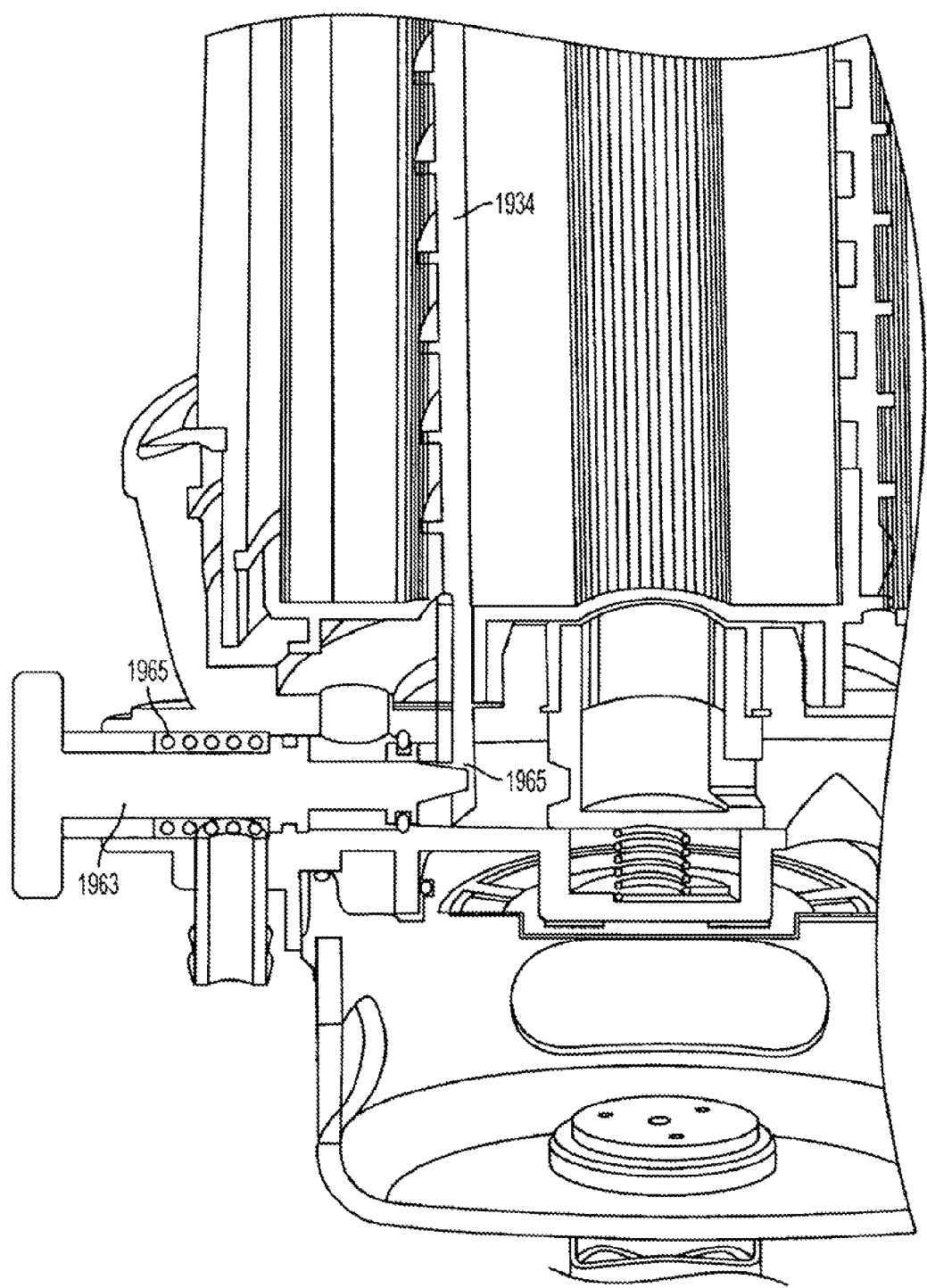
FIG. 44 is a cross-sectional view of another embodiment with a knob engaging the center tube.

Referring to FIG. 44, another embodiment of the filter apparatus is shown. In this embodiment a spring pin 1963 engages the flow tube 1934. The flow tube 1934 may include a detent 1965 which the pin 1963 may engage. Thus, this arrangement prevents rotation of the filter element. In another embodiment, a threaded drain valve may be used in place of the spring biased pin. This configuration may be used with any of the embodiments disclosed herein, as appropriate.

Figure 45:
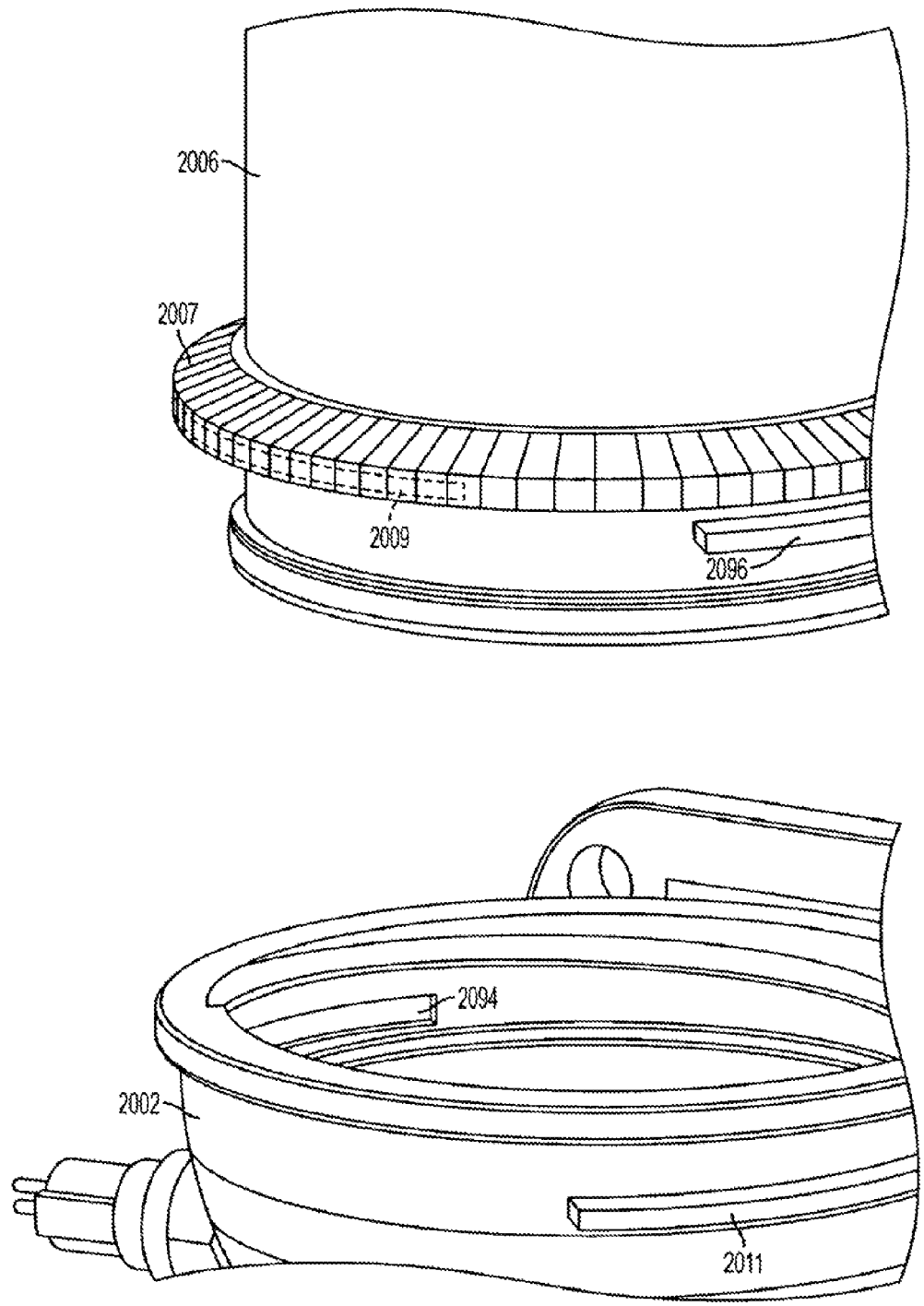
FIG. 45 is a perspective view of another embodiment with a locking collar.

Referring to FIG. 45, another embodiment of the filter apparatus is shown. In this embodiment, the housing 2006 may include a collar 2007. The collar may include a ramp 2009 on the interior of the collar. The base 2002 may include a ramp 2011. The ramp may be located on the exterior of the base. The ramp 2009 on the collar will engage the ramp 2011 on the base. In addition, the housing may include an exterior ramp 2096 which may engage an interior ramp 2094 in the base. The collar 2007 may be used to lock the housing to the base. This configuration may be used with any of the embodiments disclosed herein as appropriate.

Figure 46:
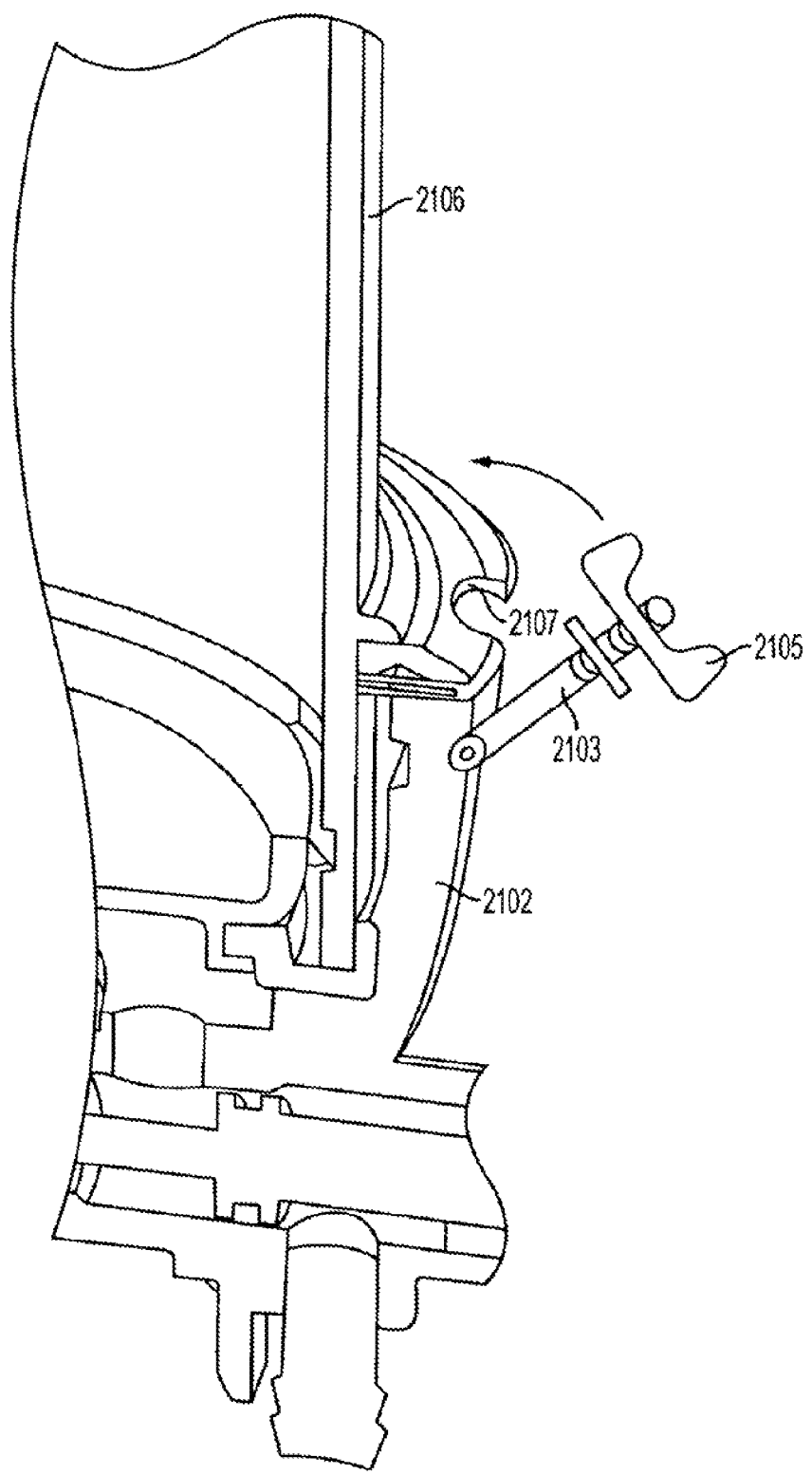
FIG. 46 is a perspective view of another embodiment which utilizes a rotating bolt to attach the base to the housing.

FIG. 46 shows another embodiment of a locking mechanism. The base 2102 may include a threaded pin 2103. A fastener 2105, such as a wing nut, may be connected to the threaded pin 2103. The housing 2106 may include a notch 2107 which may be engaged by the pin 2103. After the housing has been assembled to the base, the user may position the pin 2103 in the notch 2107 and then tighten the fastener 2105. Thus, the housing may be locked to the base. This configuration may be used in any of the embodiments disclosed herein as appropriate.

Figure 47:
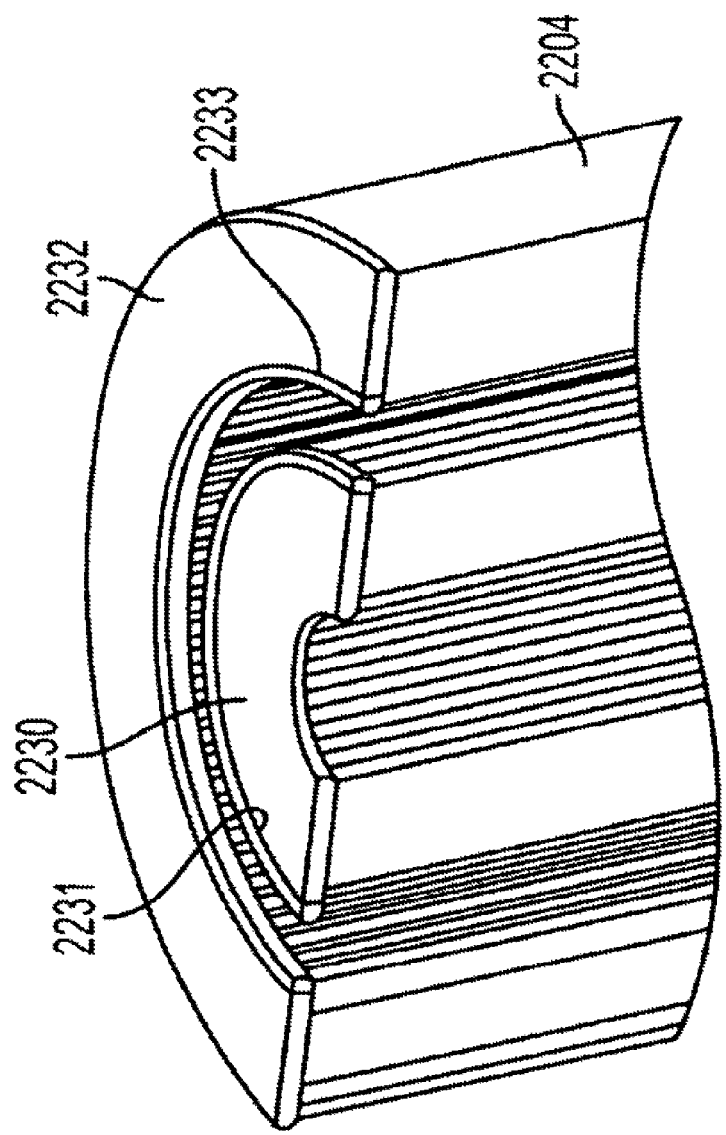
FIG. 47 is a perspective view of another embodiment of the filter element with overmolded seals.

Referring to FIG. 47, another embodiment of the filter element is shown. In this embodiment, the filter element may include end caps with seals. The filter element 2204 may include an inner end cap 2230 and an outer end cap 2232. The end caps may include seals 2231 and 2233, which are connected to the end caps. In one embodiment, the seals may be connected to the end caps by overmolding. Thus, the seals may be made of a material different than the end caps. In one embodiment, the seals may be made of an elastomer and the end caps may be made of a plastic. This seal configuration may be used with any of the embodiments disclosed herein as appropriate.

Figure 48:
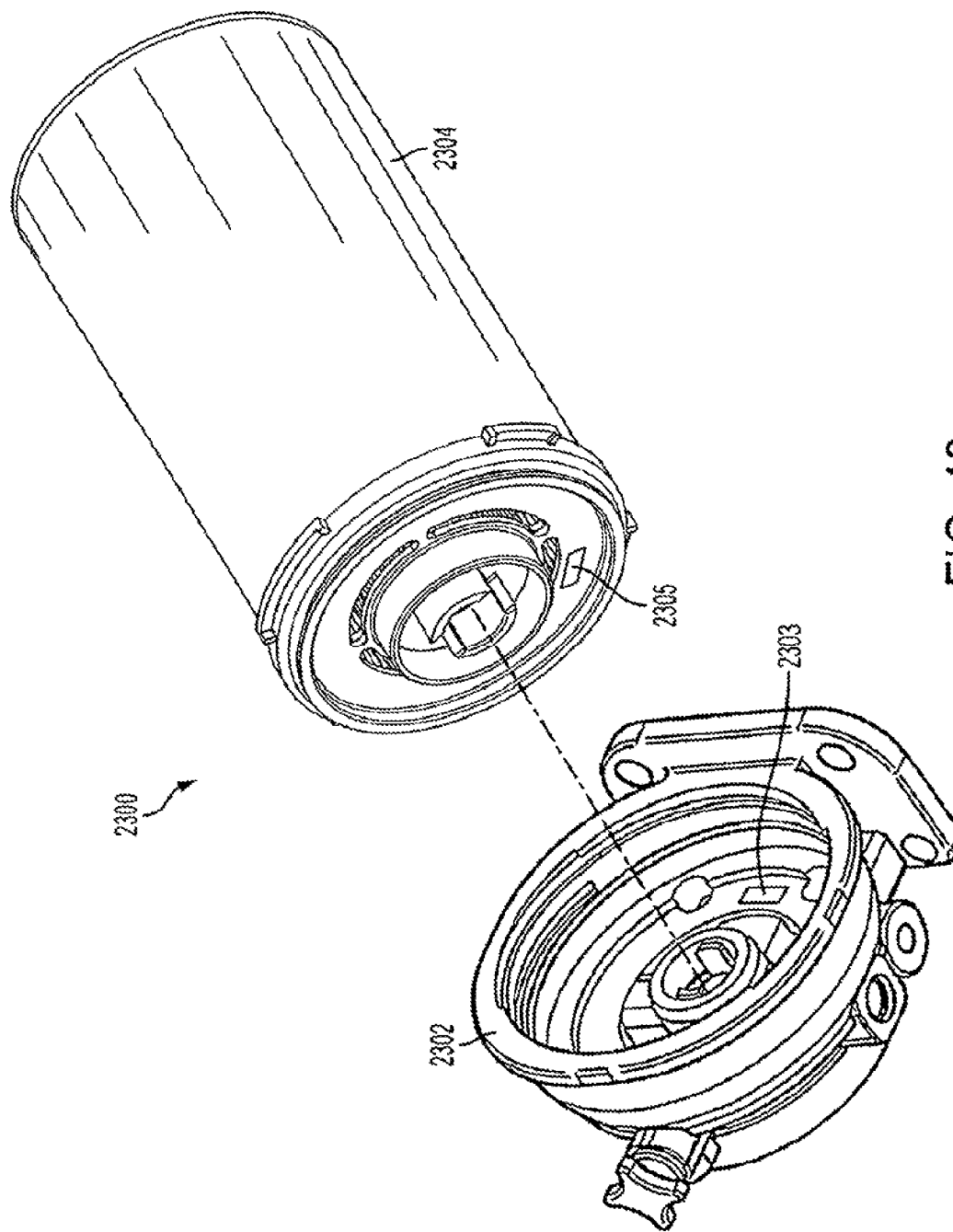
FIG. 48 is a perspective view of another embodiment of a filter with an RFID tag and an RFID reader.

The filter apparatus may also include a system for providing information relating to the filter apparatus. Referring to FIG. 48, the filter apparatus 2300 may include a radio frequency identification (RFID) system. In this embodiment, the filter 2304 may include an RFID tag 2305 and the base 2302 may include an RFID reader 2303. When the filter is positioned into the base, the reader 2303 will be able to read the tag 2305. The tag will be able to provide information to the system, such as whether the proper filter has been utilized, the manufacturer of the filter, the date of manufacture of the filter and other filtration parameters. In addition, the system will indicate whether the filter change has been completed and the mileage and/or date of the filter change. In other embodiments, the reader may be located in another location on the vehicle and may be able to read information concerning other filters, such as the primary fuel filter, secondary fuel filter, primary lubrication filter or secondary lubrication filter. Other systems for providing information concerning the filter apparatus may include two dimensional bar codes, three dimensional bar codes, resistors, reed switches, mechanical switches, magnets, conductive plastic, conductive ink, or other systems. These configurations may be included in any of the embodiments disclosed herein as appropriate.

Figure 49:
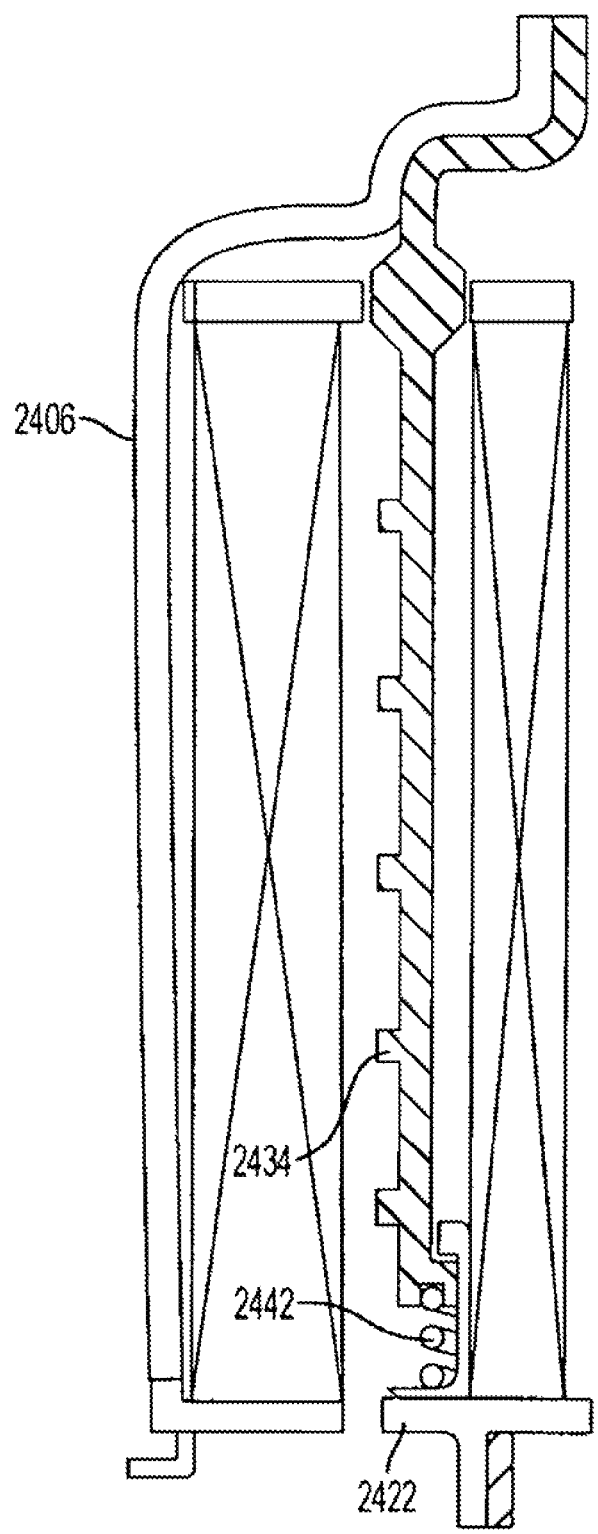
FIG. 49 is a cross-sectional view of another embodiment which shows a spring at the base end of the filter element.
Figure 50:
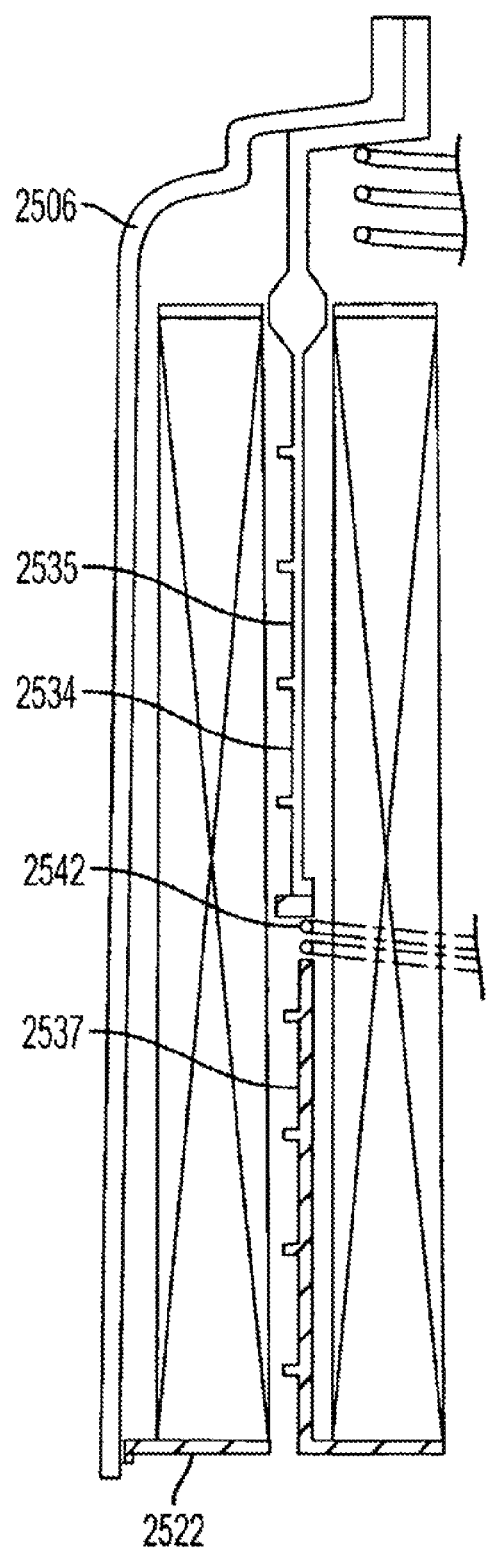
FIG. 50 is a cross-sectional view of another embodiment which shows a flow tube with a first and second portions and a spring located between the two portions.

Referring to FIG. 49, another embodiment of the filter apparatus is shown. In this embodiment, a spring is located at the base end of the flow tube. As shown in FIG. 50, a spring 2442 is located between the flow tube 2434 and the end cap 2422. The center tube 2434 may be connected to the housing 2406. This configuration may be used with any of the embodiments disclosed herein, as appropriate.

Referring to FIG. 50, another embodiment of the filter apparatus is shown. In this embodiment the flow tube 2534 includes a first portion 2535 and a second portion 2537. The first portion 2535 is connected to the housing 2506. The second portion 2537 is connected to the end cap 2522. A spring 2542 may be located between the first portion 2535 and the second portion 2537. This configuration may be used with any of the other embodiments disclosed herein as appropriate.

Figure 52:
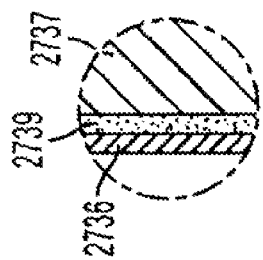
FIG. 52 is an enlarged view of the circled area in FIG. 51.
Figure 51:
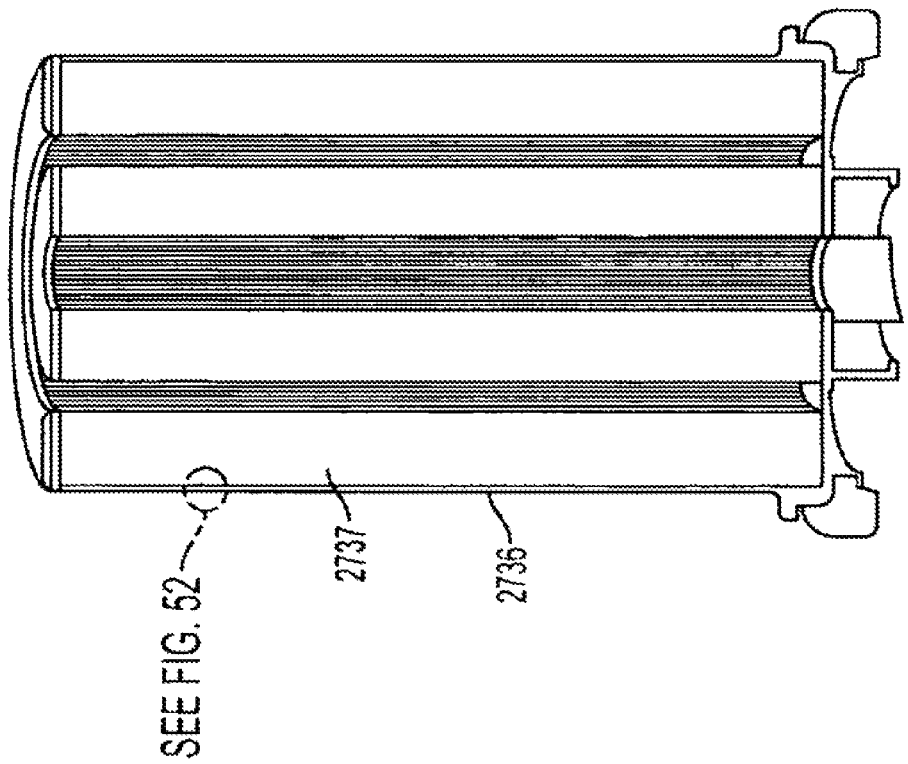
FIG. 51 is a cross-sectional view of another embodiment of the filter element with the wrapping attached to the media with an adhesive.

The outer wrapping may be attached to the filter element in several ways. Referring to FIGS. 51 and 52, the outer wrapping 2736 may be applied to the filter material 2737 with an adhesive 2739. If the filter material 2737 is a pleated filter, then the adhesive may be applied to the pleat tips. The outer wrapping 2736 will maintain the spacing of the pleats. The configuration may be used with any of the embodiments disclosed herein, as appropriate.

Referring to FIGS. 53 and 54, the outer wrapping 2836 may be potted into the end cap 2816. In another embodiment shown in FIG. 55, the outer wrapping 2936 may be spaced from the end cap 2916 and/or end cap 2922 to create a gap 2917 and gap 2923. In yet another embodiment, the outer wrapping 3036 may be attached to the outside diameter of the end cap 3016 as shown in FIG. 57. In another embodiment, the outer wrapping 3136 may be folded over the end cap 3116 as shown in FIG. 58. Any of these configurations may be used with any of the embodiments disclosed herein, as appropriate.

Figure 59:
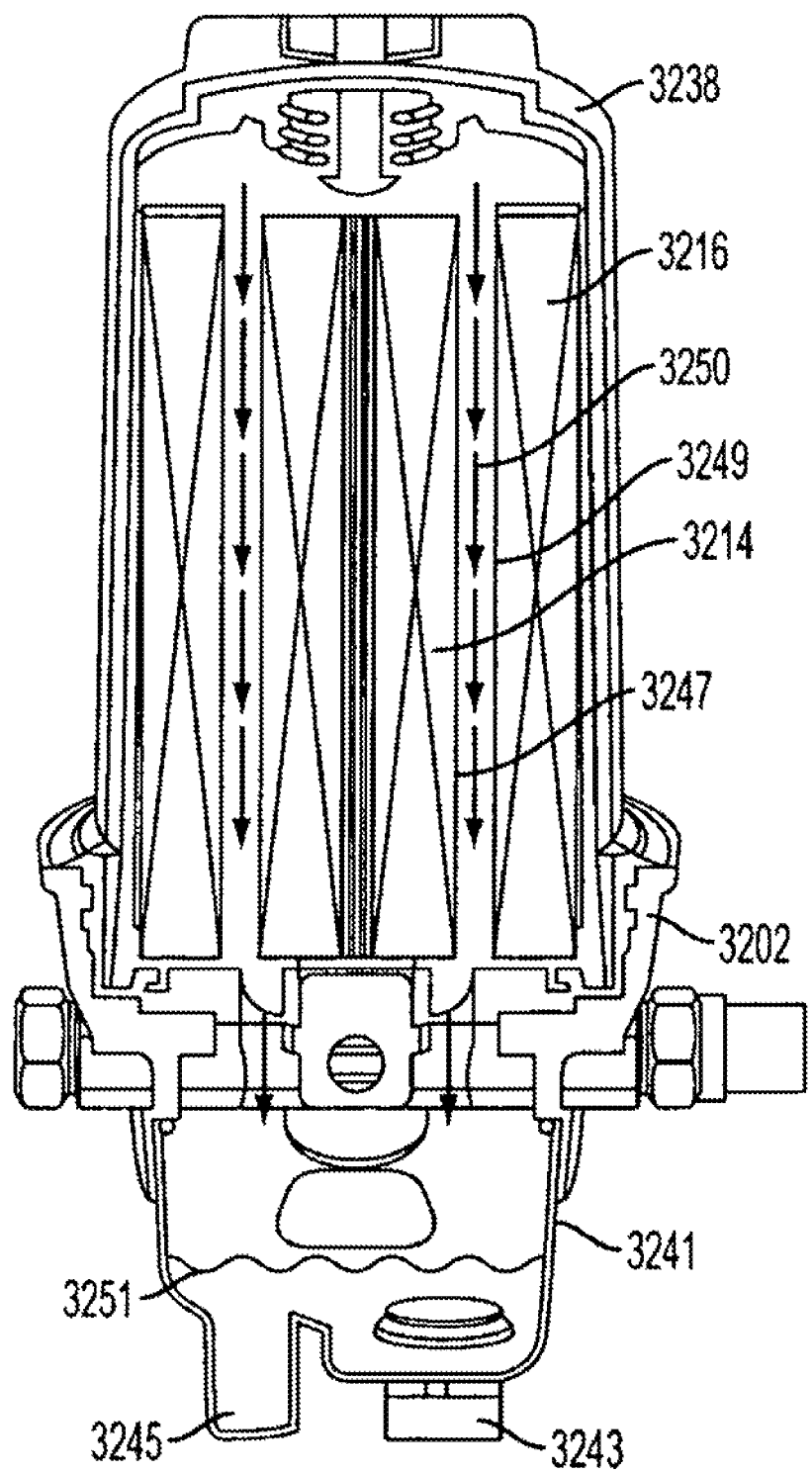
FIG. 59 is a cross-sectional view of another embodiment of the filter apparatus with water separation.

The filter apparatus may also include water separation. Referring to FIG. 59, in this embodiment, the filter is shown with the dome 3238 in an upward position. The filter apparatus may include a bowl 3241 connected to the base 3202. The bowl may include a drain knob 3243 and a water indicator 3245. The filter may include a coalescing material 3247 on the output side of the inner media pack 3214 and a coalescing material 3249 on the output side of the outer media pack 3216. The coalescing material causes the water to coalesce into larger droplets and flow to the bowl 3241 as shown by arrows 3250. The water 3251 accumulates at the bottom of the bowl 3241 where it may be drained using the drain knob 3243. This configuration may be used with any of the embodiments disclosed herein, as appropriate.

Figure 61:
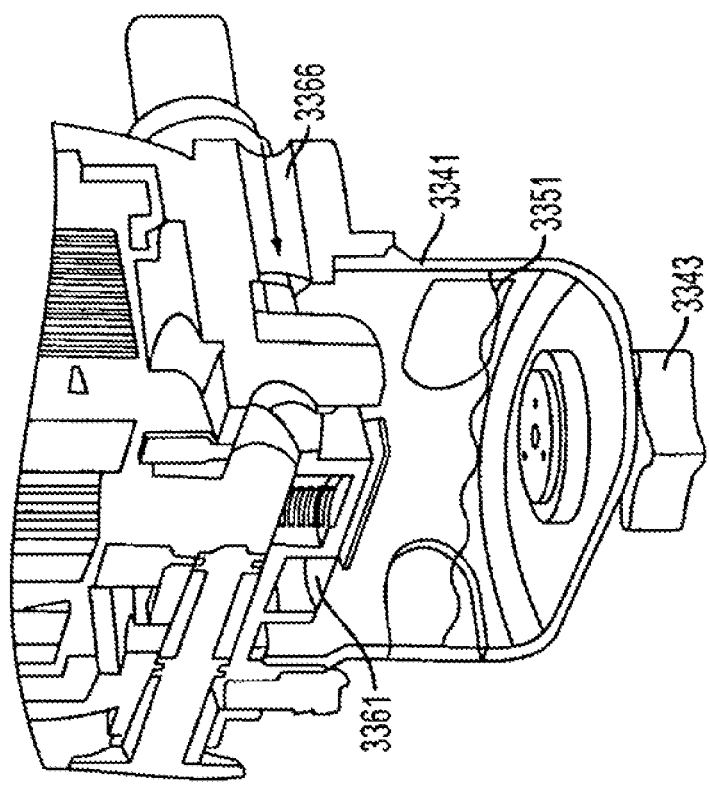
FIG. 61 is another view of the embodiment shown in FIG. 60.
Figure 60:
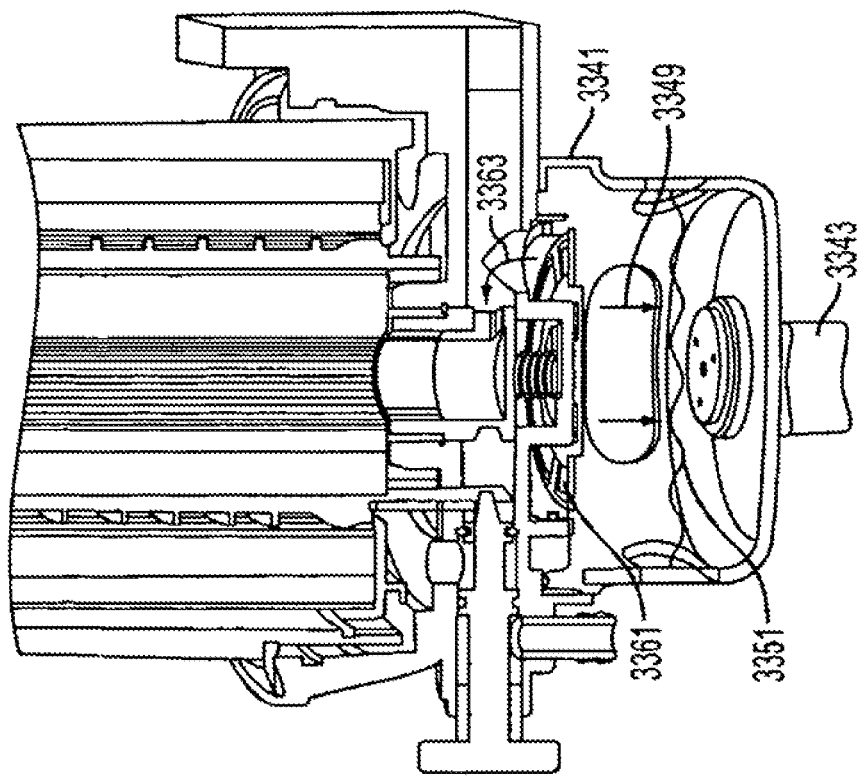
FIG. 60 shows another embodiment of the filter apparatus with water separation.

Referring to FIGS. 60 and 61, another embodiment of water separation is shown. In this embodiment the filter apparatus is shown with the dome in the up position. The bowl 3341 may include a water stripping screen 3361. The fuel and water mixture would enter the bowl through the inlet port 3366. The fuel and water mixture would enter the bowl and then pass upwards through the screen 3361. The fuel and water mixture would continue upwards toward the filter as shown by arrow 3363 in FIG. 60. The water would be stripped from the fuel water mixture by the water stripping screen 3361. The water would then travel towards the bottom of the bowl as shown by arrows 3349. The water 3351 would then accumulate at the bottom of the bowl and could be drained using the drain knob 3343. This configuration could be used with any of the embodiments disclosed herein, as appropriate.

Figure 62:
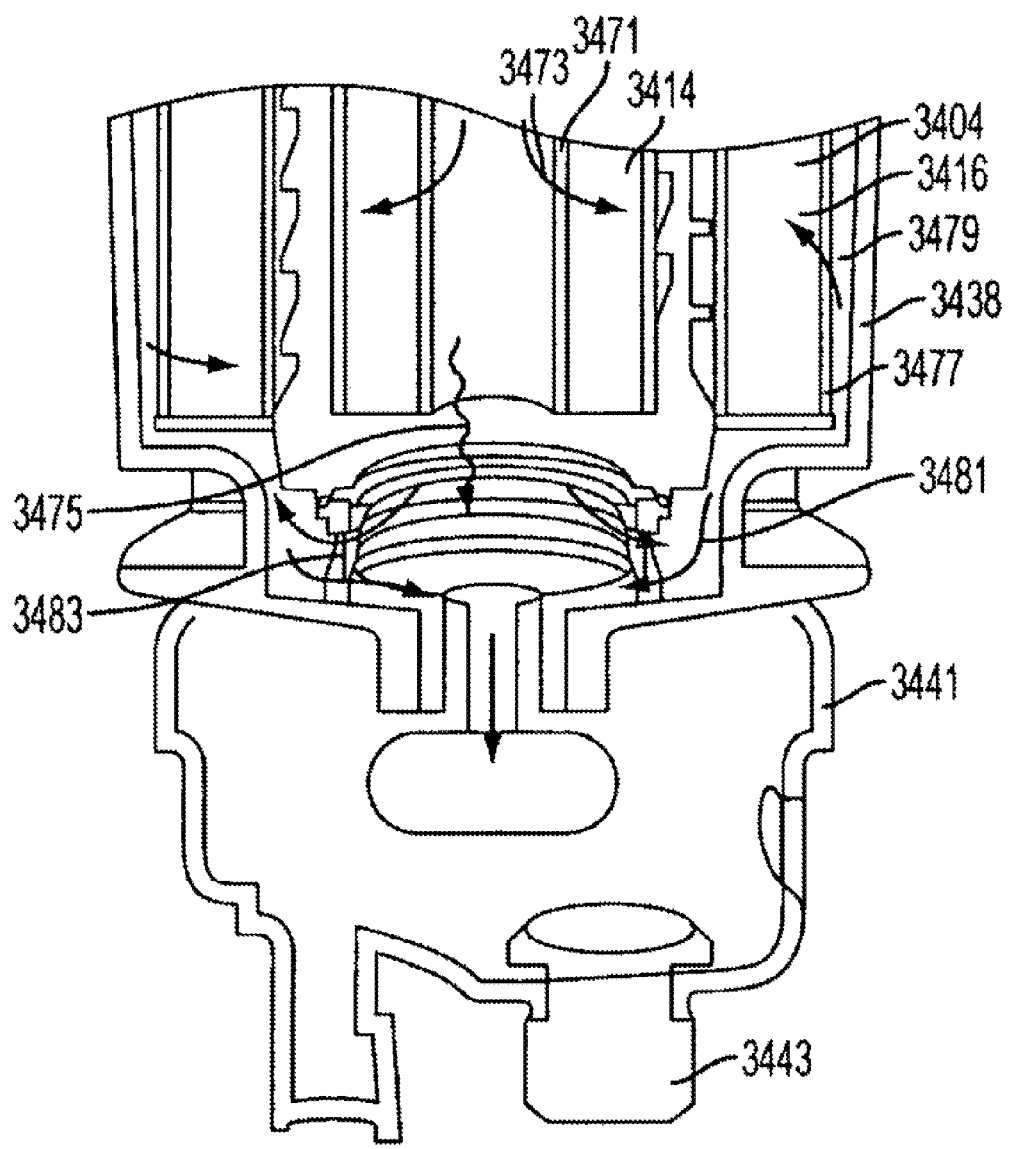
FIG. 62 is a cross-sectional view of another embodiment with water separation.

Water separation may also be used in a dome down situation. Referring to FIG. 62, the filter apparatus may include a bowl 3441 connected to the dome 3438. The filter element 3404 may include a coalescing material 3471 at the interior of the inner media pack 3414. Thus, the fuel and water mixture as shown by arrow 3473 will engage the coalescing material 3471 and cause the water as shown by arrow 3475 to fall into the bowl 3441. The outer media pack 3416 may include a coalescing material 3477 on the outer surface. As the fuel water mixture as shown by arrow 3479 engages the coalescing material 3477, the coalescing material separates the water as shown by arrow 3481 which then falls to the bowl 3441. As noted above, the water may be drained from the bowl 3441 by using the knob 3443. In another embodiment, coalescing screens 3483 may be placed at the openings in the retainer clip or similar structure. These coalescing screens would separate the water prior to engaging the outer media pack 3416. The coalescing screens 3483 may be used instead of the coalescing material 3477 or may be used in conjunction with the coalescing material 3477 on the outer media pack 3416. These configurations may be used with other embodiments disclosed herein, as appropriate.

Figure 63:
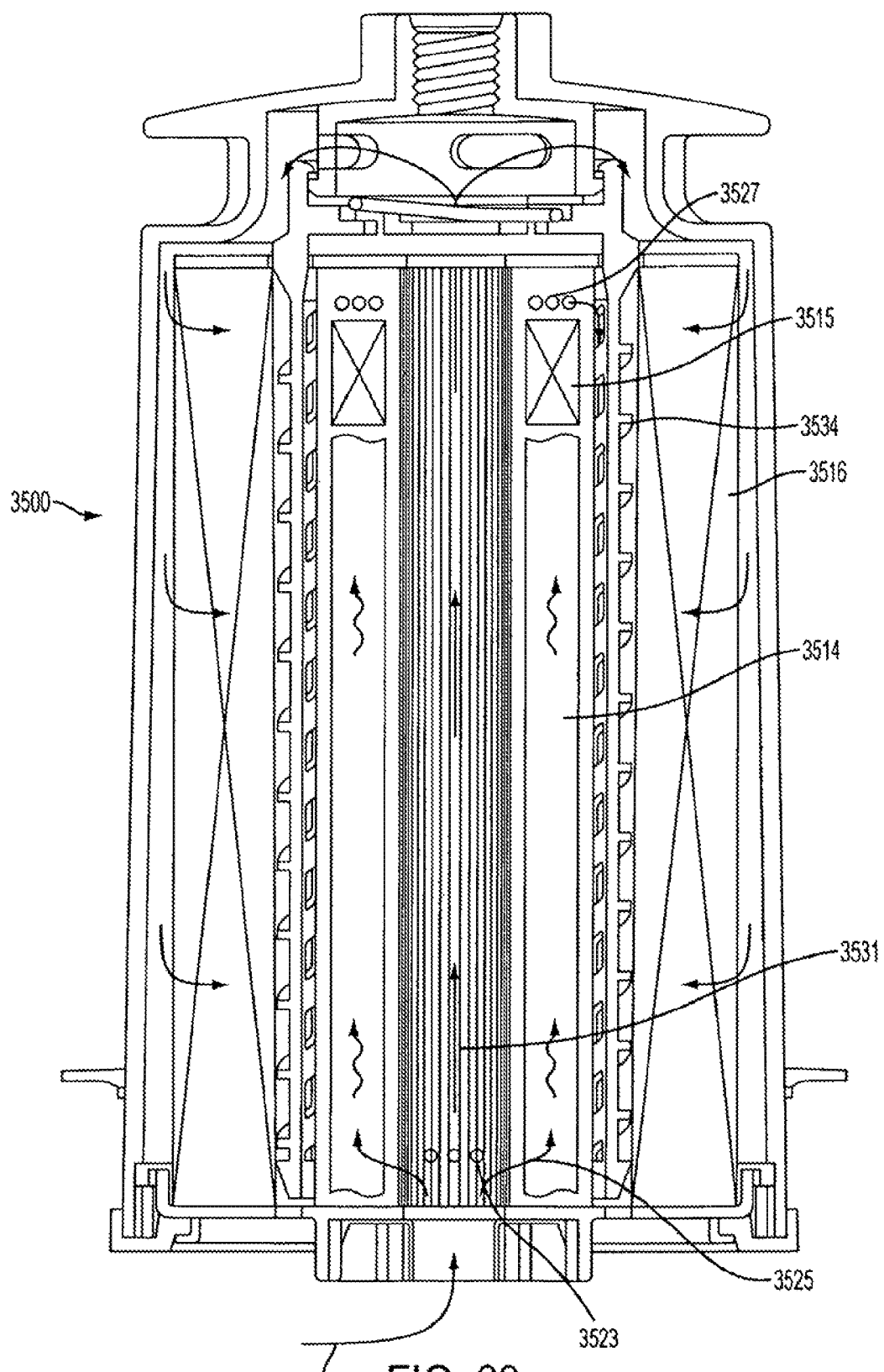
FIG. 63 is a cross-sectional view of another embodiment with different filter media packs. While the invention will be described in connection with certain preferred embodiments, there is no intent to limit it to those embodiments. On the contrary, the intent is to cover all alternatives, modifications and equivalents as included within the spirit and scope of the invention as defined by the appended claims.

As noted above, the filter apparatus may include various filter media. Referring to FIG. 63, one embodiment of the filter apparatus is shown. The filter apparatus 3500 may include a first inner media material 3514, a second inner media material 3515 and an outer media material 3516. In one embodiment the media material 3514 may be a fluid conditioning material. For example, the media 3514 may be an acid neutralizing material such as calcium carbonate. The second inner media material 3515 may be a filter material. In addition, the outer media pack 3516 may also be a filter material. The inlet fluid flow is represented by arrow 3521. A portion of the inlet flow will create a by-pass flow as shown by arrow 3525 and enter the filter media 3514 at holes 3523. The by-pass flow 3523 will continue through the second inner filter 3515 and exit at the holes 3527 to proceed along the flow tube 3534. The remaining flow 3531 will continue upwards and pass through the filter media pack 3516 before it enters the flow tube 3534. The media 3514, 3515 and 3516 may include many different media, such as pleated cellulose, spun bonded polyester, impregnated films, synthetic nanofibers, chemical treatment beds, depth type beds of recycled material, coalescing screens, and composite materials. These media may be used in a variety of combinations. This configuration may be used in any of the embodiments disclosed herein, as appropriate.

Figure 64:
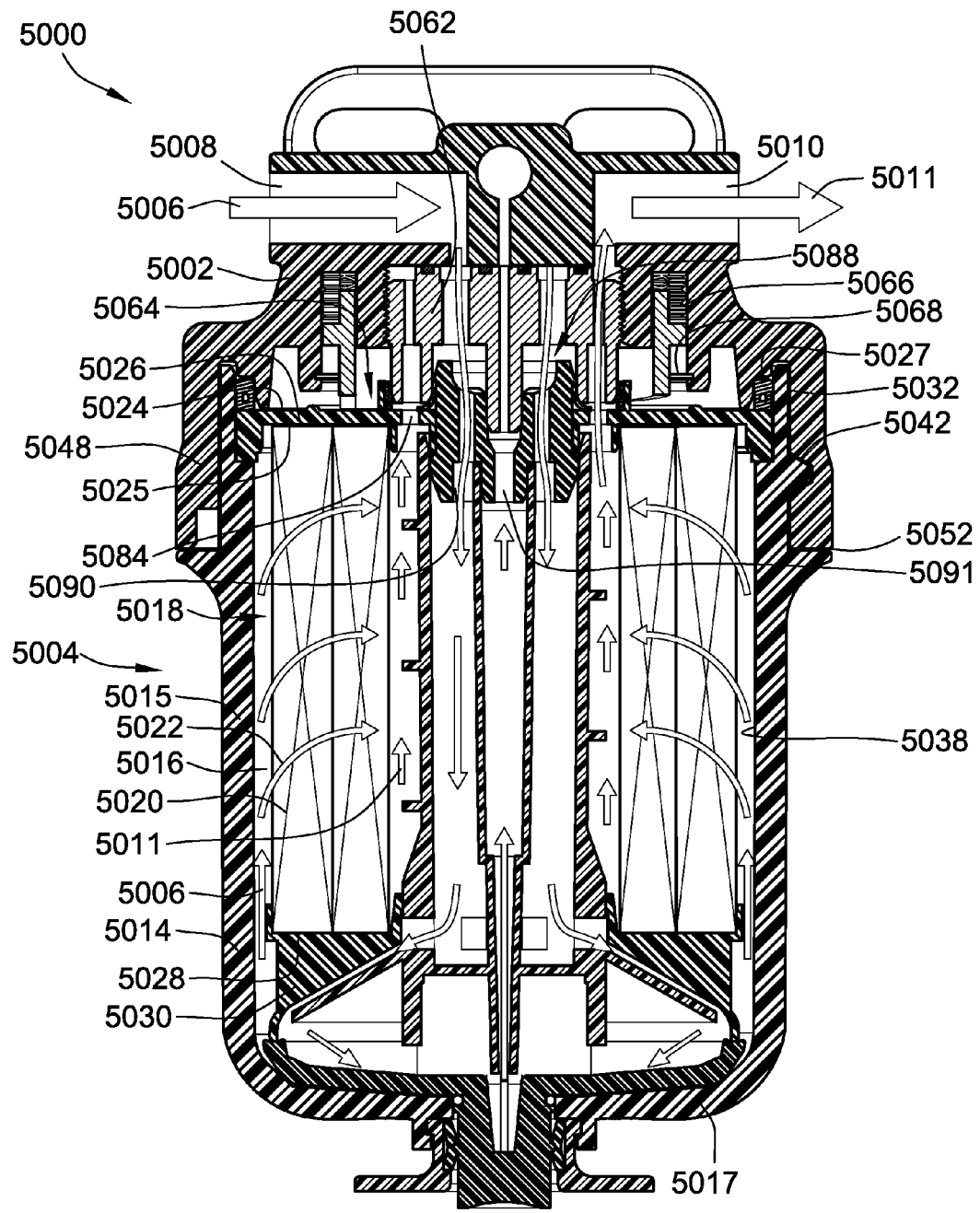
FIG. 64 is a cross-sectional view of another embodiment of a filter arrangement.

FIG. 64 illustrates a further embodiment of a filter assembly 5000 according to the teachings of the present invention. The filter assembly 5000 generally includes a filter base 5002 and a filter 5004. The filter 5004 connects to the filter base 5004 and acts to filter impurities from dirty fluid 5006 passing through the filter assembly 5000.

Dirty fluid 5006 enters the filter assembly 5000 through dirty fluid inlet port 5008 of the filter base 5002 from a system such as an engine or from a fluid storage tank such as fuel tank (neither shown). After entering the filter base 5002, the dirty fluid 5006 passes through the filter 5004 and is cleaned. The clean fluid (illustrated as arrows 5011) then exits the filter assembly 5000 through clean fluid port 5010 of the filter base 5002.

The filter 5004 of FIG. 64 includes an outer housing 5014 having an annular side wall 5015 and a bottom end all 5017 that defines an internal cavity 5016 that houses a replaceable filter element 5018. The filter element 5018 includes a tubular ring of filter media 5020 which separates impurities from the dirty fluid 5006 as it passes therethrough, as illustrated by arrows 5022.

A cover 5024 sealingly connects to an open end of the housing 5014 and generally closes the housing 5014. Seal member 5027 prevents fluid from passing between the outer periphery of cover 5024 and the inner surface 5038 of the sidewall 5015 of housing 5024.

The cover 5024 is also a top end cap of the filter element 5018 that sealingly connects to a top end 5026 of the tubular ring of filter media 5020. The sealing connection is generally formed between an inner face 5025 of cover 5024 and the top end 5026 of the ring of filter media 5020 to prevent fluid bypass therebetween. By preventing fluid bypass, the dirty fluid 5006 is forced to pass through the filter media 5020 and avoids dirty fluid 5006 from circumventing the filter media 5020.

The sealing connection between the cover 5024 and ring of filter media 5020 may be provided by any known connection. By way of example, cover 5024 may be potted to the ring of filter media 5020, the ring of filter media 5020 may be ultrasonically bonded to the cover 5024, the ring of filter media 5020 may be embedded into the cover 5024 or any other means of providing a sealing connection may be implemented.

The cover 5024 is a member, which may be one or more component parts, that provides porting for interface with the filter base 5002 to facilitate fluid flow for the filtered fluid. As indicated previously, cover 5024 takes the form of an end cap. However, the cover could also take the form of a nut plate such that it would carry threads for securing the filter to the filter base. A cover can have other porting arrangements for permitting additional fluid flow into or out of the filter, such as for permitting removal of filtered water. Additionally, as will be more fully described below with reference to the embodiment of FIGS. 73-75, a cover may also include an adaptor or alternatively take the form of an adaptor. Finally, a cover may be a reusable component, for example, when the cover forms an adaptor.

The illustrated filter media 5020 is a combination of a pair of concentric rings of filter media. However, more or less filter media rings may be used.

The bottom end 5028 of the ring of filter media 5020 is sealingly connected to a bottom end cap 5030. The bottom end 5028 and bottom end cap 5030 may be sealingly connected in a similar or different manner as cover 5024 and top end 5026.

Figure 65:
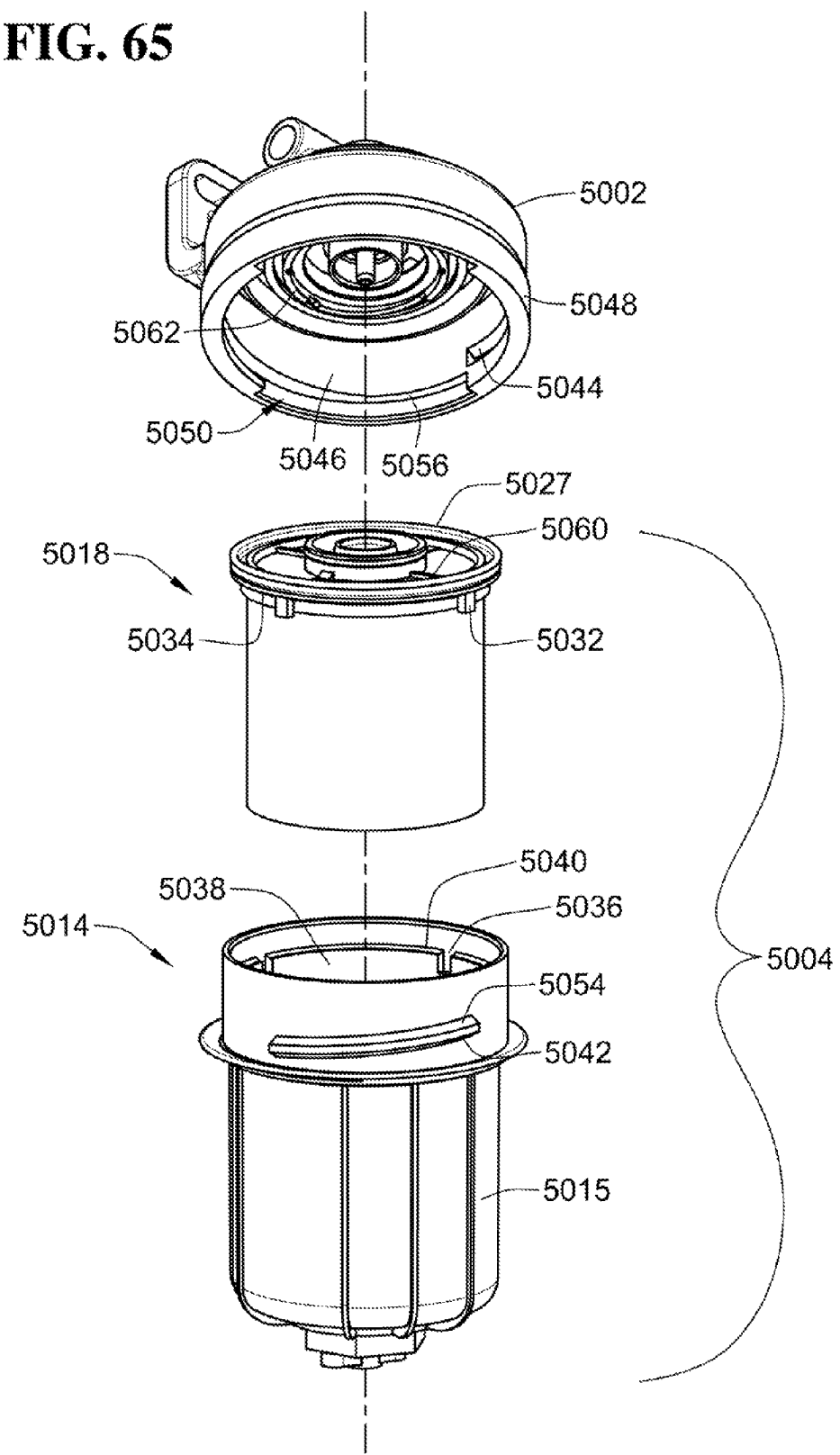
FIG. 65 is an exploded illustration of the filter arrangement of FIG. 64.

FIG. 65 illustrates the filter assembly 5000 in a perspective exploded form with the filter base 5002 rotated to show an interior cavity of the filter base 5002 that receives the filter 5004.

The filter element 5018, and particularly cover 5024, includes a plurality of keys 5032. These keys 5032 are located proximate a rim region 5034 of cover 5024 and interact with a corresponding set of locking slots 5036 when the filter element 5018 is inserted into housing 5014. The interaction of the keys 5032 with the locking slots 5036 prevent relative angular movement between the filter element 5018 and the housing 5014. The interaction also can be used to prevent the wrong filter element from being inserted into housing 5014.

The locking slots 5036 are formed in an inner surface 5038 of the sidewall 5015 of the housing 5014, and particularly at a stepped region 5040. The locking slots 5036 open axially toward the open end of the filter housing 5014 for axial receipt of keys 5032 as the filter element 5018 is inserted axially into housing 5014.

The angular relationship between adjacent ones of the keys 5032 may be altered so as to provide a keying system to prevent inappropriate filter elements from being inserted housing 5014. Alternatively, the size of individual keys 5032 may be altered. For example, one key 5032 may extend axially from cover 5024 farther than a second one of the keys 5032. Additionally, one key 5032 may extend angularly a larger width than a second one of the keys 5032. Also, one key 5032 may extend radially outward a further distance than other ones of the keys 5032. In any event, the keys 5032 may have a characteristic that is altered to allow only a proper filter element 5018 to be inserted into the filter housing 5014.

Figure 66:
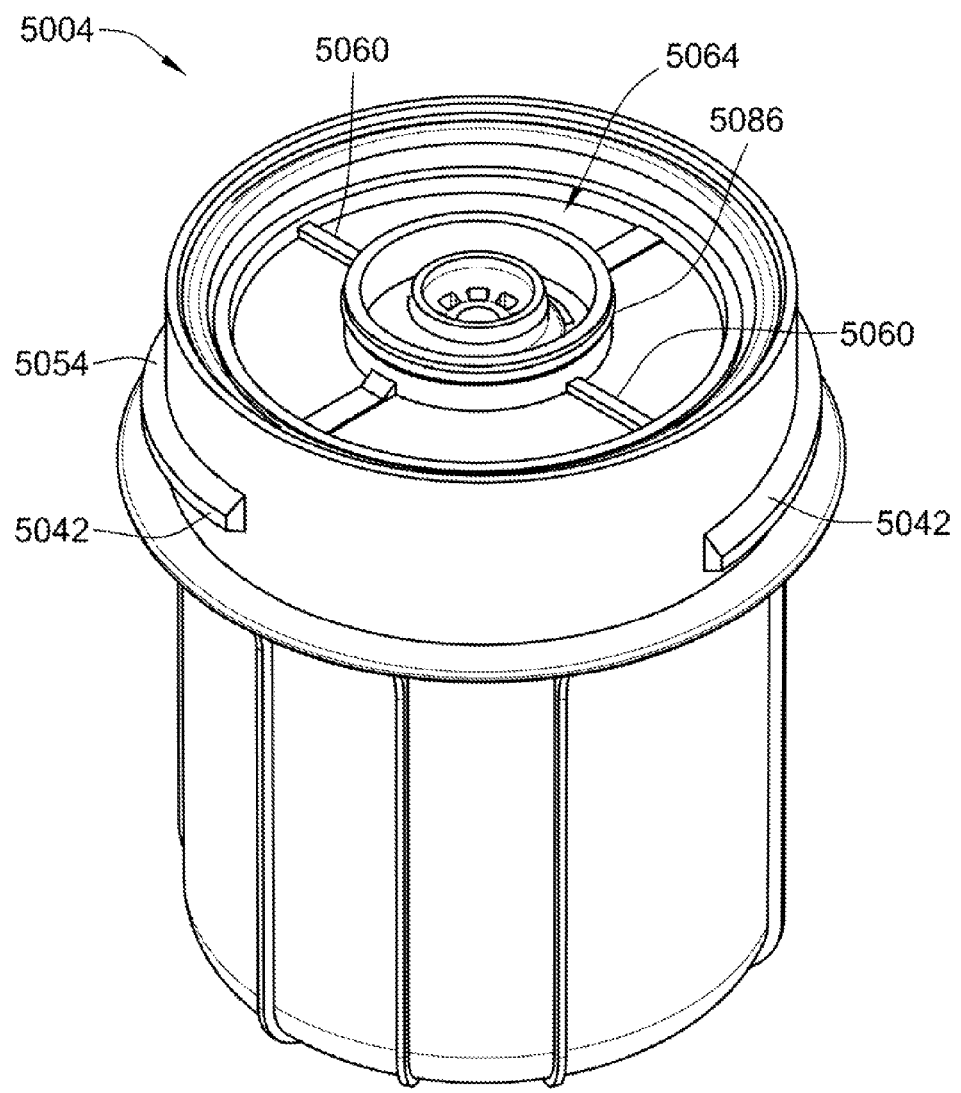
FIG. 66 is an isometric view of the filter of the filter arrangement of FIG. 64.

With additional reference to FIG. 66, housing 5014 includes a plurality of threads 5042 that cooperate with corresponding threads 5044 of the filter base 5002. The cooperation between threads 5042, 5044 facilitate mounting the filter housing 5014 and filter 5004 to the filter base 5002.

Threads 5044 of the filter base 5002 are grooves formed in a radially inner surface 5046 of an axially extending skirt portion 5048 of filter base 5002. A mouth portion 5050 of each thread 5044 is formed where the thread 5044 intersects the distal end 5052 of skirt portion 5048. The mouth portion 5050 preferably extends a slightly larger angular distance as a corresponding thread 5042 such that the thread 5042 can easily pass axially therethrough. As such, a top surface 5054 of each thread 5042 of the housing 5014 is axially abutted against a top surface 5056 of each groove of threads 5044 of the filter base 5002 when the filter 5004 is initially inserted into filer base 5002.

As the filter housing 5014 is rotated relative to the filter base 5002 with the filter 5004 inserted into the skirt portion 5048 with the threads 5042 inserted into mouth portions 5050, threads 5042 and 5044 cooperate to axially draw filter 5004 into skirt portion 5048. Threads 5042, 5044 have an incline in the counter-clockwise direction and thus a corresponding rotation of filter 5004 relative to filter base 5002 is required to mount filter 5004 to filter base 5002. Removal of the filter 5004 occurs by rotating the filter 5004 in the opposite clockwise direction relative to the filter base 5002.

The filter assembly 5000 of FIG. 64 includes a locking arrangement to prevent the filter 5004 from inadvertently disengaging from filter base 5002. The locking arrangement also provides for an additional mechanism for keying the filter element 5018 to the filter base 5002 such that the proper filter element 5018 is being employed.

To implement one embodiment of the locking arrangement, cover 5024 includes a plurality of lock detents 5060 that cooperate with a torsion lock insert 5062 of the filter base 5002 for providing a torsion locking arrangement.

Figure 67:
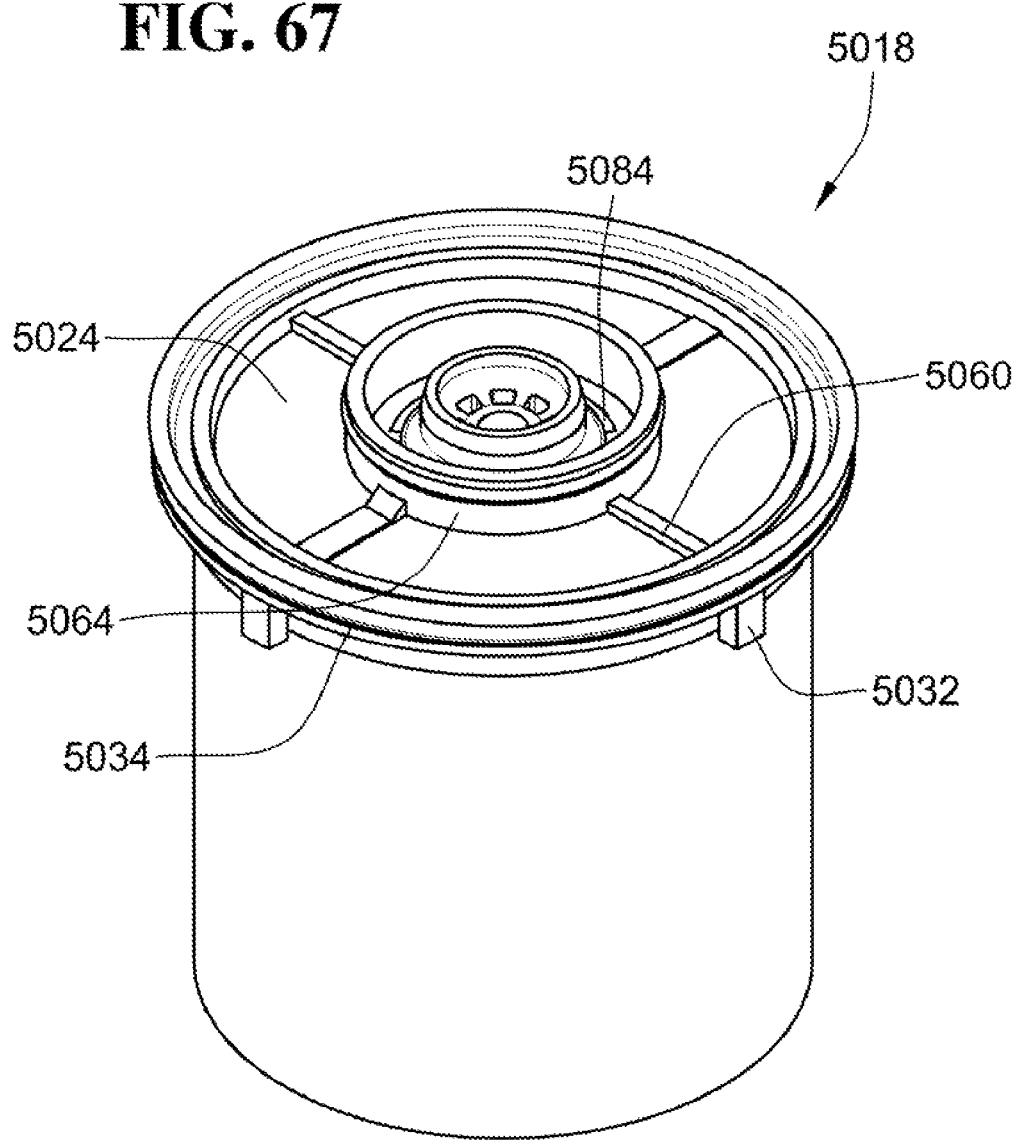
FIG. 67 is an isometric view of the filter element of the filter of FIG. 66.

As illustrated in FIG. 67, the lock detents 5060 of the illustrated embodiment extend radially between the rim region 5034 and an inner hub portion 5064 of the cover 5024. When the filter 5004 is assembled (such as in FIG. 66), the lock detents 5060 are radially positioned between threads 5042 and the hub portion 5064. The lock detents 5060 extend axially outward and away from the filter media 5020. The lock detents 5060 are formed on an outer surface of a disc portion of cover 5024 that extends between the hub portion 5064 and the rim region 5034. Preferably but not necessarily, the lock detents 5060 are in the form of tabs that provide a catch. However, the lock detents 5060 could take the form of recesses.

Figure 68:
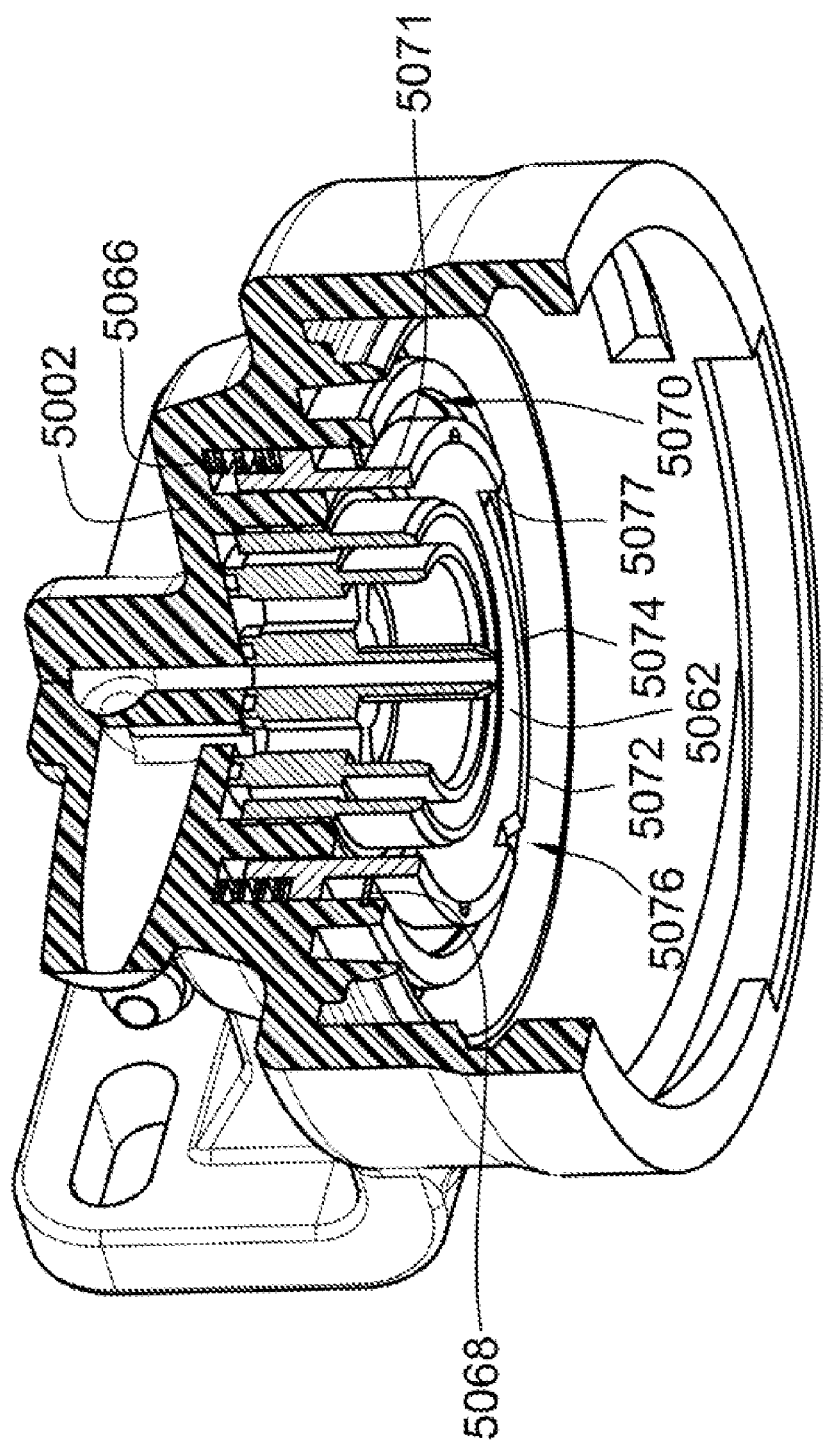
FIG. 68 is a partial sectioned illustration of the filter base of the filter arrangement of FIG. 64.
Figure 70A:
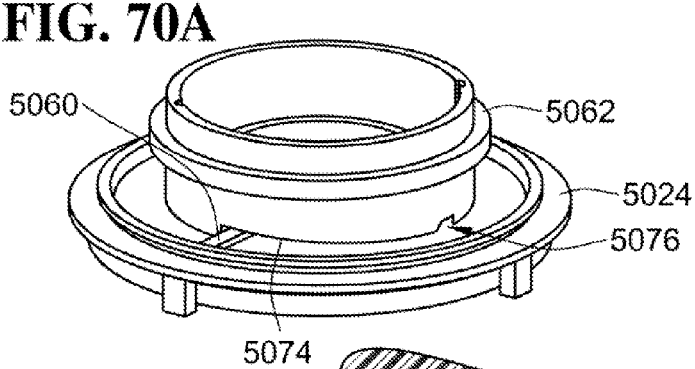
FIG. 70-71 are simplified and schematic illustrations of the interaction between the torsion lock insert and a cover of the filter arrangement of FIG. 64 as a filter is being mounted to a filter base.
Figure 71A:
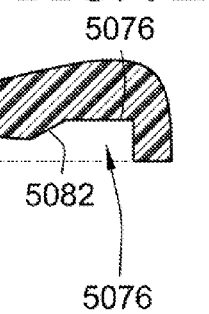
Figure 70B:
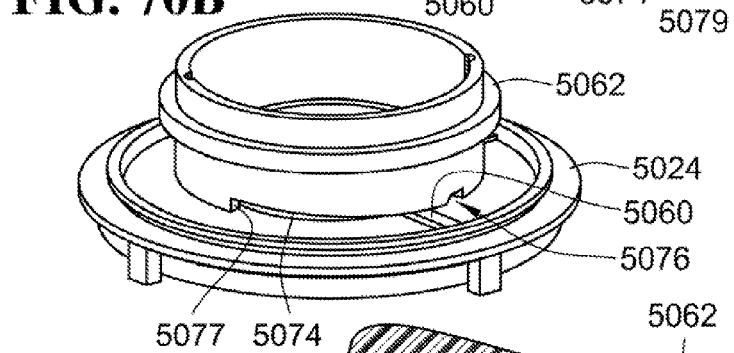
Figure 71B:
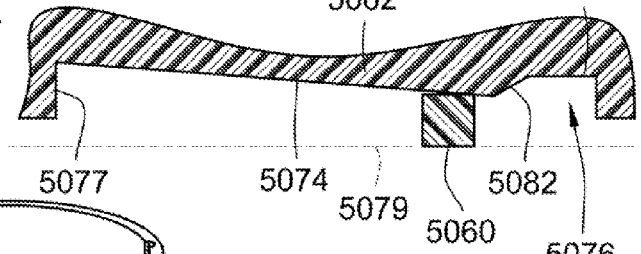
Figure 70C:
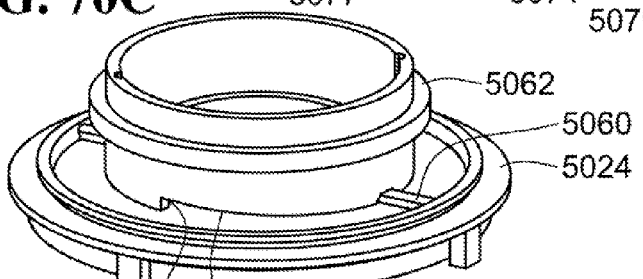
Figure 71C:
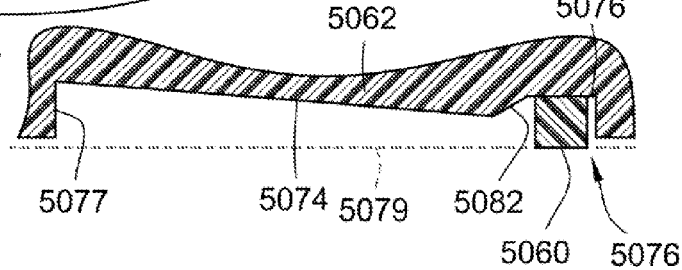

The torsion lock insert 5062 (see FIGS. 64, 65 and 68) is mounted for axial movement relative to the skirt portion 5048 of the filter base 5002. A biasing member in the form of a wave spring 5066 biases the torsion lock insert 5062 toward distal end 5052 of skirt portion 5048 and toward a filter 5004, when a filter 5004 is mounted to the filter base 5002. A snap ring 5068 secures the torsion lock insert 5062 in annular channel 5070 and connected to the rest of the filter base 5002.

With further reference to FIG. 69, the torsion lock insert 5062 includes a generally annular body 5071 having a distal end 5072 that includes a plurality of ramp segments 5074. In a preferred embodiment, the ramp segments 5074 have an incline that is opposite threads 5044, e.g. an incline in the clockwise direction. Each ramp segment 5074 includes a locking slot 5076 proximate a first end and an abutment wall 5077 proximate a second end.

The locking slots 5076 are axially recessed relative to the end of the ramp segments 5074 so as to further assist in preventing an inserted locking detent 5060 from being easily removed therefrom. Inclined wall portions 5082 lead into the locking slots 5076 from ramped segments 5074 and assists removal of the locking detents 5060 from the locking slots 5076 for dismounting the filter 5004 from the filter base 5004.

The torsion lock insert 5062 interacts with the filter 5004 to prevent the filter 5004 from unthreading or becoming disengaged from the filter base 5002 after being mounted thereto. When the filter 5004 is mounted to the filter base 5002, the locking slots 5076 engage the lock detents 5060 and prevent rotation of the filter 5004 relative to the filter base 5002.

As the filter 5004 is threaded to the filter base 5002, the filter 5004 is drawn axially into skirt portion 5048 and the lock detents 5060 slide along ramp segments 5074. As the filter 5004 is increasingly drawn into skirt portion 5048, the inter action between the locking detents 5060 and the ramp segments 5074 causes the torsion lock insert 5062 to be biased axially away from the open end of the skirt portion 5048 and against the action of wave spring 5066.

With reference to FIGS. 70A-C and 71A-C, the interaction of the lock insert 5062 and cover 5024 as a filter 5004 is mounted to a filter base 5002 is illustrated in simplified and schematic form. When the filter 5004 is initially inserted into skirt portion 5048 with the threads 5042 inserted into mouth portions 5050 of threads 5044, the lock detents 5060 are positioned proximate the end of the ramp segments 5074 having abutment wall 5077 (see FIGS. 70A and 71A). As the filter 5004 is rotated counterclockwise, cover 5024 rotates relative to the torsion lock insert 5024 causing the lock detents 5060 to transition along the ramp segments 5074 (see FIGS. 70B and 71B). After a sufficient degree of rotation, typically 90 degrees, the lock detents 5060 will enter locking slots 5076 (see FIGS. 70C and 71C).

The quarter turn configuration provides for quick and easy installation and removal of the filter 5004 to reduce maintenance time and to simplify maintenance of the filter arrangement.

It can be seen that the torsion lock insert 5062 moves axially away from the filter 5004 (illustrated as a horizontal dashed line 5079) as the filter is rotated counterclockwise and the lock detent 5060 transitions along ramp segment 5074. However, once the lock detent 5060 reaches the locking slot 5076, the torsion lock insert 5062 transitions axially slightly back toward the filter 5004.

As the filter 5004 is increasingly inserted into skirt portion 5048, the wave spring 5066 is increasingly compressed increasing the friction between the torsion lock insert 5062 and cover 5024. This increase in friction is amplified by the fact that the ramp segments 5074 are inclined at an opposite direction as the threads 5042, 5044 securing the filter 5004 to the filter base 5002.

As illustrated in FIG. 66, the lock detents 5060 angularly align with the end of threads 5042. However, in other embodiments, the lock detents 5060 can be angularly offset from thread 5042. This provides for additional keying arrangements to prevent improper implementation of a filter or filter element that is not designed for the particular application.

Further, while the lock detents 5060 are formed on the cover 5024 and the ramped segments 5074 and locking slots 5076 are formed by the torsion lock insert 5062, these structures could be formed in the opposite structures. More particularly, the detents could be formed on the end of the torsion lock insert while the ramped segments and locking slots could be formed by the cover.

With reference to FIG. 72, the hub portion 5064 includes a plurality of flow ports 5084 that surround a central aperture 5086. The flow ports 5084 and central aperture 5086 permit fluid to flow between the filter 5004 and filter base 5002. In one particular implementation, flow ports 5086 are arranged as clean fluid outlets through which clean fluid exits the filter 5004.

Returning to FIG. 64, a grommet 5088 mounts to hub portion 5064 of cover 5024 and is received in aperture 5086. Grommet 5088 includes a plurality of flow ports 5090 that surround a central passage 5091 of the grommet 5088. Grommet 5088 provides an interface between the filter 5004 and the filter base 5002. Grommet 5088 is preferably formed from a flexible material so as to assist mounting of the filter 5004 to the filter base 5002. More particularly, if the filter base 5002 and filter 5004 do not perfectly align, the grommet 5088 can flex so as to maintain a seal between the two components.

Further, in other embodiments, the cover or torsion lock insert need not include the ramped segments, but could merely incorporate the locking slots. The wave spring 5066 and thread pitch of threads 5042, 5044 can be configured such that the mere threading action when mounting the filter 5004 to the filter base 5002 can provide sufficient biasing of the wave spring 5066 to properly engage the torsion lock insert with the cover 5024.

Figure 73:
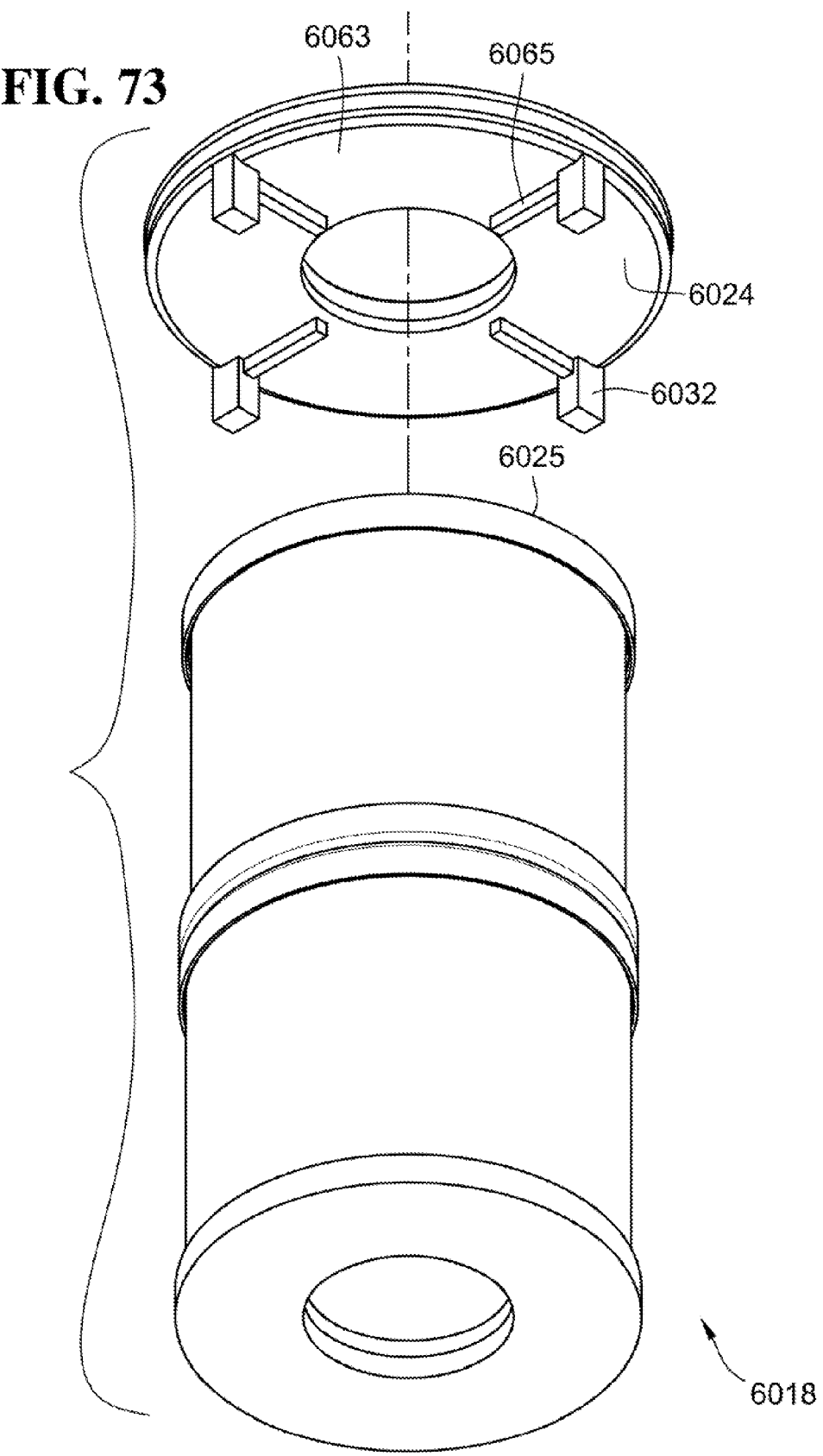
FIG. 73-75 illustrate a filter element and adaptor arrangement according to one embodiment of the present invention.
Figure 74:
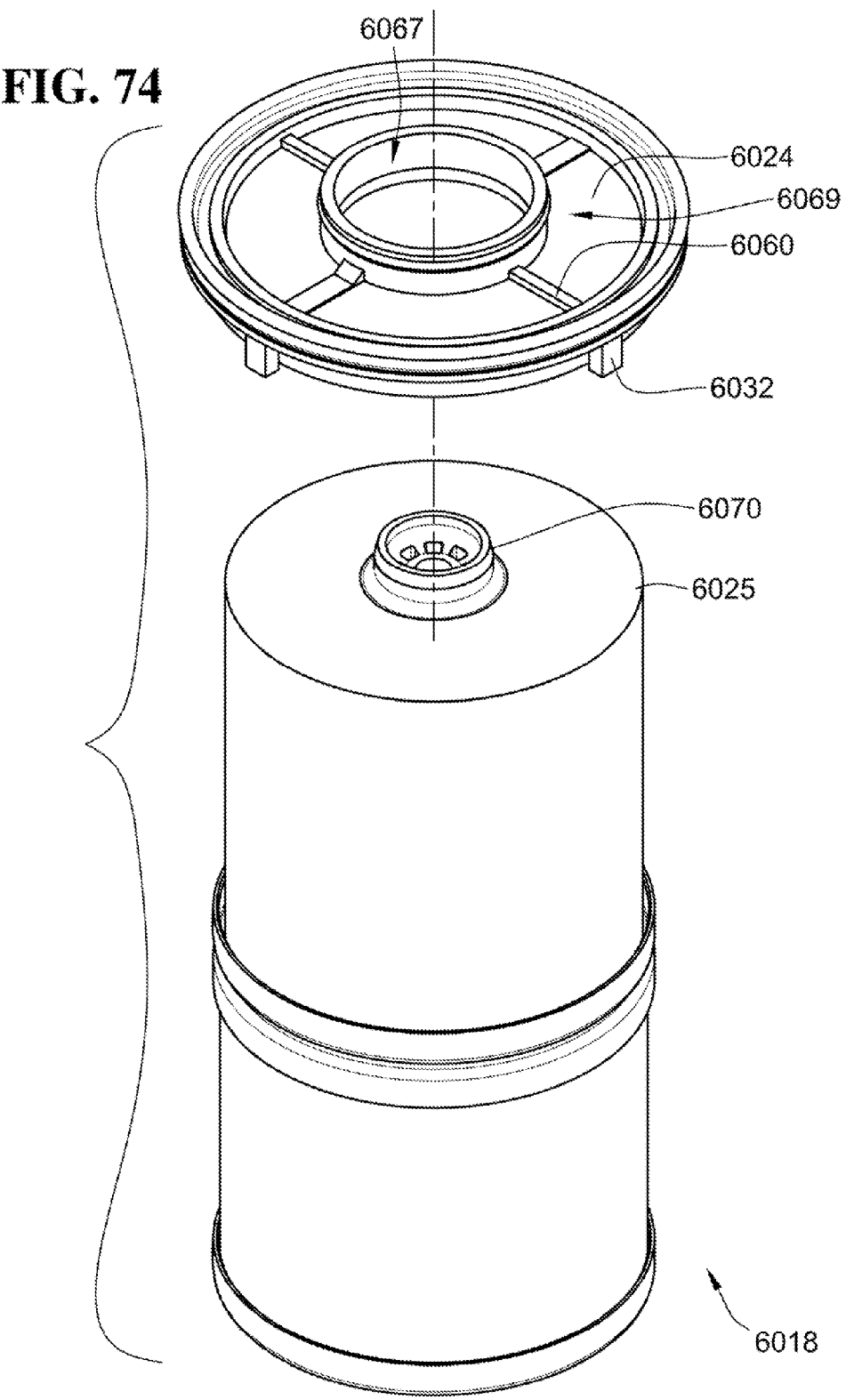
Figure 75:
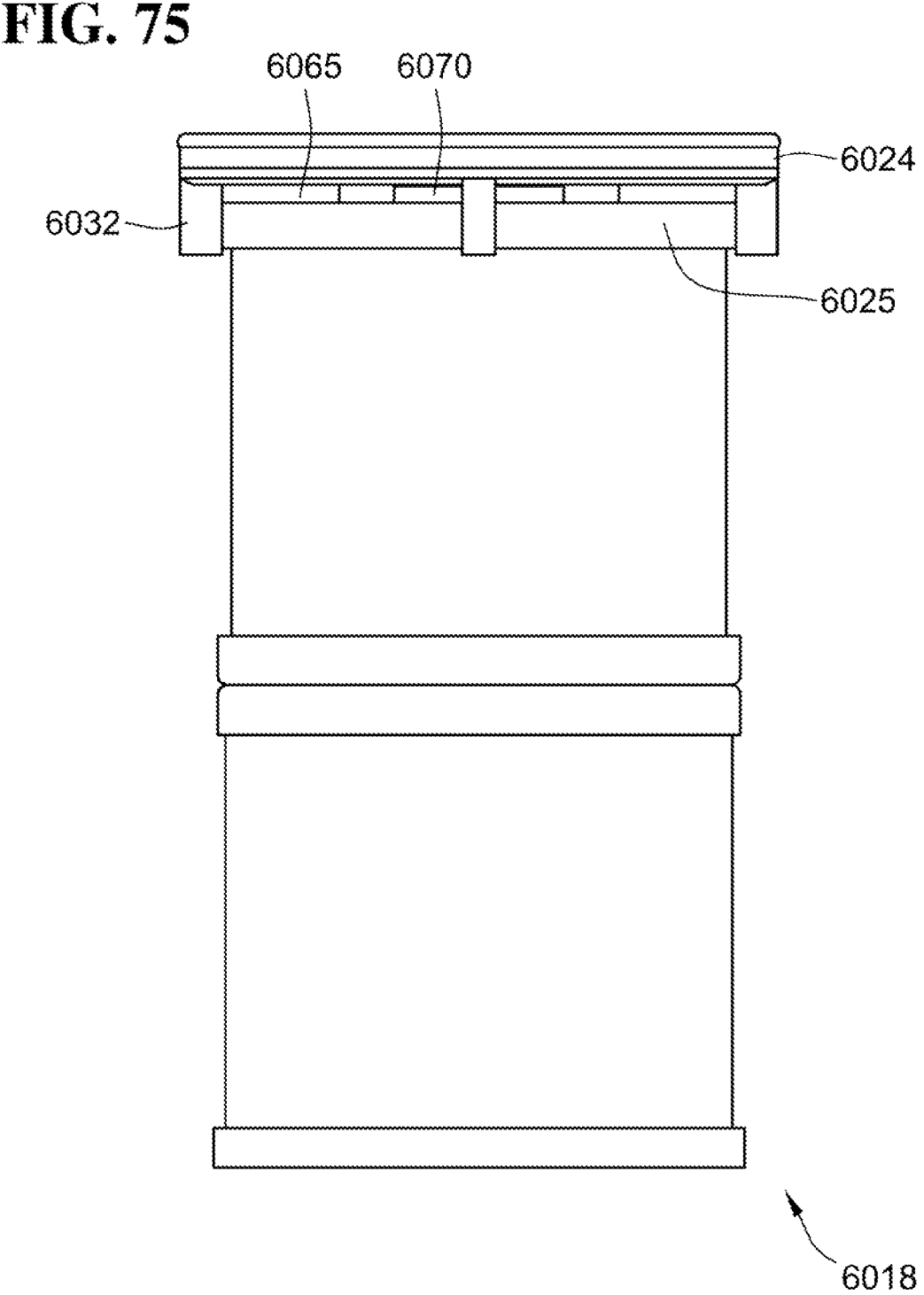

A further embodiment of a filter element 6018 that utilizes an adaptor 6024 is illustrated in FIGS. 73-75. In this embodiment, the cover 6024 is separate and distinct from top end cap 6025 of filter element 6018. As such, the cover 6024 is formed as part of an adapter for adapting a standard replaceable filter element 6018 for use in a filter. More particularly, the adaptor can adapt the standard filter element 6018 for use in filter housing 5014.

The cover includes keys 6032 for interacting with the filter housing 5014 just as discussed previously with the other embodiment. Similarly, the cover provides the lock detents 6060 for interacting with the torsion lock insert 5062 of the filter base 5002.

In this particular adapter arrangement, the inner face 6063 of the cover 6024 also includes axial stand offs 6065 that axially space the cover 6024 from the top end cap 6025 of the filter element 6018. The axially spacing between the cover 6024 and the top end cap 6025 permits any necessary fluid flow therebetween.

When assembled, an aperture 6067 formed by hub member 6069 of the top cover 6024 will surround grommet 6070, albeit it may be axially offset therefrom, to form a fluid outlet therebetween. Typically, the fluid outlet formed between the hub member 6069 and grommet 6070 may be used as a clean fluid outlet of the filter 6004 when fully assembled. The grommet 6070 will typically provide a dirty fluid inlet of filter 6004.

Figure 76:
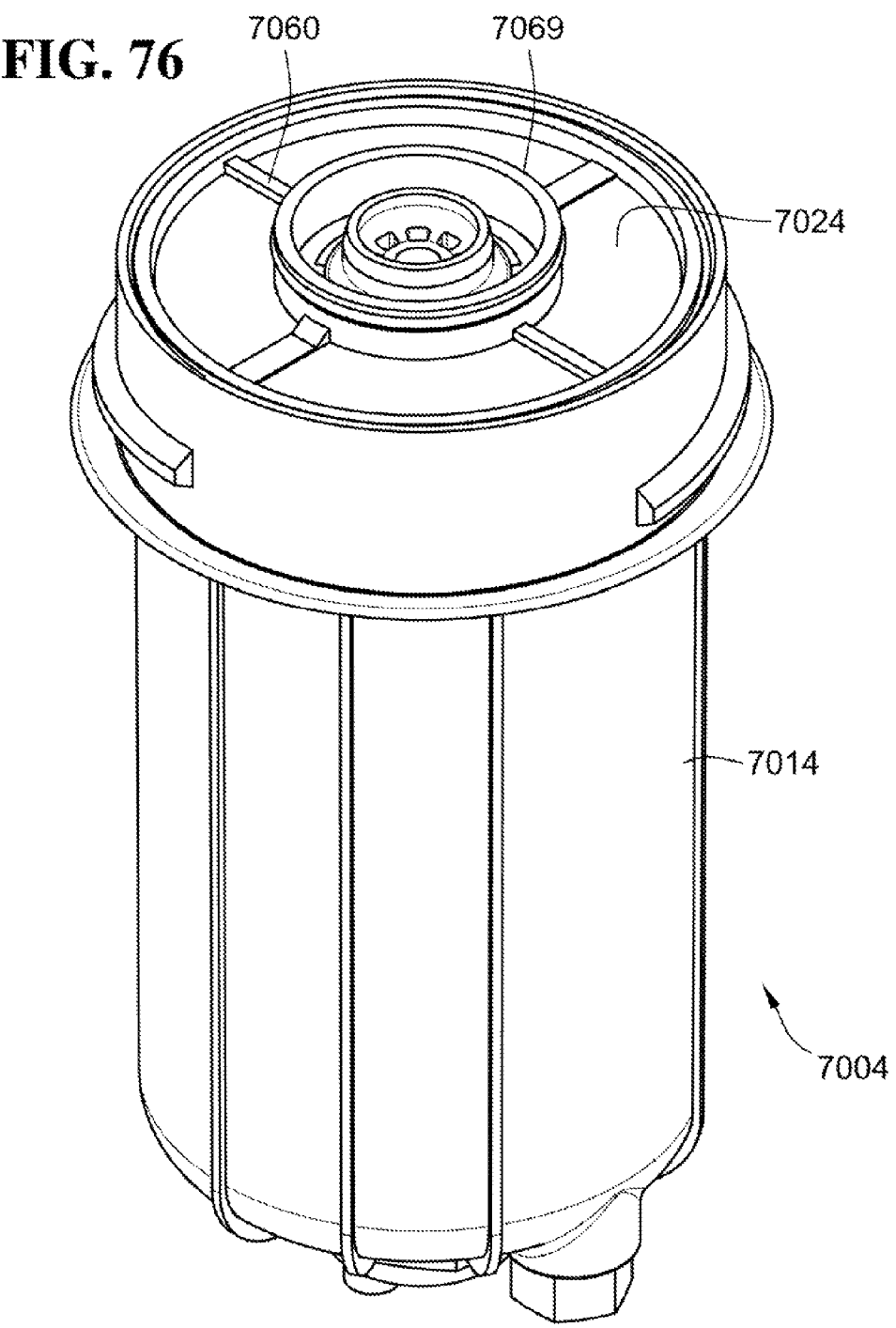
FIG. 76 is a filter according to one embodiment of the present invention that does not include a replaceable filter element.

A further embodiment of a filter 7004 is illustrated in FIG. 76. In this embodiment, the entire filter 7004 is replaceable. The cover 7024 is permanently affixed within housing 7014. Again, cover 7024 defines a hub region 7069 and lock detents 7060 for use with filter head 5002 and torsion lock insert 5062.

As is evident from the various embodiments, a "filter" may take numerous different forms. For example, in a filter may be just a filter element, such as the filter element 5018 of FIG. 64, such as in those instances, but not only those instances, where a housing is reusable and the filter element is disposable.

When the filter element is placed in the reusable housing, the combination may form a cartridge.

Alternatively, a filter may be a filter element and a housing, i.e. a cartridge, such as the filter of FIG. 76 where the entire cartridge, the housing and filter media, are meant to be disposed of together. A filter cartridge can also include an adaptor for coupling the cartridge to a filter base.

Further yet, a filter may be the combination of a filter element or filter cartridge with an adaptor, such as in FIG. 74 where the filter element is coupled with an adaptor. When the filter includes an adaptor, the adaptor may or may not stay with the rest of the filter during replacement of the spent filter. For example, the adaptor may remain with the filter base so that the adaptor is reusable and need not be replaced. Alternatively, the adaptor may become permanently affixed to the rest of the filter so that a new adaptor is required each time, i.e. such that it would require destruction of the adaptor to remove it.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filter assembly, comprising:
   a filter cartridge comprising:
      a housing having a first outer annular sidewall;
      a cover at one end of the housing, the cover having an inlet port and an outlet port;
      filter media disposed within the first outer annular sidewall;
      a mounting thread provided by one of the housing and the cover; and
      a torsion lock detent provided by one of the cover and the housing radially between the mounting thread and the inlet and outlet ports; and
   a filter base comprising:
      a second annular sidewall including an open end sized to receive an end of the housing therethrough, the second annular sidewall including an inclined shelf corresponding to the mounting thread formed in a radially inner surface of the second annular sidewall, the shelf facing axially away from the open end of the second annular sidewall, the second annular sidewall having an inner diameter being less than an outer diameter of the mounting thread;
      a lock assembly including a ramped surface terminating in a lock slot, the ramped surface abutting the torsion lock detent when the mounting thread is inserted into the thread slot;
   wherein the open end of the second annular sidewall includes an opening formed therein at an end of the shelf through which the mounting thread is received and a terminating end axially offset from the opening, and wherein the lock assembly comprises an annular locking member including the ramped surface on an axial end thereof, the annular locking member being axially moveable relative to the second annular sidewall; and a biasing member axially biasing the annular locking member in a direction extending axially from the terminating end toward the opening.

2. The filter assembly of claim 1, wherein the ramped surface has an axial incline direction being opposite an axial incline direction of the thread slot.

3. The filter assembly of claim 2, further including a second mounting thread by one of the housing and the cover, wherein the second annular sidewall includes a second shelf facing axially away from the open end of the second annular sidewall, the second shelf corresponding to the second mounting thread, and wherein the second annular sidewall includes a second opening formed at an end of the second shelf through which the second mounting thread is received.

4. The filter assembly of claim 3, wherein the angular distance between the ends of the first and second shelves proximate the first and second openings in a first direction is different than the angular distance between the ends of the first and second shelves proximate the first and second openings in a second direction, opposite the first direction.

5. The filter assembly of claim 4, further including a second torsion lock detent provided by one of the cover and the housing radially between the second mounting thread and the inlet and outlet ports, further including a second ramped surface formed on the axial end of the annular locking member terminating in a lock slot, the second ramped surface abutting the second torsion lock detent when the second mounting thread axially abuts the shelf and the second mounting thread abuts the second shelf.

6. The filter assembly of claim 5, wherein the ramped surface and the second ramped surface each terminate in an axially extending abutment at an opposite end as the lock slot, the abutments formed in the end of the annular locking member.

7. The filter assembly of claim 6, wherein each locking slot is axially recessed relative to the end of the ramped surface to which the locking slot is adjacent.

8. The filter assembly of claim 7, wherein each locking slot includes a bottom wall interposed between two abutment sidewalls, wherein the abutment sidewall interposed between the bottom wall and the corresponding ramped surface of that locking slot is a canted cam surface.

9. The filter assembly of claim 8, wherein the annular locking member is prevented from angularly rotating relative to the second annular sidewall when the filter cartridge is threaded to the filter base with the lock detents abutting the ramped surfaces and the filter cartridge angularly rotating relative to the locking member and the second annular sidewall.

10. The filter assembly of claim 4, wherein the annular locking member is axially translated relative to the second annular sidewall at a first rate when the filter cartridge is threaded to the filter base with the lock detents abutting the ramped surface and axially translated at a second rate when the lock detents translate into the lock slots as the filter cartridge is threaded to the filter base.

11. The filter cartridge of claim 1, the ramped surface axially facing the open end of the annular side wall, the shelf and the mounting thread axially securing the filter cartridge to the filter base.

12. A filter assembly, comprising:
  a filter cartridge comprising:
    a housing having a first outer annular sidewall;
    a cover at one end of the housing, the cover having an inlet port and an outlet port;
    filter media disposed within the first outer annular sidewall;
    a mounting thread provided by one of the housing and the cover; and
    a torsion lock detent provided by one of the cover and the housing radially between the mounting thread and the inlet and outlet ports; and
  a filter base comprising:
    a second annular sidewall including an open end sized to receive an end of the housing therethrough, the second annular sidewall including an inclined shelf corresponding to the mounting thread formed in radially inner surface if the second annular sidewall, the shelf facing axially away from the open end of the second annular sidewall for axially securing the filter cartridge to the filter base, the second annular sidewall having an inner diameter being less than an outer diameter of the mounting thread; and
    a lock assembly including a ramped surface terminating in a lock slot, the ramped surface abutting the torsion lock detent when the mounting thread is inserted into the thread slot, the ramped surface axially facing the open end of the second annular side wall such that the ramped surface substantially axially faces the filter cartridge as the filter cartridge is being inserted into the open end of the second annular sidewall; and
  wherein the lock assembly of the filter base further comprises an annular locking member including the ramped surface on an axial end thereof, the annular locking member being axially moveable relative to the annular sidewall, and a biasing member axially biasing the annular locking member toward the open end of the annular sidewall.

13. The filter cartridge of claim 12, wherein the biasing member biases the annular locking member in a same direction as the ramped surface on the axial end of the annular locking member axially faces.

* * * * *